(12) United States Patent
Seo et al.

(10) Patent No.: US 8,982,854 B2
(45) Date of Patent: *Mar. 17, 2015

(54) METHOD FOR SCHEDULING DISTRIBUTED VIRTUAL RESOURCE BLOCKS

(71) Applicant: Optis Cellular Technology, LLC, Plano, TX (US)

(72) Inventors: Dong Youn Seo, Anyang-si (KR); Eun Sun Kim, Anyang-si (KR); Bong Hoe Kim, Anyang-si (KR); Joon Kui Ahn, Anyang-si (KR)

(73) Assignee: Optis Cellular Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,014

(22) Filed: Oct. 8, 2013

(65) Prior Publication Data
US 2014/0036834 A1   Feb. 6, 2014

Related U.S. Application Data

(63) Continuation of application No. 13/409,057, filed on Feb. 29, 2012, now Pat. No. 8,634,388, which is a continuation of application No. 12/759,645, filed on Apr. 13, 2010, now Pat. No. 8,472,466, which is a
(Continued)

(30) Foreign Application Priority Data
Dec. 22, 2008   (KR) .................... 10-2008-0131113

(51) Int. Cl.
*H04J 3/00*   (2006.01)
*H04W 72/04*   (2009.01)
(Continued)

(52) U.S. Cl.
CPC ......... *H04W 72/0446* (2013.01); *H04L 1/0071* (2013.01); *H04L 1/04* (2013.01);
(Continued)

(58) Field of Classification Search
USPC ......... 370/392, 332, 336, 341, 442, 480, 468, 370/473
See application file for complete search history.

(56) References Cited

U.S. PATENT DOCUMENTS 6,202,178 B1   3/2001 Spruyt
7,159,096 B2 *  1/2007 Khan et al. .................... 711/206
(Continued)

FOREIGN PATENT DOCUMENTS

CA   2 703 924 A1   7/2009
CN   1246991 A   3/2000
(Continued)

OTHER PUBLICATIONS

Editor (Motorola): 'Update of 36.213', R1-075113, 3GPP TSG-RAN WG1 Meeting #51, Nov. 2007, XP050108542.
(Continued)

*Primary Examiner* — Andrew Lai
*Assistant Examiner* — Andrew C Lee
(74) *Attorney, Agent, or Firm* — Nixon & Vanderhye P.C.

(57) ABSTRACT

A method for transmitting downlink data using resource blocks at a base station in a wireless mobile communication system includes transmitting downlink data mapped to physical resource blocks (PRBs) to a user equipment, wherein indexes of virtual resource blocks (VRBs) are mapped to indexes of the PRBs for a first slot and a second slot of a subframe, and the indexes of the PRBs for the second slot are shifted with respect to the indexes of the PRBs for the first slot based on a predetermined gap, and wherein a predetermined offset is applied to an index of a PRB when the index of the PRB is equal to or greater than a predetermined threshold.

12 Claims, 33 Drawing Sheets

Related U.S. Application Data continuation of application No. 12/349,465, filed on Jan. 6, 2009, now Pat. No. 7,729,377.

(60) Provisional application No. 61/038,778, filed on Mar. 24, 2008, provisional application No. 61/037,302, filed on Mar. 17, 2008, provisional application No. 61/033,358, filed on Mar. 3, 2008, provisional application No. 61/028,511, filed on Feb. 13, 2008, provisional application No. 61/028,186, filed on Feb. 12, 2008, provisional application No. 61/026,113, filed on Feb. 4, 2008, provisional application No. 61/024,886, filed on Jan. 30, 2008, provisional application No. 61/019,589, filed on Jan. 7, 2008.

(51) Int. Cl.
*H04L 1/00* (2006.01)
*H04L 1/04* (2006.01)
*H04L 5/00* (2006.01)

(52) U.S. Cl.
CPC ........... *H04L 5/0007* (2013.01); *H04L 5/0028* (2013.01); *H04L 5/0039* (2013.01); *H04L 5/0041* (2013.01); *H04L 5/0044* (2013.01); *H04L 5/0092* (2013.01); *H04L 5/006* (2013.01); *H04L 5/0064* (2013.01); *H04L 5/0085* (2013.01)
USPC ........... 370/336; 370/392; 370/332; 370/341; 370/480; 370/468

(56) References Cited

U.S. PATENT DOCUMENTS

| | | | |
|---|---|---|---|
| 7,668,188 B2 | 2/2010 | Chang | |
| 7,808,949 B2 | 10/2010 | Seo | |
| 7,818,475 B2 | 10/2010 | Frey | |
| 7,991,004 B2 * | 8/2011 | Nishio et al. | 370/468 |
| 8,036,239 B2 * | 10/2011 | Chang et al. | 370/415 |
| 8,073,062 B2 | 12/2011 | Classon | |
| 8,311,008 B2 | 11/2012 | Seo | |
| 8,315,222 B2 | 11/2012 | Seo | |
| 8,369,424 B2 * | 2/2013 | Malladi | 375/260 |
| 8,472,466 B2 * | 6/2013 | Seo et al. | 370/442 |
| 8,634,388 B2 * | 1/2014 | Seo et al. | 370/336 |
| 2002/0122410 A1 | 9/2002 | Kulikov | |
| 2003/0040320 A1 | 2/2003 | Lucidarme | |
| 2004/0178934 A1 | 9/2004 | Balakrishnan | |
| 2005/0066336 A1 | 3/2005 | Kavoori | |
| 2005/0075759 A1 | 4/2005 | Furuta | |
| 2005/0135493 A1 | 6/2005 | Maltsev | |
| 2006/0250944 A1 | 11/2006 | Hong | |
| 2007/0053320 A1 * | 3/2007 | Rinne et al. | 370/329 |
| 2007/0177553 A1 | 8/2007 | Frederiksen | |
| 2007/0189197 A1 * | 8/2007 | Kwon et al. | 370/319 |
| 2007/0242363 A1 | 10/2007 | Noboru | |
| 2007/0242636 A1 * | 10/2007 | Kashima et al. | 370/329 |
| 2008/0013599 A1 * | 1/2008 | Malladi | 375/132 |
| 2008/0031191 A1 * | 2/2008 | Kashima et al. | 370/329 |
| 2008/0090583 A1 * | 4/2008 | Wang et al. | 455/452.1 |
| 2008/0187005 A1 | 8/2008 | Chauviere | |
| 2008/0212514 A1 * | 9/2008 | Chen | 370/315 |
| 2009/0073929 A1 | 3/2009 | Malladi | |
| 2009/0175230 A1 * | 7/2009 | Callard et al. | 370/329 |
| 2009/0245193 A1 | 10/2009 | Gaal | |
| 2009/0268624 A1 | 10/2009 | Imamura | |
| 2009/0310475 A1 | 12/2009 | Seo | |
| 2010/0061345 A1 | 3/2010 | Wengerter | |
| 2010/0195612 A1 | 8/2010 | Seo | |
| 2012/0163350 A1 | 6/2012 | Seo | |

FOREIGN PATENT DOCUMENTS

| | | |
|---|---|---|
| CN | 1902840 | 1/2007 |
| EP | 1349292 A2 | 10/2003 |
| EP | 2169855 A1 | 3/2010 |
| JP | 2007288754 A | 11/2007 |
| JP | 2008-228279 | 9/2008 |
| JP | 2008228279 | 9/2008 |
| JP | 2009-060420 | 3/2009 |
| JP | 2009060420 | 3/2009 |
| JP | 2009520321 A | 5/2009 |
| JP | 2009-164816 | 7/2009 |
| JP | 2009164816 | 7/2009 |
| JP | 2009-188675 | 8/2009 |
| JP | 2009188675 | 8/2009 |
| JP | 2009-239340 | 10/2009 |
| JP | 2009239340 | 10/2009 |
| JP | 2010-518658 | 5/2010 |
| JP | 2010518658 | 5/2010 |
| JP | 2010525719 | 7/2010 |
| JP | 2010530650 A | 9/2010 |
| JP | 2010537501 A | 12/2010 |
| JP | 2011-512079 | 4/2011 |
| JP | 2011512079 | 4/2011 |
| JP | 2011-516006 | 5/2011 |
| JP | 2011514695 A | 5/2011 |
| JP | 2011516006 | 5/2011 |
| JP | 2011-517889 | 6/2011 |
| JP | 2011517889 | 6/2011 |
| JP | 2011-530203 | 12/2011 |
| JP | 2011530203 | 12/2011 |
| KR | 1020070082569 | 8/2007 |
| KR | 1020070107614 A | 11/2007 |
| KR | 1020080000206 | 1/2008 |
| KR | 1020080085654 | 9/2008 |
| RU | 2157592 C2 | 10/2000 |
| RU | 2221351 C2 | 1/2004 |
| RU | 2233037 C2 | 7/2004 |
| RU | 2233045 C2 | 7/2004 |
| RU | 2275748 | 4/2006 |
| RU | 2295841 C2 | 3/2007 |
| TW | 200640266 A | 11/2006 |
| TW | 95116975 | 3/2007 |
| TW | 200723814 A | 6/2007 |
| TW | 200746681 A | 12/2007 |
| WO | 0189162 A2 | 11/2001 |
| WO | 2004051872 A2 | 6/2004 |
| WO | 2005050873 A1 | 6/2005 |
| WO | 2005074312 A1 | 8/2005 |
| WO | 2007082754 A1 | 7/2007 |
| WO | 2007088457 A1 | 8/2007 |
| WO | 2007094628 A1 | 8/2007 |
| WO | 2007105100 A2 | 9/2007 |
| WO | 2007126014 A1 | 11/2007 |
| WO | 2008001728 A1 | 1/2008 |
| WO | 2008155911 A1 | 12/2008 |
| WO | 2009/023736 | 2/2009 |
| WO | 2009023736 | 2/2009 |
| WO | 2009/087744 | 7/2009 |
| WO | 2009087744 | 7/2009 |
| WO | 2009088201 A2 | 7/2009 |

OTHER PUBLICATIONS

Huawei: 'Comparison of interleavers for PDCCH', R1-074749, TSG RAN WG1 Meeting #51, Nov. 2007, XP050108220.
Huawei: 'Generic interleaver for PDCCH', R1-074226, TSG RAN WG1 Meeting #50bis, Oct. 2007, XP050107752.
LG Electronics, 'DL control signaling for DVRB allocation using compact assignment', R1-081007, 3GPP TSG RAN WG1 #52, Feb. 2008.
LG Electronics, 'Mapping of Control Channel Elements to Resource Elements', 3GPP TSG RAN WG1 Meeting #49, R1-072606, May 2007.
LG Electronics: 'Comparison of proposals for downlink resource allocation approach 2', R1-074735, 3GPP T RAN WG1 #51, Nov. 2007, XP050108209.
Motorola, 'Downlink Resource Allocation Mapping for E-UTRA', R1-073372, 3GPP TSG RAN1 #50, Aug. 2007.

(56) References Cited

OTHER PUBLICATIONS

Motorola: 'E-UTRA DL Distributed Multiplexing and Mapping Rules: Performance', R1-073392, 3GPP TSG RAN1 #50, Aug. 2007, XP050107014.
NEC Group: 'DL Distributed Resource Signalling for EUTRA', R1-074722, TSG RAN WG1#51, Nov. 2007, XP050108197.
Nokia, 'Resource block allocation—mapping rules', R1-060286, 3GPP TSG RAN WG1 #44 Meeting, Feb. 2006.
Nortel, 'Discussion on Diversity VRB mapping', R1-074638, 3GPP TSG-RAN 1 Meeting #51, Nov. 2007.
Nortel, 'DVRB mapping', R1-080377, 3GPP TSG-RAN 1 Meeting #51-bis, Jan. 2008.
Nortel, et al., 'Way Forward on DVRB to PRB index mapping', 3GPP TSG-RAN WG1 #52, R1-081113, Feb. 2008.
Panasonic, 'Distributed channel mapping', R1-073615, 3GPP TSG-RAN WG1 Meeting #50, Aug. 2007.
Qualcomm Europe: 'Pseudo-random hopping pattern for PDSCH', R1-073265, 3GPP TSG-RAN WG1 #50, Aug. 2007, XP050106900.
Russian Federation Federal Service for Intellectual Property, Patents and Trademarks Application Serial No. 2010128218/08, Notice of Allowance dated Nov. 26, 2012, 10 pages.
State Intellectual Property Office of the People's Republic of China Application Serial No. 200980101805.2, Office Action dated Jan. 4, 2013, 6 pages.
Taiwan Intellectual Proeprty Office Application Serial No. 098100395, Office Action dated Nov. 22, 2012, 5 pages.
Taiwan Intellectual Property Office Application Serial No. 098100393, Search Report dated Mar. 22, 2013, 4 pages.
U.S. Appl. No. 12/850,575, Office Action dated Feb. 6, 2013, 9 pages.
U.S. Appl. No. 12/850,583, Office Action dated Feb. 5, 2013, 8 pages.
U.S. Appl. No. 13/409,057, Office Action dated Mar. 22, 2013, 26 pages.
ZTE, 'Cell-specific D-VRB Resource Allocation for DL Distributed Transmission', R1-074557, 3GPP TSG RAN WG1 Meeting #51, Nov. 2007.
European Communication dated Jul. 17, 2014 in EP 09150180.9, 5 pages.
Canadian Office Action dated Oct. 22, 2013 in CA 2,711,298, 2 pages.
Russian Federation Federal Service for Intellectual Property, Patents and Trademarks Application Serial No. 2012118987/08, Notice of Allowance dated Dec. 8, 2013, 13 pages.

\* cited by examiner

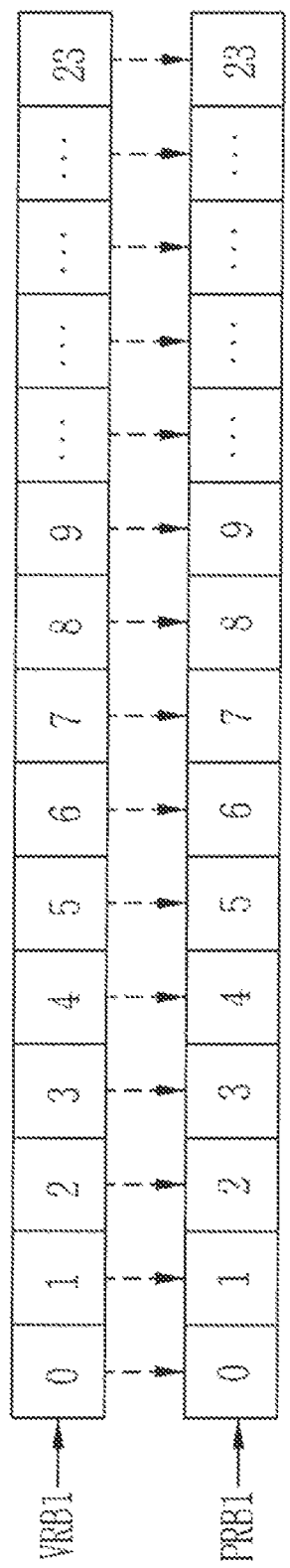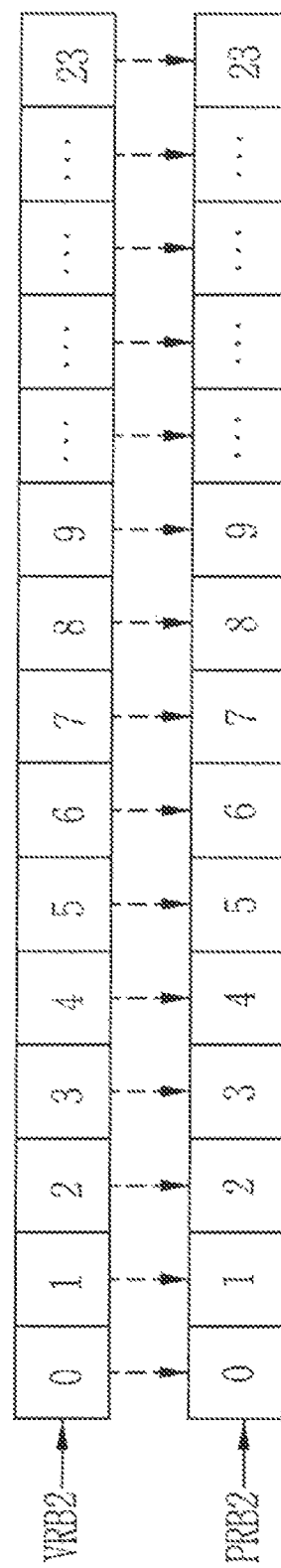
FIG. 5

METHOD FOR SCHEDULING DISTRIBUTED VIRTUAL RESOURCE BLOCKS

CROSS-REFERENCE TO RELATED APPLICATIONS

This application is a continuation of U.S. patent application Ser. No. 13/409,057, filed on Feb. 29, 2012, which is a continuation of U.S. patent application Ser. No. 12/759,645, filed on Apr. 13, 2010, now U.S. Pat. No. 8,472,466, which is a continuation of U.S. patent application Ser. No. 12/349,465, filed on Jan. 6, 2009, now U.S. Pat. No. 7,729,377, which claims the benefit of earlier filing date and right of priority to Korean Patent Application No. 10-2008-0131113, filed on Dec. 22, 2008, and also claims the benefit of U.S. Provisional Application Ser. No. 61/019,589, filed on Jan. 7, 2008, 61/028,186, filed on Feb. 12, 2008, 61/033,358, filed on Mar. 3, 2008, 61/037,302, filed on Mar. 17, 2008, 61/024,886, filed on Jan. 30, 2008, 61/038,778, filed on Mar. 24, 2008, 61/026,113, filed on Feb. 4, 2008, and 61/028,511, filed on Feb. 13, 2008, the contents of which are all hereby incorporated by reference herein in their entirety.

BACKGROUND OF THE INVENTION

1. Field of the Invention

The present invention relates to a broadband wireless mobile communication system, and more particularly, to radio resource scheduling for uplink/downlink packet data transmission in a cellular OFDM wireless packet communication system.

2. Discussion of the Related Art

In a cellular orthogonal frequency division multiples (OFDM) wireless packet communication system, uplink/downlink data packet transmission is made on a subframe basis and one subframe is defined by a certain time interval including a plurality of OFDM symbols.

The Third Generation Partnership Project (3GFP) supports a type 1 radio frame structure applicable to frequency division duplex (FDD), and a type 2 radio frame structure applicable to rime division duplex (TDD). The structure of a type 1 radio frame is shown in FIG. 1. The type 1 radio frame includes ten subframes, each of which consists of two slots. The structure of a type 2 radio frame is shown in FIG. 2. The type 2 radio frame includes two half-frames, each of which is made up of five subframes, a downlink piloting time slot (DwPTS), a gap period (GP) and an uplink piloting time slot (UpPTS), in which one subframe consists of two slots. That is, one subframe is composed of two slots irrespective of the radio frame type.

A signal transmitted in each slot can be described by a resource grid including $N_{RB}^{DL} N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbol in one downlink slot. The structure of this resource grid is shown in FIG. 3.

RBs are used to describe a mapping relationship between certain physical channels and resource elements. The RBs can be classified into physical resource blocks (PRBs) and virtual resource blocks (VRBs), which means that a RB may be either one of a PRB or a VRB. A mapping relationship between the VRBs and the PRBs can be described on a subframe basis. In more detail, it can be described in units of each of slots constituting one subframe. Also, the mapping relationship between the VRBs and the PRBs can be described using a mapping relationship between indexes of the VRBs and indexes of PRBs. A detailed description of this will be further given in embodiments of the present invention.

A PRB is defined by $N_{symb}^{DL}$ consecutive OFDM symbols in a time domain and $N_{SC}^{RB}$ consecutive subcarriers in a frequency domain. One PRB is therefore composed of $N_{symb}^{DL} N_{SC}^{RB}$ resource elements. The PRBs are assigned numbers from 0 to $N_{RB}^{DL}-1$ in the frequency domain.

A VRB can have the same size as that of the PRB. There are two types of VRBs defined, the first one being a localized type and the second one being a distributed type. For each VRB type, a pair of VRBs have a single VRB index in common (may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

The index of a VRB corresponding to a specific virtual frequency band of the first slot has the same value as that of the index of a VRB corresponding to the specific virtual frequency band of the second slot that is. That is, assuming that a VRB corresponding to an ith virtual frequency band of the first slot is denoted by VRB1($i$), a VRB corresponding to a jth virtual frequency band of the second slot is denoted by VRB2($j$) and index numbers of the VRB1($i$) and VRB2($j$) are denoted by index(VRB1($i$) and index (VRB2($j$), respectively, a relationship of index(VRB1($k$))=index(VRB2($k$)) is established (see FIG. 4$a$).

Likewise, the index of a PRB corresponding to a specific frequency band of the first slot has the same value as that of the index of a PRB corresponding to the specific frequency band of the second slot. That is, assuming that a FRB corresponding to an ith frequency band of the first slot is denoted by PRB1($i$), a PRB corresponding to a jth frequency band of the second slot is denoted by PRB2($j$) and index numbers of the PRB1($i$) and PRB2($j$) are denoted by index(PRB1($i$)) and index(PRB2($j$)), respectively, a relationship of index(PRB1($k$))=index(PRB2($k$)) is established (see FIG. 4$b$).

Some of the plurality of aforementioned VRBs are allocated as the localized type and the others are allocated as the distributed type. Hereinafter, the VRBs allocated as the localized type will be referred to as 'localized virtual resource blocks (LVRBs)' and the VRBs allocated as the distributed type will be referred to as 'distributed virtual resource blocks (DVRBs)'.

The localized VRBs (LVRBs) are directly mapped to PRBs and the indexes of the LVRBs correspond to the indexes of the PRBs. Also, LVRBs of index i correspond to PRBs of index i. That is, an LVRB1 having the index i corresponds to a PRB1 having the index i, and an LVRB2 having the index i corresponds to a PRB2 having the index i (see FIG. 5). In this case, it is assumed that the VRBs of FIG. 5 are all allocated as LVRBs.

The distributed VRBs (DVRBs) may not be directly mapped to PRBs. That is, the indexes of the DVRBs can be mapped to the PRBs after being subjected to a series of processes.

First, the order of a sequence of consecutive indexes of the DVRBs can be interleaved by a block interleaver. Here, the sequence of consecutive indexes means that the index number is sequentially incremented by one beginning with 0. A sequence of indexes outputted from the interleaver is sequentially mapped to a sequence of consecutive indexes of PRB1s (see FIG. 6). It is assumed that the VRBs of FIG. 6 are all allocated as DVRBs. On the other hand, the sequence of indexes outputted from the interleaver is cyclically shifted by a predetermined number and the cyclically shifted index sequence is sequentially mapped to a sequence of consecutive indexes of PRB2s (see FIG. 7). It is assumed that the VRBs of FIG. 7 are all allocated as DVRBs. In this manner, PRB indexes and DVRB indexes can be mapped over two slots.

On the other hand, in the above processes, a sequence of consecutive indexes of the DVRBs may be sequentially mapped to the sequence of consecutive indexes of the PRB1s without passing through the interleaver. Also, the sequence of consecutive indexes of the DVRBs may be cyclically shifted by the predetermined number without passing through the interleave and the cyclically shifted index sequence may be sequentially mapped to the sequence of consecutive indexes of the PRB2s.

According to the above-mentioned processes of mapping DVRBs to PRBs, a PRB1($i$) and a PRB2($i$) having the same index i can be mapped to a DVRB1($m$) and a DVRB2($n$) having different indexes m and n. For example, referring to FIGS. 6 and 7, a PRB1(1) and a PRB2($i$) are mapped to a DVRB1(6) and a DVRB2(9) having different indexes. A frequency diversity effect can be obtained based on the DVRB mapping scheme.

In the case where VRB(1)s, among the VRBs, are allocated as DVRBs as in FIG. 8, if the methods of FIGS. 6 and 7 are used, LVRBs cannot be assigned to a PRB2(6) and a PRB1(9) although VRBs have not been assigned yet to the PRB2(6) and PRB1(9). The reason is as follows: according to the aforementioned LVRB mapping scheme, that LVRBs are mapped to the PRB2(6) and PRB1(9) means that LVRBs are also mapped to a PRB1(6) and a PRB2(9); however, the PRB1(6) and PRB2(9) have already been mapped by the aforementioned VRB1(1) and VRB2(1). In this regard, it will be understood that the LVRB mapping may be restricted by the DVRB mapping results. Therefore, there is a need to determine DVRB mapping rules in consideration of the LVRB mapping.

In a broadband wireless mobile communication system using a multi-carrier, radio resources can be allocated to each terminal with a LVRB and/or DVRB scheme. The information indicating which scheme is used can be transmitted with a bitmap format. At this time, the allocation of radio resources to each terminal can be carried out in units of one RB. In this case, resources can be allocated with a granularity of '1' RB, but a large amount of bit overhead is required to transmit the allocation information with the bitmap format. Alternatively, an RB group (RBG) consisting of PRBs of k consecutive indexes (e.g., k=3) may be defined and resources may be allocated with a granularity of '1' RBG. In this case, the RB allocation is not sophisticatedly performed, but there is an advantage that bit overhead is reduced.

In this case, LVRBs can be mapped to PRBs on an RBG basis. For example, PRBs having three consecutive indexes, a PRB1($i$), PRB1(i+1), PRB1(i+2), PRB2($i$), PRB2(i+1) and PRB2(i+2), may constitute one RBG, and LVRBs may be mapped to this RBG in units of an RBG. However, in the case where one or more of the PRB1($i$), PRB1(i+1), PRB1(i+2), PRB2($i$), PRB2(i+1) and PRB2(i+2) were previously mapped by DVRBs, ibis RBG cannot be mapped by LVRBs on an RBG basis. That is, the DVRB mapping rules may restrict the RBG-unit LVRB mapping.

As mentioned above, because the DVRB mapping rules may affect the LVRB mapping, there is a need to determine the DVRB mapping rules in consideration of the LVRB mapping.

SUMMARY OF THE INVENTION

An object of the present invention devised to solve the problem lies on a resource scheduling method for efficiently combining scheduling of an FSS scheme and scheduling of an FDS scheme.

The object of the present invention can be achieved by providing, in a wireless mobile communication system that supports a resource allocation scheme in which one resource block group (RBG) including consecutive physical resource blocks is indicated by one bit, a resource block mapping method for distributively mapping consecutively allocated virtual resource blocks to the physical resource blocks, the method including: interleaving, using a block interleaver, indexes of the virtual resource blocks determined from a resource indication value (RIV) indicating a start index number of the virtual resource blocks and a length of the virtual resource blocks; and sequentially mapping the interleaved indexes to indexes of the physical resource blocks on a first slot of one subframe, the subframe including the first slot and a second slot, and sequentially mapping indexes obtained by cyclically shifting the interleaved indexes by a gap for the distribution to the indexes of the physical resource blocks on the second slot, wherein the gap is a multiple of a square of the number $M_{REG}$) of the consecutive physical resource blocks constituting the RBG When a degree of the block interleaver is defined as the number (C=4) of columns of the block interleaver, the number (R) of rows of the block interleaver may be given as in expression (1) and the number ($N_{null}$) of nulls filled in the block interleaver may be given as in expression (2).

$$R = N_{interleaver}/C = \lceil N_{DVRB}/(C \cdot M_{RBG}) \rceil \cdot M_{RBG}$$

$$N_{interleaver} \lceil N_{DVRB}/(C \cdot M_{RBG}) \rceil \cdot C \cdot M_{RBG} \quad \text{[Expression (1)]}$$

where $M_{RBG}$ is the number of the consecutive physical resource blocks constituting the RBG, and $N_{DVRB}$ is the number of the distributively allocated virtual resource blocks.

$$N_{null} = N_{interleaver} - N_{DVRB} = \lceil N_{DVRB}/(C \cdot M_{RBG}) \rceil \cdot C \cdot M_{RBG} - N_{DVRB}$$

$$N_{interleaver} = \lceil N_{DVRB}/(C \cdot M_{RBG}) \rceil \cdot C \cdot M_{RBG} \quad \text{[Expression (2)]}$$

where $M_{RBG}$ is the number of the consecutive physical resource blocks constituting the RBG, and $N_{DVRB}$ is the number of the distributively allocated virtual resource blocks.

A degree of the block interleaver may be equal to a diversity order ($N_{DivOrder}$) determined by the distribution.

When an index d of one of the distributively allocated virtual resource blocks is given, an index $P_{1,d}$ of corresponding one of the physical resource blocks on the first slot mapped to the index d may be given as in expression (3) and an index $P_{2,d}$ of corresponding one of the physical resource blocks on the second slot mapped to the index d may be given as in expression (4). Here, R is the number of rows of the block interleaver, C is the number of columns of the block interleaver, $N_{DVRB}$ is the number of resource blocks used for the distributively allocated virtual resource blocks, $N_{null}$ is the number of nulls filled in the block interleaver, and mod means a modulo operation.

$$p_{1,d} = \begin{cases} p'_{1,d} & \text{, when } N_{null} = 0 \text{ or}(d < N_{DVRB} - N_{null} \text{ and mod}(d, C) < 2) \\ p'_{1,d} - N_{null}/2 & \text{, when } N_{null} \neq 0 \text{ and } (d < N_{DVRB} - N_{null} \text{ and mod}(d, C) \geq 2) \end{cases}$$ [Expression (3)]

where $p'_{1,d} = \text{mod}(d, C) \cdot R + \lfloor d/C \rfloor$ $p_{1,d} =$ $\begin{cases} p'_{1,d} - R + N_{null}/2 & \text{, when } N_{null} \neq 0 \text{ and}(d \geq N_{DVRB} - N_{null} \text{ and mod}(d, C/2) = 0) \\ p'_{1,d} - R & \text{, when } N_{null} \neq 0 \text{ and}(d \geq N_{DVRB} - N_{null} \text{ and mod}(d, C/2) = 1) \end{cases}$ where $p'_{1,d} = \text{mod}(d, C/2) \cdot 2R + \lfloor 2d/C \rfloor$ $p_{2,d} = \text{mod}(p_{1,d} + N_{DVRB}/2, N_{DVRB})$  [Expression (4)]

Here, C may be equal to the degree of the block interleaver.

The index $P_{1,d}$ may be $p_{1,d}+N_{PRB}-N_{DVRB}$ when it is larger than $N_{DVRB}/2$, and the index $P_{2,d}$ may be $p_{2,d}+N_{PRB}-N_{DVRB}$ when it is larger than $N_{DVRB}/2$. Here, $N_{PRB}$ is the number of physical resource blocks in the system.

When the number ($N_{DVRB}$) of the virtual resource blocks is not a multiple of the degree of the block interleaver, the step of interleaving may include dividing the interleaver into groups of the number ($N_D$) of physical resource blocks to which one virtual resource block is mapped and uniformly distributing nulls to the divided groups.

The groups may correspond to rows of the block interleaver, respectively, when a degree of the block interleaver is the number of the rows of the block interleaver, and to columns of the block interleaver, respectively, when the degree of the block interleaver is the number of the columns of the block interleaver.

In another aspect of the present invention, provided herein is, in a wireless mobile communication system that supports a resource allocation scheme in which one resource block group (RBG) including consecutive physical resource blocks is indicated by one bit, a resource block mapping method for distributively mapping consecutively allocated virtual resource blocks to the physical resource blocks, the method including: interleaving, using a block interleaver, indexes of the virtual resource blocks determined from a resource indication value (RIV) indicating a start index number of the virtual, resource blocks and a length of the virtual resource blocks; and sequentially mapping the interleaved indexes to indexes of the physical resource blocks on it first slot of one subframe, the subframe including the first slot and a second slot, and sequentially mapping indexes obtained by cyclically shifting the interleaved indexes by a gap for the distribution to the indexes of the physical resource blocks on the second slot, wherein the gap ($N_{gap}$) for the distribution is given as in expression (5).

$N_{gap} = \text{round}(N_{PRB}/(2 \cdot M_{RBG}^2)) \cdot M_{RBG}^2$  [Expression (5)]

where $M_{RBG}$ is the number of the consecutive physical resource blocks constituting the RBG, and $N_{PRB}$ is the number of physical resource blocks in the system.

When nulls are allowed to be inputted the block interleaver, the number ($N_{DVRB}$) of the distributively allocated virtual resource blocks may be given as in expression (6).

$N_{DVRB} = \min(N_{PRB}-N_{gap}, N_{gap}) \cdot 2$  [Expression (6)]

When an index d of one of the distributively allocated virtual resource blocks is given, an index $P_{1,d}$ of corresponding one of the physical resource blocks on the first slot mapped to the index d may be $p_{1,d}+N_{PRB}-N_{DVRB}$ when it is larger than $N_{DVRB}/2$, and an index $P_{2,d}$ of corresponding one of the physical resource blocks on the second slot mapped to tire index d may be $p_{2,d}+N_{PRB}-N_{DVRB}$ when it is larger than $N_{DVRB}/2$, wherein $N_{DVRB}$ is the number of resource blocks used for distributively allocated virtual resource blocks.

In another aspect of the present invention, provided herein is, in a wireless mobile communication system that supports a resource allocation scheme is which one resource block group (RBG) including consecutive physical resource blocks is indicated by one bit, a resource block mapping method for distributively mapping consecutively allocated virtual resource blocks to the physical resource blocks, the method including: detecting a resource indication value (RIV) indicating a start index number of the virtual resource blocks and a length of the virtual resource blocks and determining indexes of the virtual resource blocks from the detected resource indication value; and interleaving the determined indexes of the virtual resource blocks using a block interleaver and distributively mapping the virtual resource blocks to the physical resource blocks, wherein a degree of the block interleaver is equal to a diversity order ($N_{DivOrder}$) determined by the distribution.

In another aspect of the present invention, provided herein is, in a wireless mobile communication system that supports a resource allocation scheme in which one resource block group (RBG) including consecutive physical resource blocks is indicated by one bit, a resource block mapping method for distributively mapping consecutively allocated virtual resource blocks to the physical resource blocks, the method including: determining indexes of the virtual resource blocks from a resource indication value (RIV) indicating a start index number of the virtual resource blocks and a length of the virtual resource blocks; and interleaving the determined indexes of the virtual resource blocks using a block interleaver and distributively mapping the virtual resource blocks to the physical resource blocks, wherein, when the number ($N_{DVRB}$) of the virtual resource blocks is not a multiple of a degree of the block interleaver, the step of mapping includes dividing the interleaver into groups of the number ($N_D$) of physical resource blocks to which one virtual resource block is mapped and uniformly distributing nulls to the divided groups.

The groups may correspond to rows of the block interleaver, respectively, when a degree of the block interleaver is the number of the rows of the block interleaver, and to columns of the block interleaver, respectively, when the degree of the block interleaver is the number of the columns of the block interleaver.

The control information may be a DCI transmitted over a PDCCH.

The gap may be a function of a system bandwidth.

When an index p of one of the physical resource blocks is given, an interleaved index $d_{p1}$ mapped to the index p may be given as in expression (7) or expression (8), and a cyclically shifted index $d_{p2}$ mapped to the index p may be given as in expression (9) or expression (10). Here, R is the number of rows of the block interleaver, C is the number of columns of the block interleaver, $N_{DVRB}$ is the number of resource blocks used for the distributively allocated virtual resource blocks, and mod means a modulo operation.

$$d_{p_1} = \mod(p', R) \cdot C + \lfloor p'/R \rfloor \quad \text{[Expression (7)]}$$
where
$$p' = \begin{cases} p+1 & , \text{when } \mod(N_{DVRB}, C) \neq 0 \text{ and } p \geq 2R-1 \text{ and } p \neq 3R-2 \\ 2R-1 & , \text{when } \mod(N_{DVRB}, C) \neq 0 \text{ and } p = 3R-2 \\ p & , \text{when } \mod(N_{DVRB}, C) = 0 \text{ or } p < 2R-1 \end{cases}$$

$$d_{p_1} - \mod(p', R) \cdot C + \lfloor p'/R \rfloor \quad \text{[Expression (8)]}$$
where
$$p' = \begin{cases} p+1 & , \text{when } \mod(N_{DVRB}, C \neq 0 \text{ and } p \geq 2R-1 \text{ and } p \neq 3R-2 \\ 2R-1 & , \text{when } \mod(N_{DVRB}, C) \neq 0 \text{ and } p = 3R-2 \\ p & , \text{when } \mod(N_{DVRB}, C) = 0 \text{ or } p < 2R-1 \end{cases}$$

$$d_{p_2} = \mod(p'', R) \cdot C + \lfloor p''/R \rfloor \quad \text{[Expression (9)]}$$
where
$$p'' = \begin{cases} p''' + 1 & , \text{when } \mod(N_{DVRB}, C) \neq 0 \text{ and } p''' \geq 2R-1 \text{ and } p''' \neq 3R-2 \\ 2R-1 & , \text{when } \mod(N_{DVRB}, C) \neq 0 \text{ and } p''' = 3R-2 \\ p''' & , \text{when } \mod(N_{DVRB}, C) = 0 \text{ or } p''' < 2R-1 \end{cases}$$
where
$$p''' - \mod(p + N_{DVRB}/2, N_{DVRB})$$

$$d_{p_2} = \begin{cases} d_{p1} - 2 & , \text{when } \mod(d_{p1}, C) \geq 2 \\ d_{p1} + 2 & , \text{when } \mod(d_{p1}, C) < 2 \text{ and } d_{p1} \neq N_{DVRB} - 2 \text{ and } d_{p1} \neq N_{DVRB} - 1 \\ N_{DVRB} - 1 & , \text{when } \mod(d_{p1}, C) < 2 \text{ and } d_{p1} = N_{DVRB} - 2 \\ N_{DVRB} - 2 & , \text{when } \mod(d_{p1}, C) < 2 \text{ and } d_{p1} = N_{DVRB} - 1 \end{cases} \quad \text{[Expression (10)]}$$

The diversity order ($N_{DivOrder}$) may be a multiple of the number ($N_D$) of physical resource blocks to which one virtual resource block is mapped.

The gap may be 0 when the number of the virtual resource blocks is larger than or equal to a predetermined threshold value ($M_{th}$).

The resource block mapping method may further include receiving information about the gap, the gap being determined by the received gap information.

In another aspect of the present invention, provided herein is, in a wireless mobile communication system that supports an RBG resource allocation scheme and a subset resource allocation scheme, a resource block mapping method for distributively mapping consecutively allocated virtual resource blocks to physical resource blocks, the method including: receiving control information including resource block allocation information indicating distributed allocation of the virtual resource blocks, and indexes of the virtual resource blocks; and interleaving the indexes of the virtual resource blocks using a block interleaver, wherein the step of interleaving includes, until the indexes of the virtual resource blocks are mapped to all indexes of physical resource blocks belonging to any one of a plurality of RBG subsets, preventing the indexes of the virtual resource blocks from being mapped to indexes of physical resource blocks belonging to a different one of the RBG subsets.

The resource block mapping method may further include sequentially mapping the interleaved indexes to indexes of the physical resource blocks on a first slot of one subframe, the subframe including the first slot and a second slot, and sequentially mapping indexes obtained by cyclically shifting the interleaved indexes by a gap for the distribution to the indexes of the physical resource blocks on the second slot, wherein the gap for the distribution is determined such that the virtual resource blocks mapped on the first slot and the virtual resource blocks mapped on the second slot are included in the same subset.

The number ($N_{DVRB}$) of the virtual resource blocks may be a multiple of a diversity order ($N_{DivOrder}$) determined by the distribution.

The number ($N_{DVRB}$) of the virtual resource blocks may be a multiple of the number $M_{RBG}$ of the consecutive physical resource blocks constituting the RBG.

The number ($N_{DVRB}$) of the virtual resource blocks may be a multiple of a value obtained by multiplying the number $M_{RBG}$ of the consecutive physical resource blocks constituting the RBG by the number ($N_D$) of physical resource blocks to which one virtual resource block is mapped.

The number ($N_{DVRB}$) of the virtual resource blocks may be a multiple of a value obtained by multiplying the square ($M_{RBG}^2$) of the number of the consecutive physical resource blocks constituting the RBG by the number ($N_D$) of physical resource blocks to which one virtual resource block is mapped.

The number $N_{DVRB}$ of the virtual resource blocks may be a common multiple of a value obtained by multiplying the number ($M_{RBG}$) of the consecutive physical resource blocks constituting the RBG by the number ($N_D$) of physical resource blocks to which one virtual resource block is mapped and a degree (D) of the block interleaver.

The degree (D) of the block interleaver may be a multiple of the number ($N_D$) of physical resource blocks to which one virtual resource block is mapped.

The number $N_{DVRB}$ of the virtual resource blocks may be a common multiple of a value obtained by multiplying a square ($M_{RBG}^2$) of the number of the consecutive physical resource blocks constituting the RBG by the number ($N_D$) of physical resource blocks to which one virtual resource block is mapped, and a degree (D) of the block interleaver.

The degree (D) of the block interleaver may be a multiple of the number ($N_D$) of physical resource blocks to which one virtual resource block is mapped.

The number $N_{DVRB}$ of the virtual resource blocks may be a common multiple of a value obtained by multiplying a degree (D) of the block interleaver by a square ($M_{RBG}^2$) of the number of the consecutive physical resource blocks constituting the RBG and a value obtained by multiplying the number ($N_D$) of physical resource blocks to which one virtual resource block is mapped by the square ($M_{RBG}^2$) of the number of the consecutive physical resource blocks constituting the RBG.

The degree (D) of the block interleaver may be a multiple of the number ($N_D$) of physical resource blocks to which one virtual resource block is mapped.

The aforementioned various aspects of the present invention are all applicable to a base station and/or mobile station. In the case where the aforementioned aspects of the present invention are applied to the mobile station, the resource block mapping method may further include receiving the resource indication value (RIV) from the mobile station of the wireless mobile communication system, prior to the step of interleaving or the step of determining the indexes of the virtual resource blocks.

According to the present invention, it is possible to efficiently combine scheduling of as FSS scheme and scheduling of an FDS scheme and simply implement a scheduling information transfer method.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 5 is a view illustrating an example of a method for mapping LVRBs to PRBs.

FIG. 11 is a view illustrating an example of a method for mapping four DVRBs having consecutive indexes to a plurality of spaced PRBs.

DETAILED DESCRIPTION OF THE INVENTION

Figure 1:
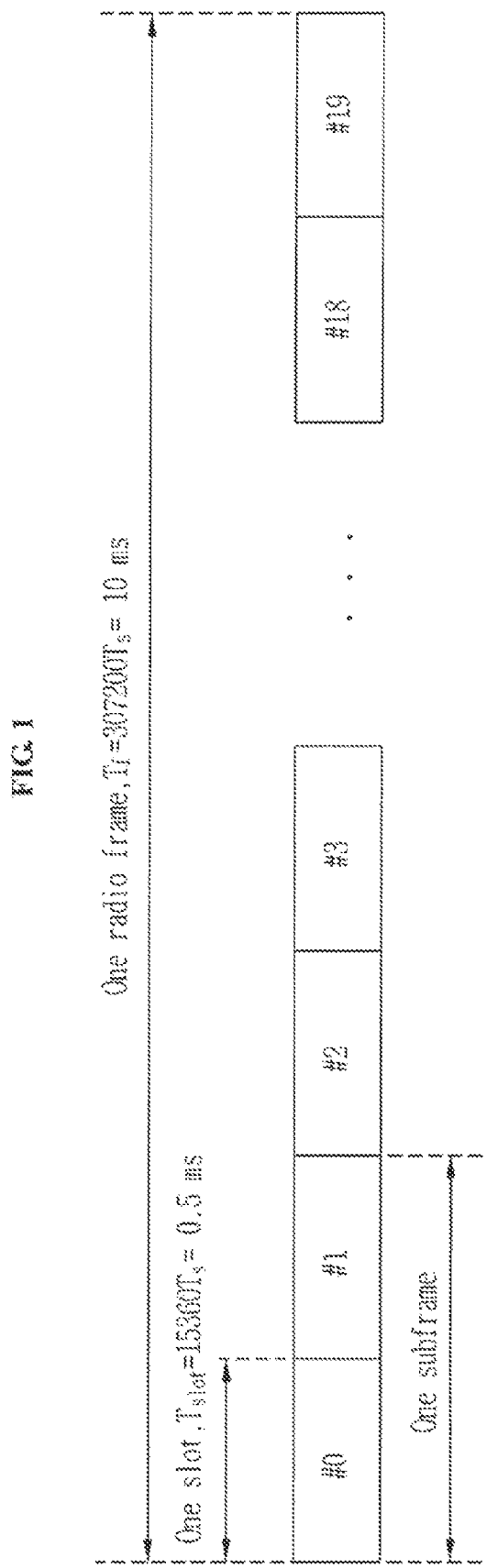
FIG. 1 is a view showing an example of a radio frame structure applicable to FDD.
Figure 2:
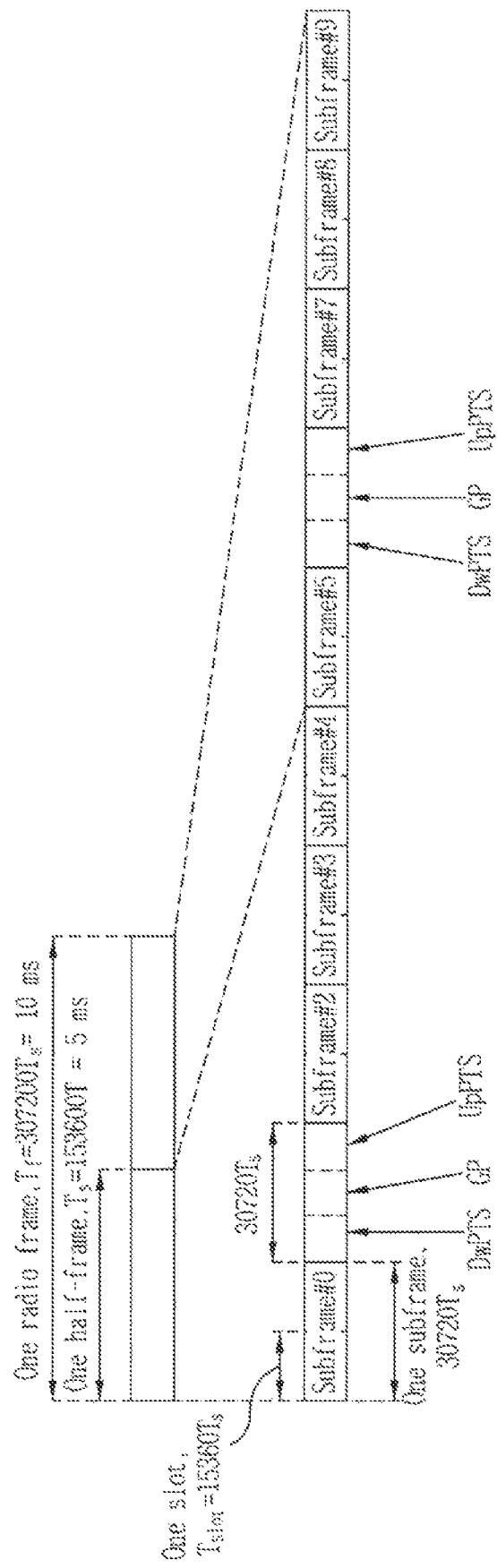
FIG. 2 is a view showing au example of a radio frame structure applicable to TDD.
Figure 3:
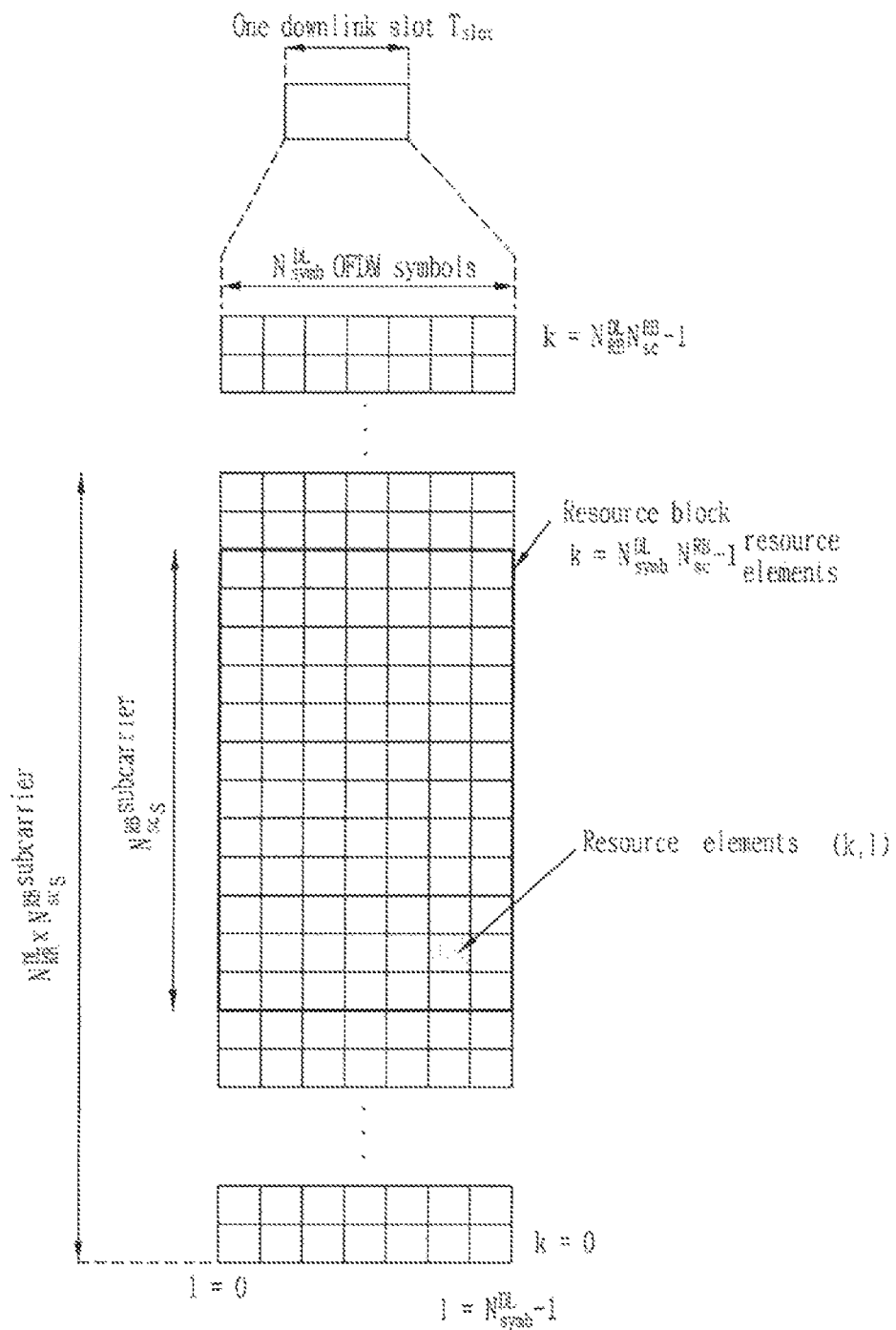
FIG. 3 is a view showing an example of a resource grid structure constituting a 3GPP transmission slot.
Figure 4:
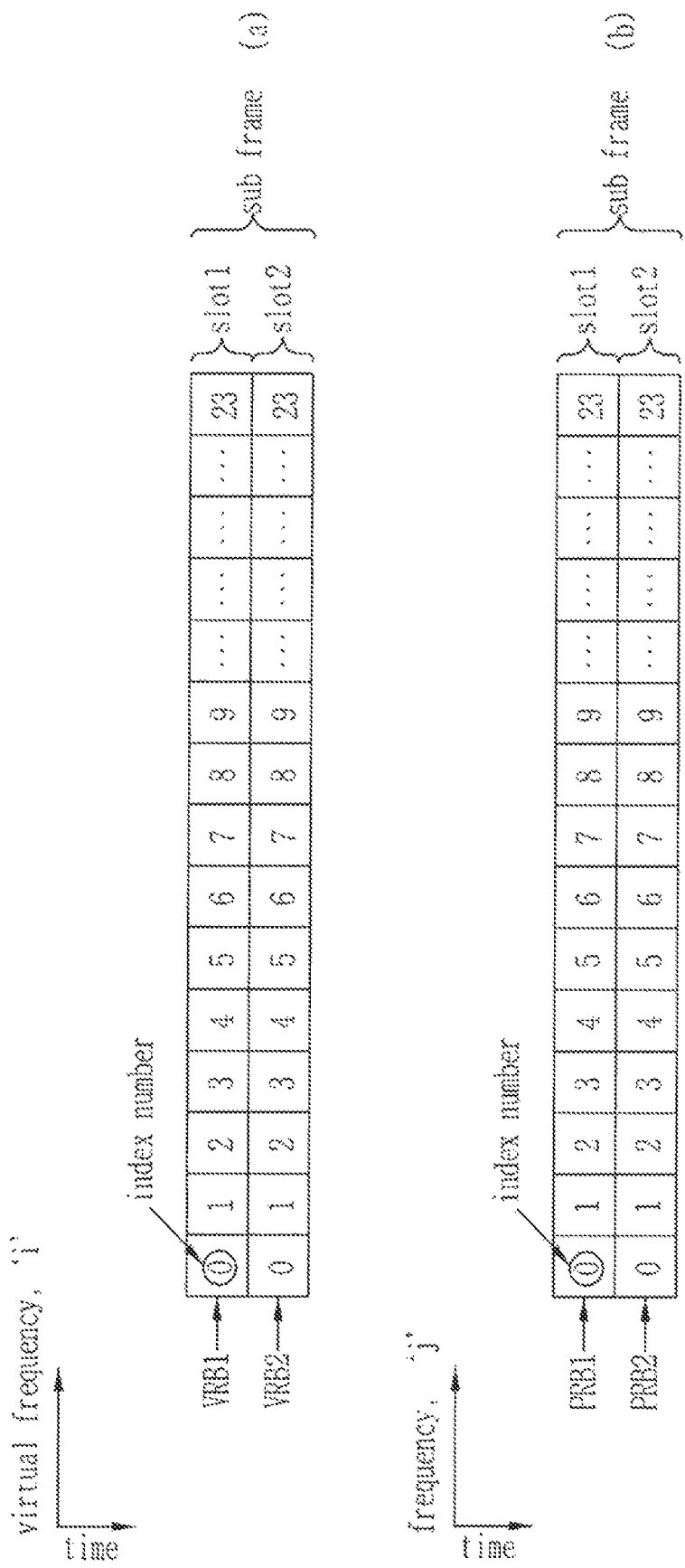
FIG. 4a is a view showing an example of the structure of VRBs in one subframe.
FIG. 4b is a view showing an example of the structure of PRBs in one subframe.
Figure 6:
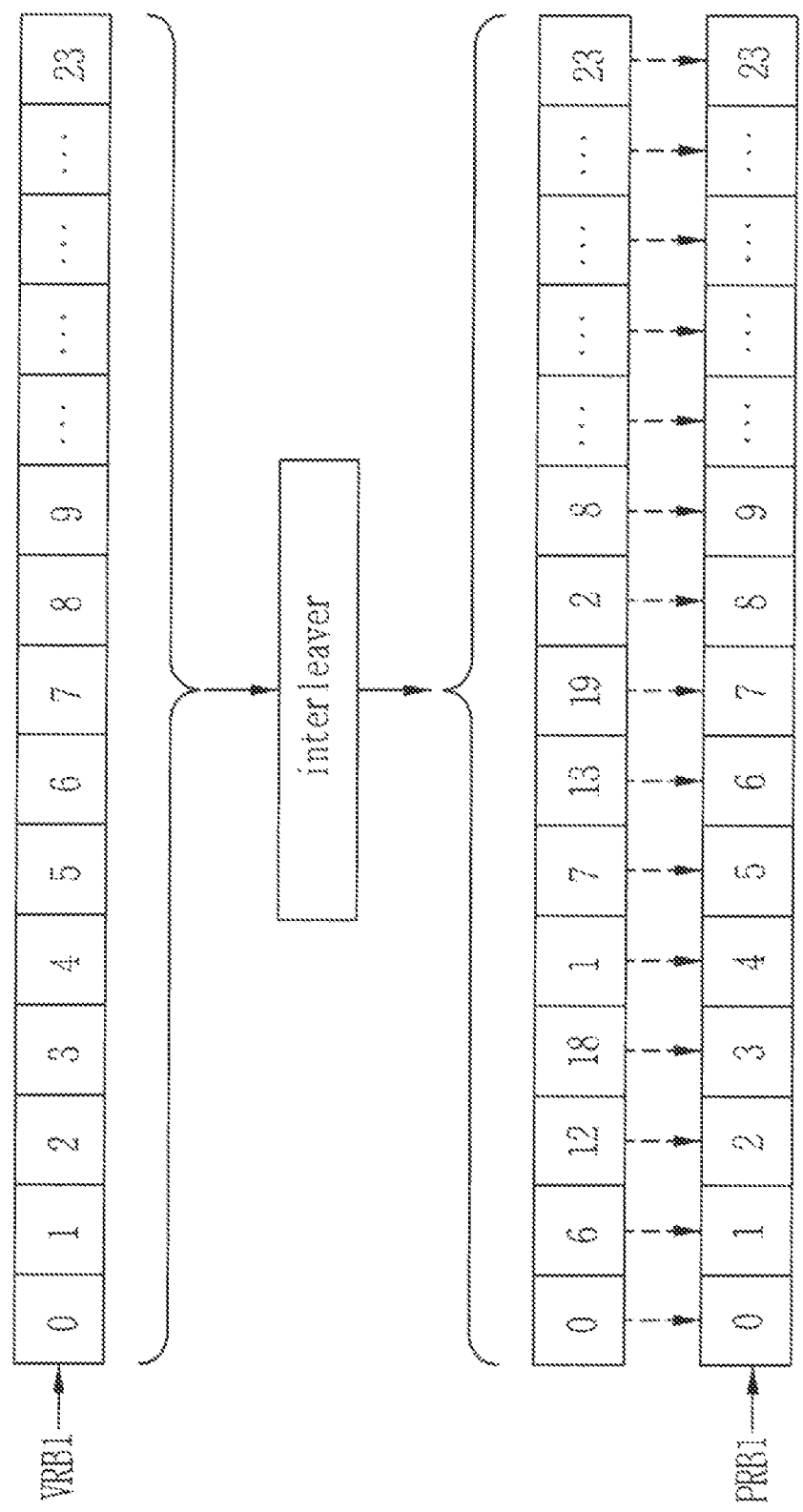
FIG. 6 is a view illustrating an example of a method for mapping DVRBs in a first slot to PRBs.
Figure 7:
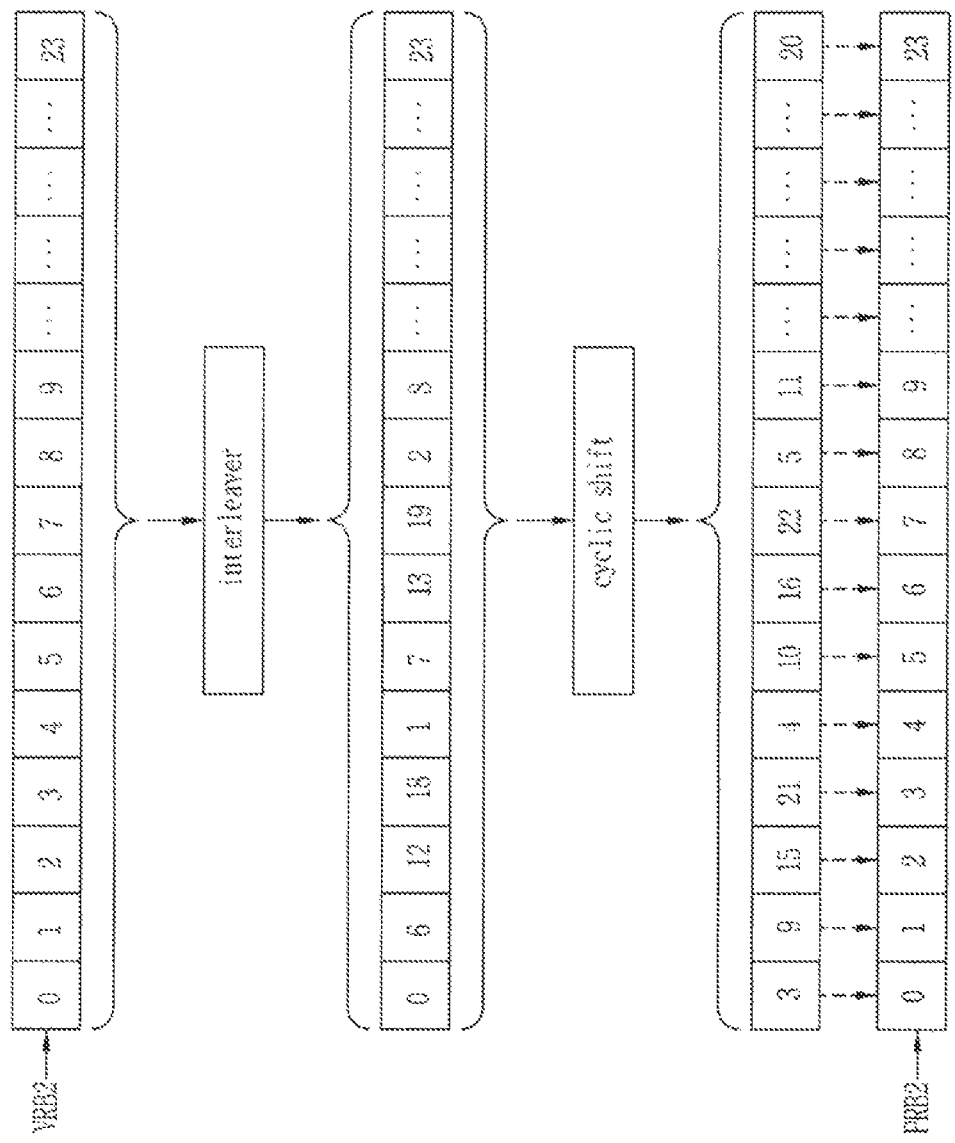
FIG. 7 is a view illustrating an example of a method for mapping DVRBs in a second slot to PRBs.
Figure 8:
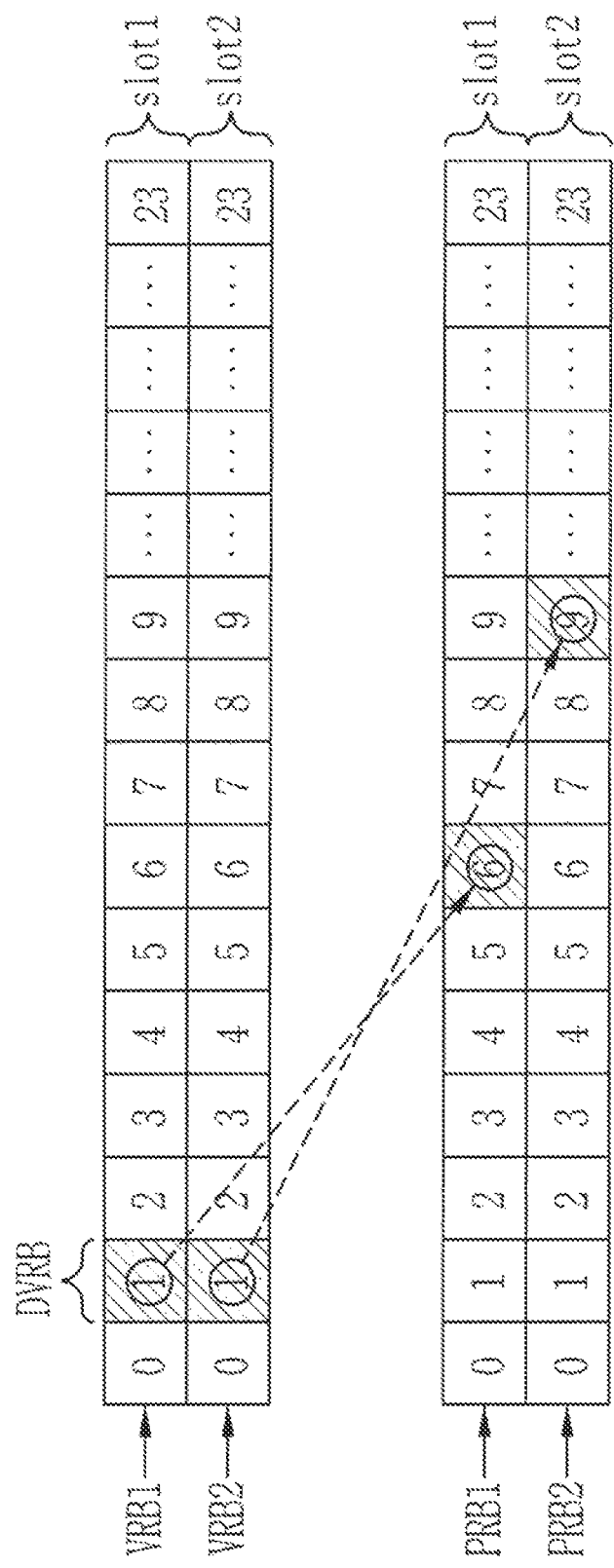
FIG. 8 is a view illustrating an example of a method for mapping DVRBs to PRBs.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering around specific terms, but the present invention is not limited thereto and any other terms may be used to represent the same meanings. Also, wherever possible, the same reference numbers will be used throughout the drawings to refer to the same or like parts.

In the case where a subframe consists of a first slot and a second slot, index(PRB1(i)) represents an index of a PRB of an ith frequency band of the first slot, index(PRB2(j)) represents an index of a PRB of a jth frequency band of the second slot, and a relationship of index(PRB1(k))=index(PRB2(k)) is established, as stated previously. Also, index(VRB1(i)) represents an index of a VRB of an ith virtual frequency band of the first slot, index(VRB2(j)) represents an index of a VRB of a jth virtual frequency band of the second slot, and a relationship of index(VRB1(k))=index(VRB2(k)) is established. At this time, VRB1s are mapped to PRB1s and VRB2s are mapped to PRB2s. Also, VRBs are classified into DVRBs and LVRBs.

The rates for mapping LVRB1s to PRB1s and the rules for mapping LVRB2s to PRB2s are the same. However, the rules for mapping DVRB1s to PRB1s and the rules for mapping DVRB2s to PRB2s are different. That is, DVRBs are 'divided' and mapped to PRBs.

In the 3GPP, one RB is defined in units of one slot. However, in the detailed description of the invention, one RB is defined in units of one subframe, and this RB is divided into $N_D$ sub-RBs on a time axis, so that the DVRB mapping rules are generalized and described. For example, in the case where $N_D=2$, a PRB defined in units of one subframe is divided into a first sub-PRB and a second sub-PRB, and a VRB defined in units of one sub-frame is divided into a first sub-VRB and a second sub-VRB.

In this case, the first sub-PRB corresponds to the aforementioned PRB1, and the second sub-PRB corresponds to the aforementioned PRB2. Also, the first sub-VRB corresponds to the aforementioned VRB1, and the second sub-VRB corresponds to the aforementioned VRB2. Also, in both the detailed description of the invention and the 3GPP the DVRB mapping rules for obtaining a frequency effect is described on the basis of one subframe. Therefore, it will be understood that all embodiments of the detailed description of the invention are concepts including an RB mapping method in the 3GPP.

Hereinafter, terms used in the detailed description of this application are defined as follows.

A 'resource element (RE)' represents a smallest frequency-time unit in which data or a modulated symbol of a control channel is mapped. Provided that a signal is transmitted in one OFDM symbol over M subcarriers and N OFDM symbols are transmitted in one subframe, M×N REs are present in one subframe.

A 'physical resource block (PRB)' represents a unit frequency-time resource for data transmission. In general, one PRB consists of a plurality of consecutive REs in a frequency-time domain, and a plurality of PRBs are defined in one subframe.

A 'virtual resource block (VRB)' represents a virtual unit resource for data transmission. In general, the number of REs included in one VRB is equal to that of RBs included in one PRB, and, when data is transmitted, one VRB can be mapped to one PRB or some areas of a plurality of PRBs.

A 'localized virtual resource block (LVRB)' is one type of the VRB. One LVRB is mapped to one PRB. A PRB mapped to one LVRB is different from a PRB mapped to another LVRB.

A 'distributed virtual resource block (DVRB)' is another type of the VRB. One DVRB is mapped to a plurality of PRBs in a distributed manner.

Figure 9:
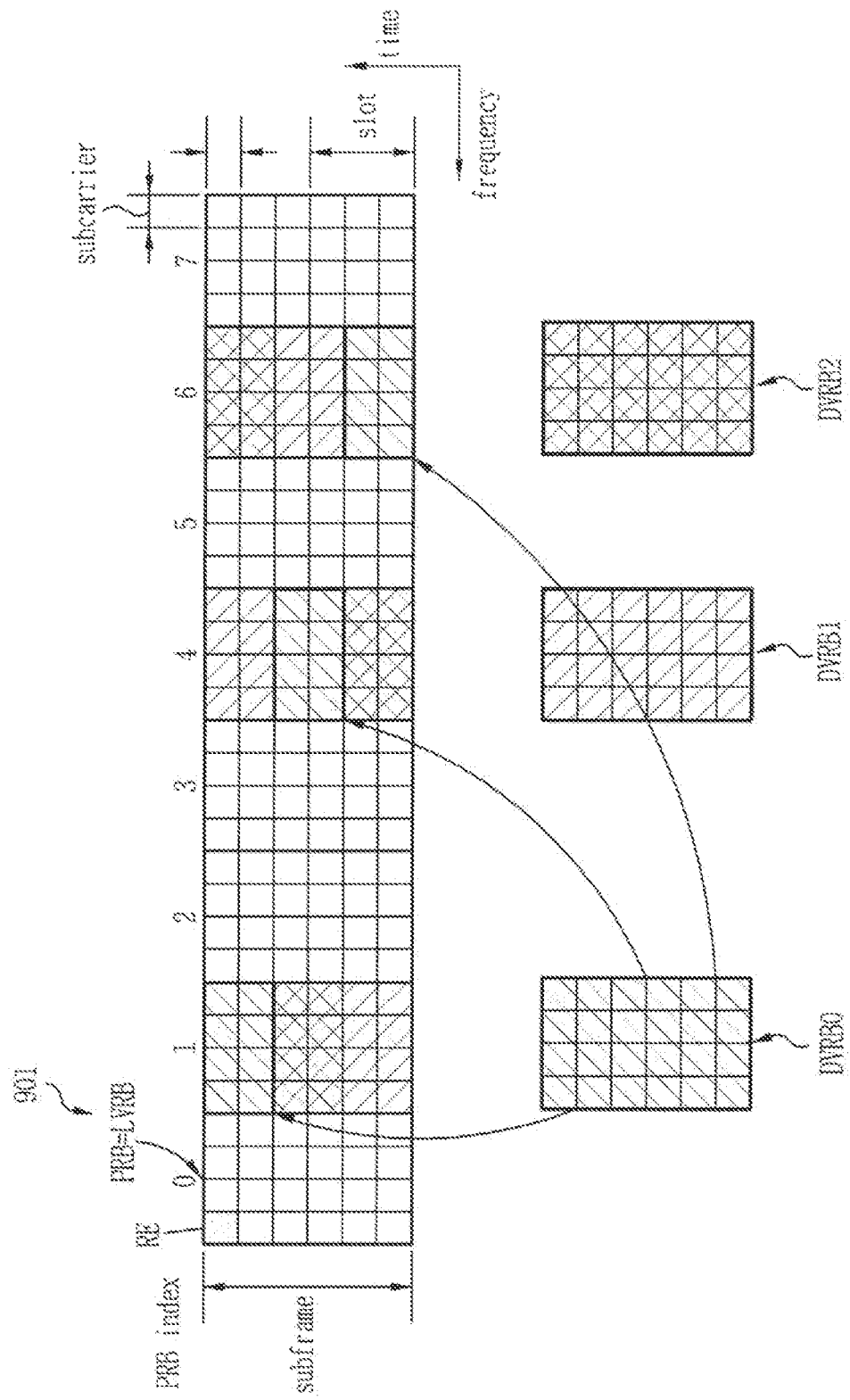
FIG. 9 is a view illustrating an example of a method for mapping DVRBs and LVRBs to PRBs.

'$N_D$'='$N_d$' represents the number of PRBs to which one DVRB is Mapped. FIG. 9 illustrates an example of a method for mapping DVRBs and LVRBs to PRBs. In FIG. 9, $N_D=3$. An arbitrary DVRB can be divided into three parts and the divided parts can be mapped to different PRBs, respectively. At this time, the remaining part of each PRB, not mapped by the arbitrary DVRB, is mapped by a divided part of a different DVRB.

'$N_{PRB}$' represents the number of PRBs in a system. In the case where the band of the system is divided. $N_{PRB}$ may be the number of PRBs in the divided part.

'$N_{LVRB}$' represents the number of LVRBs available in the system.

'$N_{DVRB}$' represents the number of DVRBs available in the system.

'$N_{LVRB\_UE}$' represents the maximum number of LVRBs allocable to one user equipment (UE).

'$N_{DVRB\_UE}$' represents the maximum number of DVRBs allocable to one UE.

'$N_{subset}$' represents the number of subsets.

'$N_{DivOrder}$' represents a diversity order required in the system. Here, the diversity order is defined by the number of RBs which are not adjacent to each other.

Here, the "number of RBs" means the number of RBs divided on a frequency axis. That is, even in the case where RBs can be divided by time slots constituting a subframe, the "number of RBs" means the number of RBs divided on the frequency axis of the same slot.

FIG. 9 shows an example of definitions of LVRBs and DVRBs.

As can be seen from FIG. 9, each RE of one LVRB is one-to-one mapped to each RE of one PRB. For example, one LVRB is snapped to a PRB0(901). In contrast, one DVRB is divided into three parts and the divided parts are mapped to Different PRBs, respectively. For example, a DVRB0 is divided into three parts and the divided parts are mapped to a PRB1, PRB4 and PRB6, respectively. Likewise, a DVRB1 and a DVRB2 are each divided into three parts and the divided parts are mapped to the remaining resources of the PRB1, PRB4 and PRB6. Although each DVRB is divided into three parts in this example, the present invention is not limited thereto. For example, each DVRB may be divided into two parts.

Downlink data transmission from a base station to a specific terminal or uplink data transmission from the specific terminal to the base station is made through one or more VRBs in one subframe. When the base station transmits data to the specific terminal, it has to notify the terminal of which one of the VRBs is used for data transmission. Also, in order to enable the specific terminal to transmit data, the base station has to notify the terminal of which one of the VRBs is allowed to use for data transmission.

Data transmission schemes can be broadly classified into a frequency diversity scheduling (FDS) scheme and a frequency selective scheduling (FSS) scheme. The FDS scheme is a scheme that obtains a reception performance gain through frequency diversity, and the FSS scheme is a scheme that obtains a reception performance gain through frequency selective scheduling.

In the FDS scheme, a transmission stage transmits one data packet over subcarriers widely distributed is a system frequency domain so that symbols in the data packet can experience various radio channel fadings. Therefore, an improvement in reception performance is obtained by preventing the entire data packet from being subject to unfavorable fading. In contrast, in the FSS scheme, an improvement in reception performance is obtained by transmitting the data packet over one or more consecutive frequency areas in the system frequency domain which are in a favorable fading state. In a cellular OFDM wireless packet communication system, a plurality of terminals are present in one cell. At this time, because the radio channel conditions of the respective terminals have different characteristics, it is necessary to perform data transmission of the FDS scheme with respect to a certain terminal and data transmission of the FSS scheme with respect to a different terminal even within one subframe. As a result, a detailed FDS transmission scheme and a detailed FSS transmission scheme must be designed such that the two schemes can be efficiently multiplexed within one subframe. On the other hand, in the FSS scheme, a gain can be obtained by selectively using a band favorable to a UE among all available bands. In contrast, in the FDS scheme, an evaluation is not made as to whether a specific band is good or bad, and, as long as a frequency separation capable of adequately obtaining a diversity is maintained, there is no need to select and transmit a specific frequency band. Accordingly, it is advantageous to an improvement in entire system performance to perform the frequency selective scheduling of the FSS scheme preferentially when scheduling.

In the FSS scheme, because data is transmitted using subcarriers consecutively contiguous in the frequency domain, it is preferable that the data is transmitted using LVRBs. At this time, provided the $N_{PRB}$ PRBs are present in one subframe and a maximum of $N_{LVRB}$ LVRBs are available within the system, the base station can transmit bitmap information of $N_{LVRB}$ bits to each terminal to notify the terminal of which one of the LVRBs through which downlink data will be transmitted or which one of the LVRBs through which uplink data can be transmitted. That is, each bit of the $N_{LVRB}$-bit bitmap information, which is transmitted to each terminal as scheduling information, indicates whether data will or can be transmitted through an LVRB corresponding to this bit, among the $N_{LVRB}$ LVRBs. This scheme is disadvantageous in that, when the number becomes larger, the number of hits to be transmitted to each terminal becomes larger in proportion thereto.

On the other hand, provided that a terminal can be allocated only one set of contiguous RBs, information of the allocated RBs can be expressed by a start point of the RBs and the number thereof. This scheme is referred to as a 'compact scheme' in this document.

Figure 10:
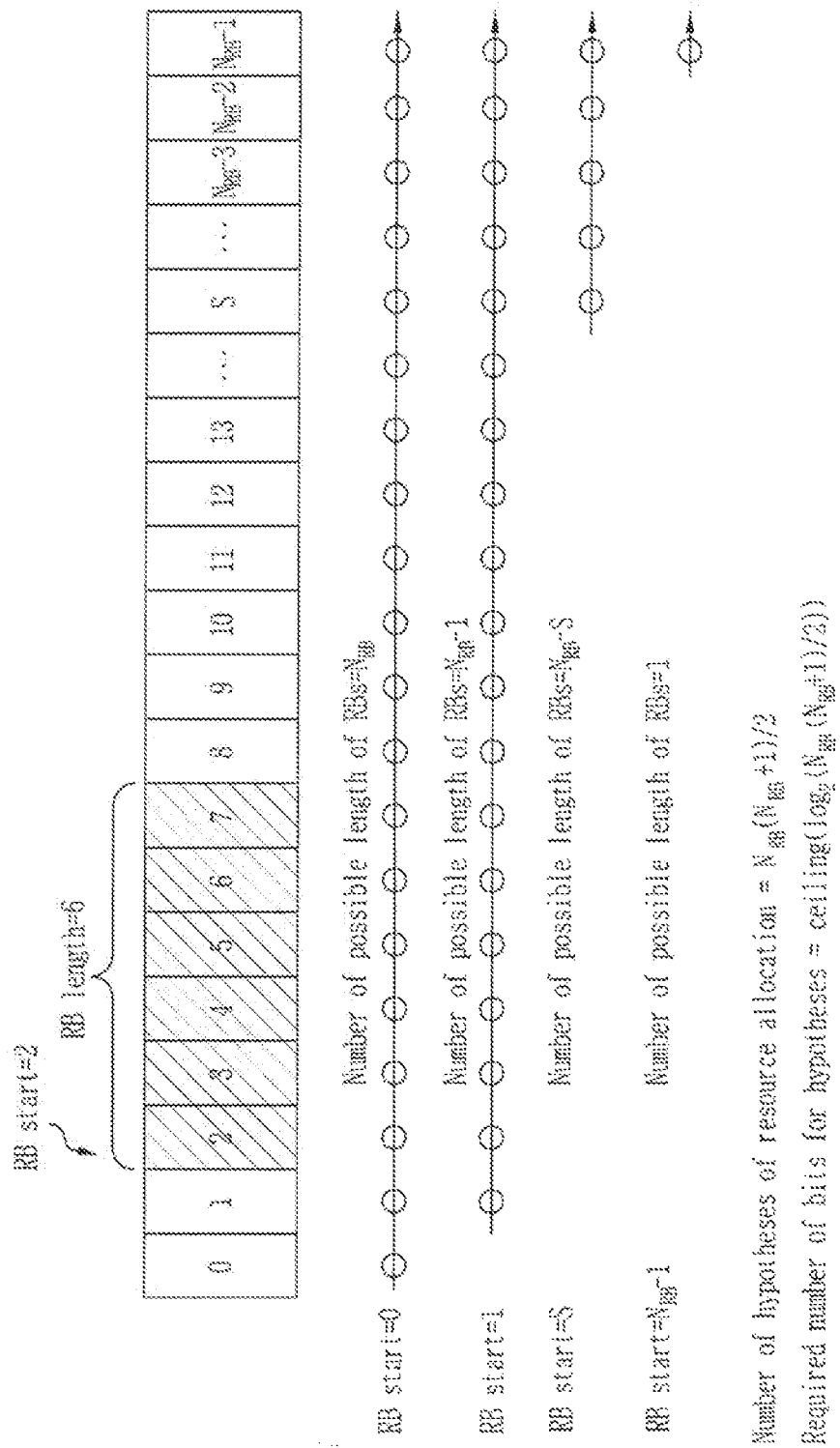
FIG. 10 is a view illustrating an example of a method for allocating resource blocks by a compact scheme.

FIG. 10 illustrates an example of a method for allocating resource blocks by the compact scheme.

In this case, as shown in FIG. 10, the length of available RBs is different depending on perspective start points, and the number of combinations of RB allocation is $N_{LVRB}(N_{LVRB}+1)/2$ in the end. Accordingly, the number of bits required for the combinations is ceiling($\log_2(N_{LVRB}(N_{LVRB}+1)/2)$). Here, ceiling(x) means rounding "x" up to a nearest integer. This method is advantageous over the bitmap scheme in that the number of bits does not so significantly increase with the increase in the number $N_{LVRB}$.

On the other hand, for a method for notifying a user equipment (UE) of DVRB allocation, it is necessary to previously promise the positions of respective divided parts of DVRBs distributively transmitted for a diversity gain. Alternatively, additional information may be required to directly notify the positions. Preferably, provided that the number of bits for signaling for the DVRBs is set to be equal to the number of bits in LVRB transmission of the above-stated compact scheme. It is possible to simplify a signaling bit format in a downlink. As a result, there are advantages that the same channel coding can be used, etc.

Here, in the case where one UE is allocated a plurality of DVRBs, this UE is notified of a DVRB index of a start point of thy DVRBs, a length(=the number of the allocated DVRBs), and a relative position difference between divided parts of each DVRB (e.g., a gap between the divided parts).

Figure 11:
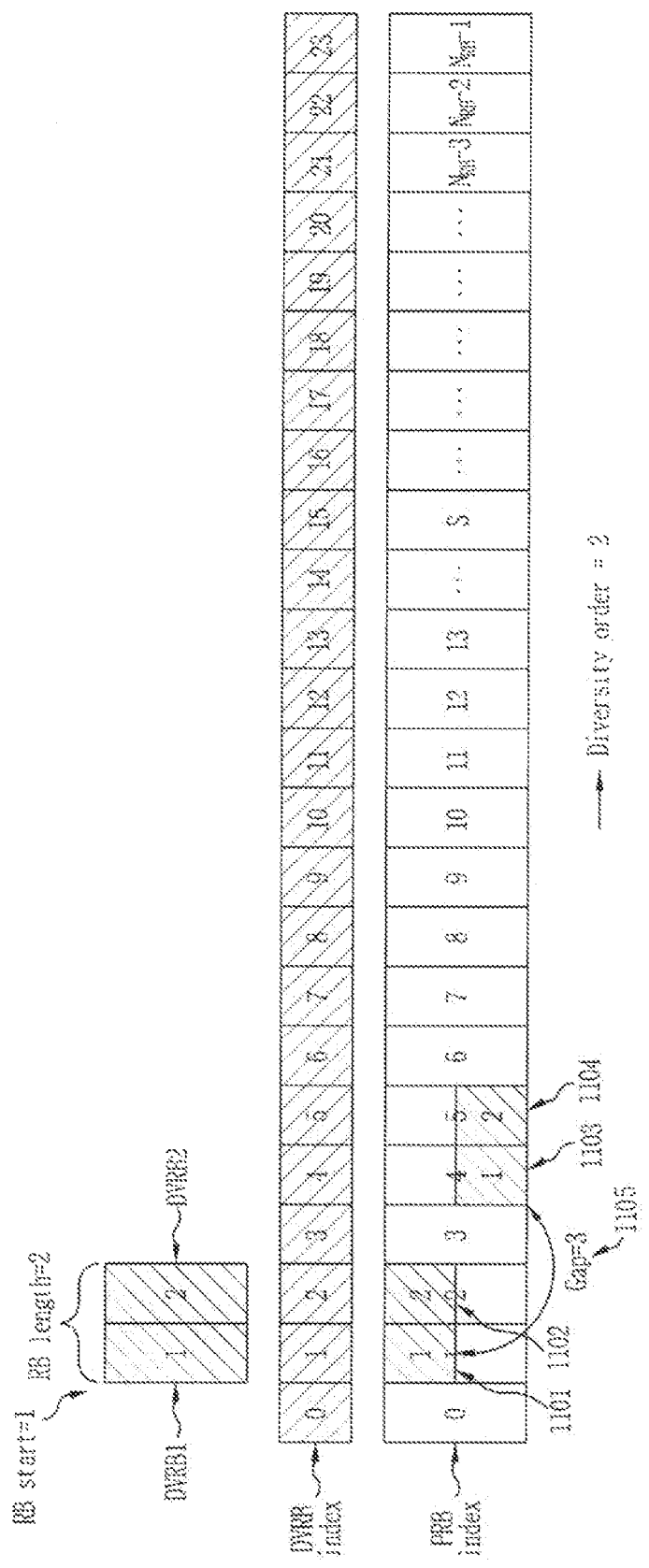
FIG. 11 is a view illustrating an example of a method for mapping two DVRBs having consecutive indexes to a plurality of contiguous PRBs.

FIG. 11 illustrates an example of a method for mapping two DVRBs having consecutive indexes to a plurality of contiguous PRBs.

As shown in FIG. 11, in the case where a plurality of DVRBs having Consecutive indexes are mapped to a plurality of contiguous PRBs, first divided parts 1101 and 1102 and second divided parts 1103 and 1104 are spaced part from each other by a gap 1105, while divided parts belonging to each of the upper divided parts and lower divided parts are contiguous to each other, so that the diversity order becomes 2.

Figure 12:
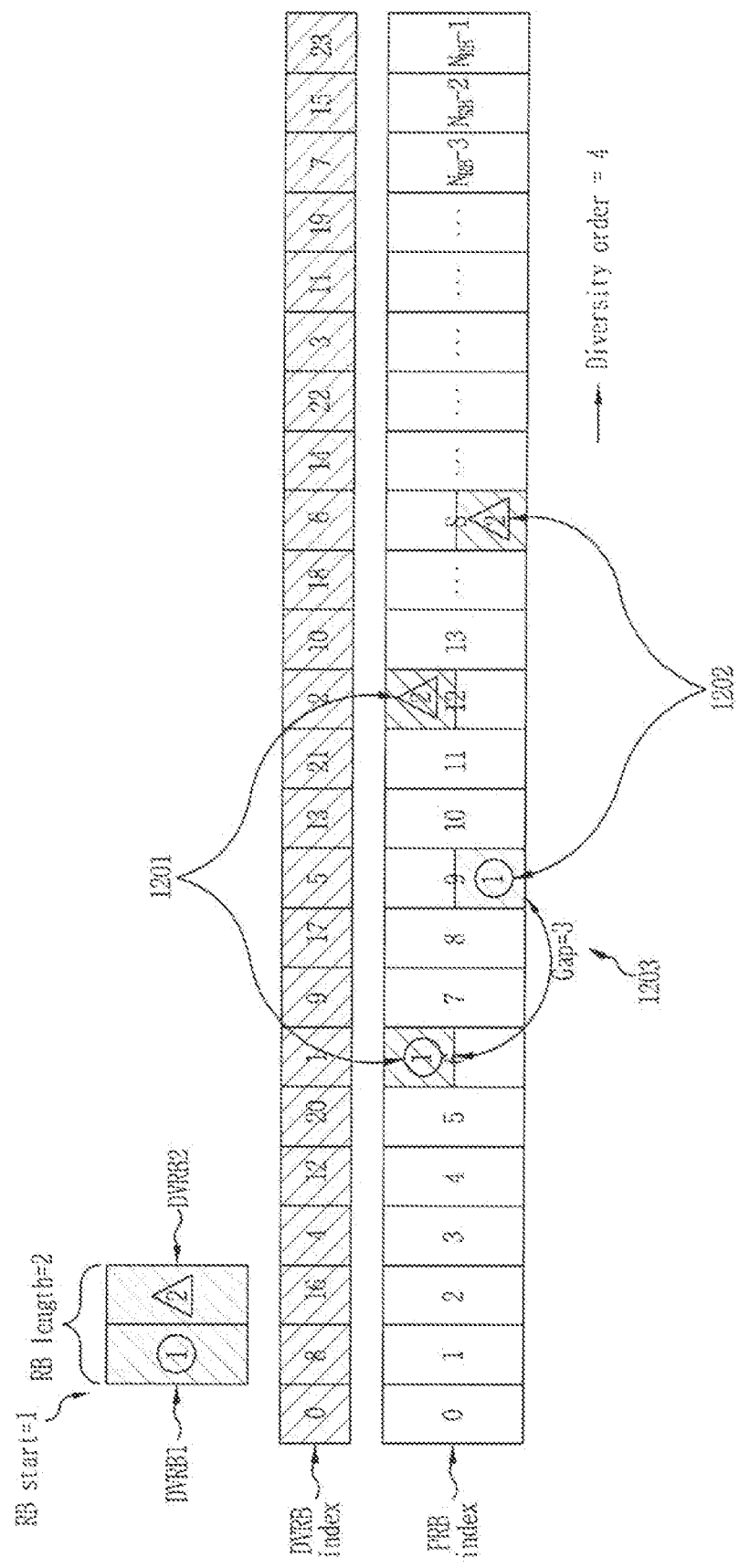
FIG. 12 is a view illustrating an example of a method for mapping two DVRBs having consecutive indexes to a plurality of spaced PRBs.

FIG. 12 illustrates an example of a method for mapping two DVRBs having consecutive indexes to a plurality of spaced PRBs. In this application, 'spaced PRBs' means that the PRBs are not adjacent to each other.

In the method of FIG. 12, when allowing DVRBs to correspond to PRBs, consecutive DVRB indexes can be allowed to be distributed, not correspond to contiguous PRBs. For example, a DVRB index '0' and a DVRB index '1' are not arranged contiguous to each other. In other words, in FIG. 12, DVRB indexes are arranged in the order of 0, 8, 16, 4, 12, 20, . . . , and this arrangement can be obtained by inputting the consecutive indexes shown in FIG. 11 to, for example, a block interleaver. In this case, it is possible to obtain distribution within each of divided parts 1201 and 1202, as well as distribution by a gap 1203. Therefore, when a UE is allocated two DVRBs m shown in FIG. 12, the diversity order increases to 4, resulting in an advantage that the diversity gain can be obtained still more.

At this time, the value of the gap indicative of the relative position difference between the divided parts can be expressed in two ways. Firstly, the gap value can be expressed by a difference between DVRB indexes. Secondly, the gap value can be expressed by a difference between indexes of PRBs to which a DVRB is mapped. In the case of FIG. 12, Gap=1 in the first way, while Gap=3 in the second way. FIG. 12 shows the latter case 1203. Meanwhile, if the total number of RBs of the system is changed, the DVRB index arrangement may be changed accordingly. In this case, the use of the second way has the advantage of grasping a physical distance between the divided parts.

Figure 13:
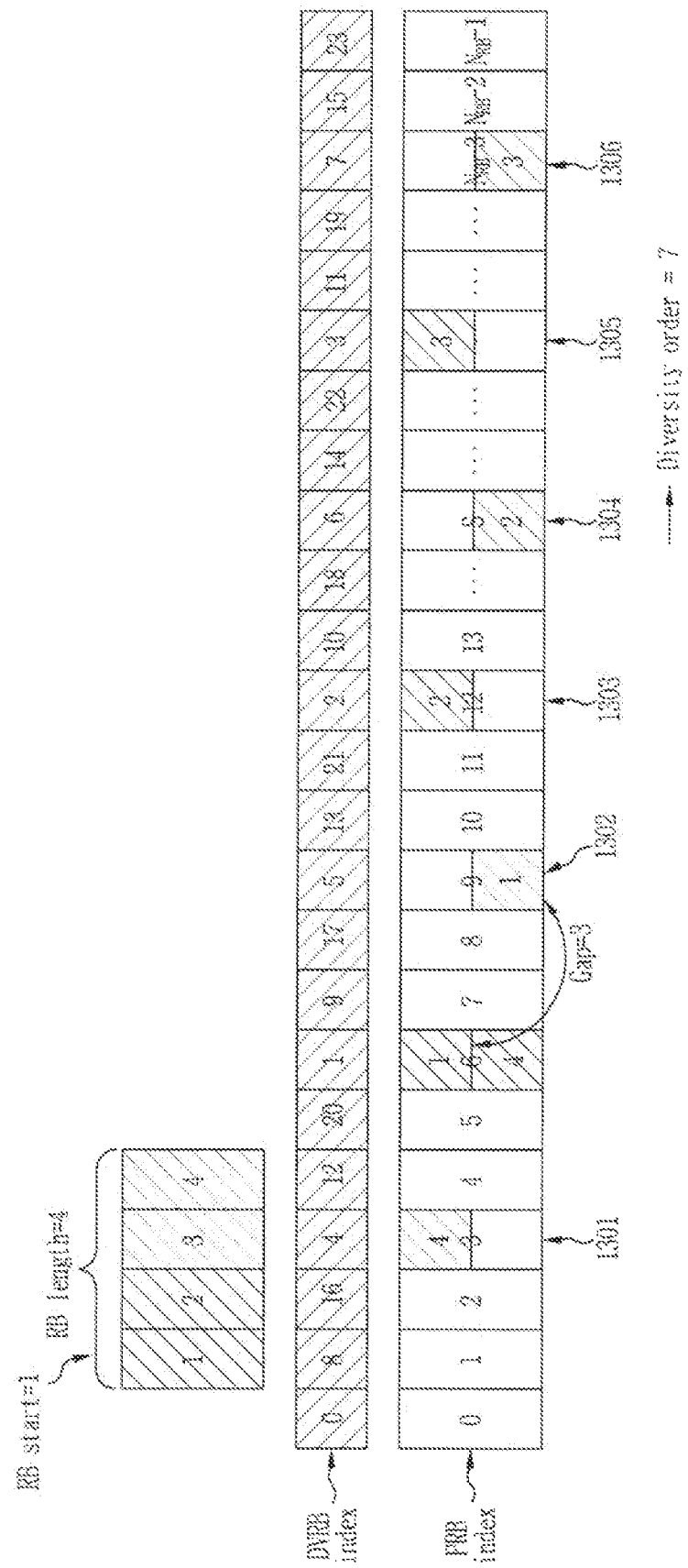

FIG. 13 illustrates the case where one UE is allocated four DVRBs under the same rules as those of FIG. 12.

As can be seen from FIG. 13, the diversity order increases to 7. However, as the diversity order increases, the diversity gain converges. The results of existing studies represent that the increase in the diversity gain is insignificant when the diversity order is about 4 or more. The un-mapped parts of PRBs 1301, 1302, 1303, 1304, and 1305 can be allocated and mapped for other UE which uses DVRBs, however, the un-mapped parts cannot be allocated and mapped for another UE which uses LVRBs. Therefore, when there are no other UEs using DVRBs, there is a disadvantage that the un-mapped parts of the PRBs 1301, 1302, 1303, 1304 and 1305 cannot help being left empty, not used. In addition, the distributed arrangement of DVRBs breaks consecutiveness of available PRBs, resulting in a restriction in allocating consecutive LVRBs.

As a result, there is a need for a method to limit the diversity order to a proper level to carry out the distributed allocation.

A first embodiment and second embodiment of the present invention are directed to methods for setting a relative distance between divided parts of a DVRB mapped to PRBs to 0. In these embodiments, in a scheme for mapping consecutive DVRB indexes to spaced PRBs, when a plurality of DVRBs are allocated to one UE, respective divided parts of each of the DVRBs can be distributively allocated to different PRBs, thereby raising the diversity order. Alternatively, under the same conditions, the respective divided parts of each DVRB may be allocated to the same PRB, not distributively allocated to different PRBs. In this case, it is possible to reduce the number of PRBs to which DVRBs are distributively allocated, thus limiting the diversity order.

Embodiment 1

This embodiment is directed to a method for switching divided parts to a distributed/non-distributed mode by setting a reference value for the number of DVRBs allocated to one UE. Here, the 'distributed mode' refers to a mode where the gap between divided DVRB parts is not 0, and the 'non-distributed mode' refers to a mode where the gap between divided DVRB parts is 0.

Assume that the number of DVRBs allocated to one UE is M. When M is smaller than a specific reference value ($=M_{th}$), divided parts of each DVRB are distributively allocated, thereby raising the diversity order.

Conversely, when M is larger than or equal to the reference value ($=M_{th}$), the divided parts are allocated to the same PRB, not distributively allocated. This allocation of the divided parts to the same PRB can reduce the number of PRBs to which DVRBs are distributively mapped, thus limiting the diversity order.

That is, in the case where M is larger than or equal to the reference value $M_{th}$, a gap, which is a relative distance between divided parts of each DVRB mapped to PRBs, is set to 0.

For example, if the number of DVRBs is 2 under the condition that $M_{th}=3$, divided parts of each DVRB can be distributively mapped as shown in FIG. 12. In contrast, if the number of DVRBs is 4 under the condition that $M_{th}=3$, a gap is set to 0 so that divided parts of each DVRB can be mapped to the same PRB.

Figure 14:
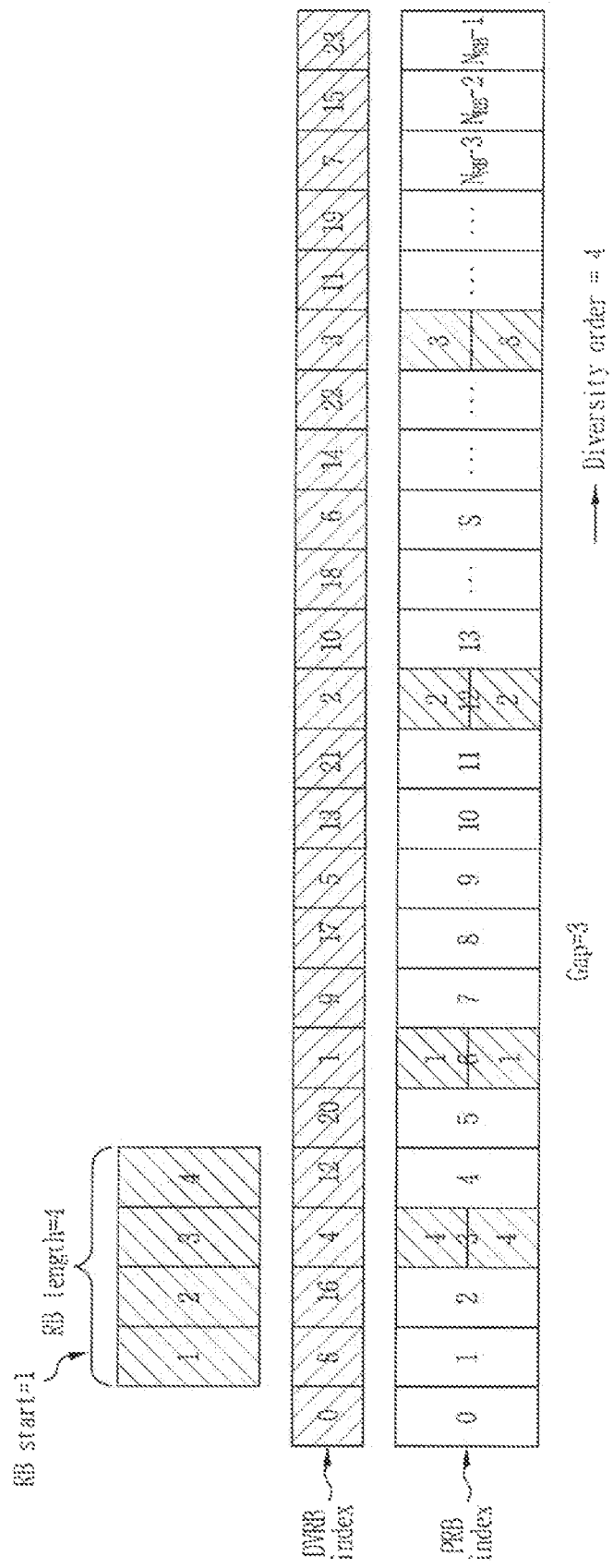
FIG. 14 is a view illustrating an example of a resource block mapping method in the case where Gap=0, according to one embodiment of the present invention.

FIG. 14 illustrates an example of a resource block mapping method in the case where Gap=0, according to the embodiment 1.

Embodiment 2

This embodiment is directed to a method for switching divided parts to a distributed/non-distributed mode using a control signal. Here, the 'distributed mode' refers to a mode where the gap between divided DVRB parts is not 0, and the 'non-distributed mode' refers to a mode where the gap between divided DVRB parts is 0.

The embodiment 2 is a modified version of the embodiment 1. In the embodiment 2, $M_{th}$ is not set, and, as needed, a control signal is transmitted and received to switch divided parts to the distributed/non-distributed mode. In response to the transmitted and received control signal, divided DVRB parts can be distributed to raise the diversity order or be mapped to the same PRB to lower the diversity order.

For example, the control signal may be defined to indicate the value of a gap, which is a relative distance between divided parts of each DVRB mapped to PRBs. That is, the control signal may be defined to indicate the gap value itself.

For example, in the case where the control signal indicates that Gap=3, divided DVRB parts are distributively mapped as shown in FIG. 12 or 13. Also, in the case where the control signal indicates that Gap=0, divided DVRB parts are mapped to the same FRB as shown in FIG. 14.

As stated previously, in order to freely schedule the number $N_{PRB}$ of PRBs in the system on a PRB basis. It is necessary to transmit an $N_{PRB}$-bit bitmap to each UE to be scheduled. When the number $N_{PRB}$ of PRBs in the system is large, overhead of control information is increased for transmission of the $N_{PRB}$-bit bitmap. Therefore, consideration can be given to a method for scaling down a scheduling unit or dividing the entire band and then performing transmission in different scheduling units in only some bands.

In the 3GPP LTE, a bitmap configuration scheme has been proposed in consideration of overhead when the bitmap is transmitted as stated above.

Figure 15:
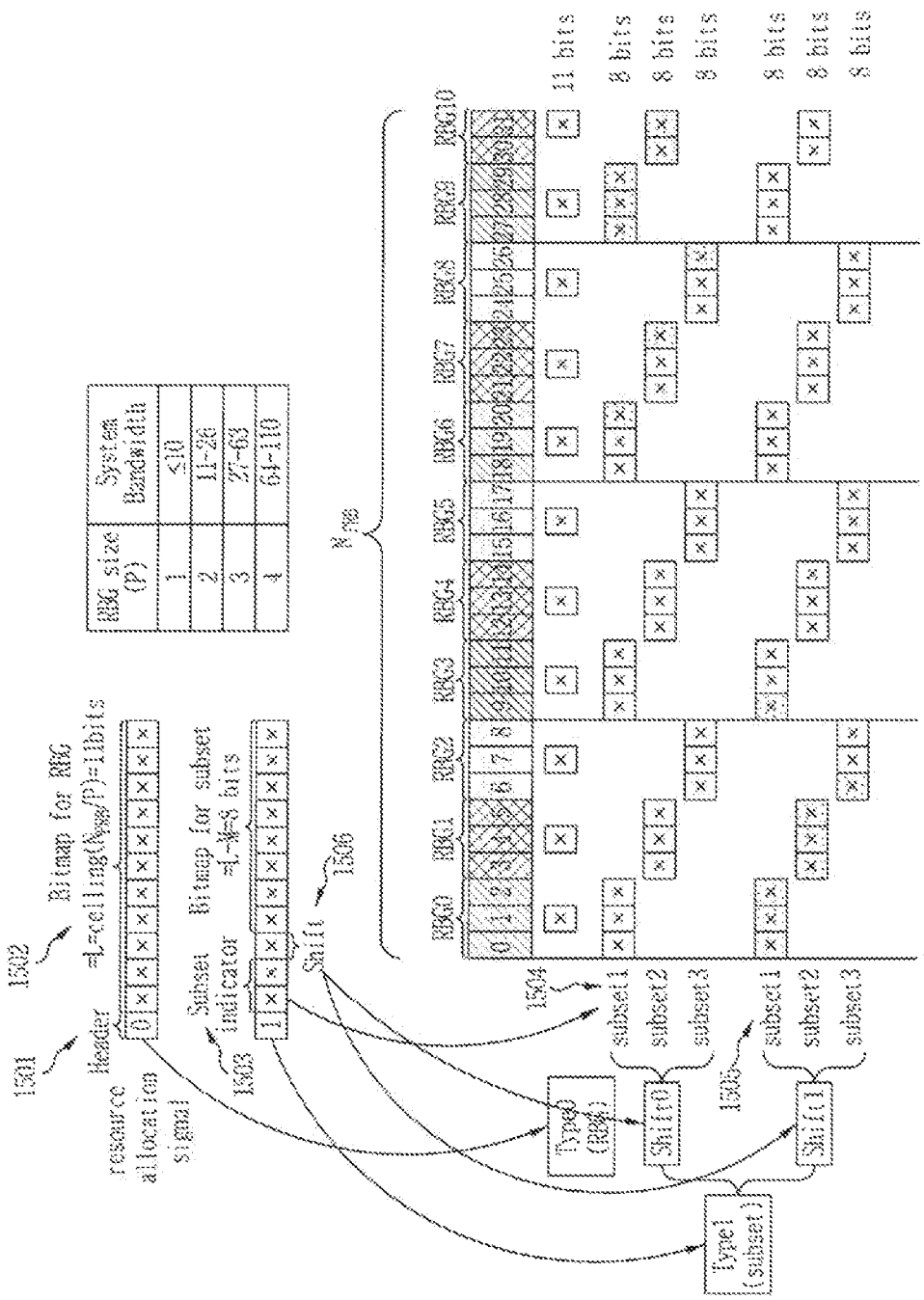
FIG. 15 is a view illustrating a bitmap configuration.

FIG. 15 Illustrates a bitmap configuration.

A signal for resource allocation consists of a header 1501 and a bitmap 1502. The header 1505 indicates the structure of the bitmap 1502 being transmitted, namely, a bitmap scheme, be indicating a signaling scheme.

The bitmap scheme is classified into two types, an RBG scheme and a subset scheme.

In the RBG scheme, RBs are grouped into a plurality of groups. RBs are mapped in units of one group. That is, a plurality of RBs constituting one group have association of mapping. When the group size is larger, it is difficult to minutely perform resource allocation, but it is possible to reduce the number of bits of a bitmap. Referring to FIG. 15, because $N_{PRB}=32$, a bitmap of a total of 32 bits is required for one RB unit resource allocation. However, provided that three RBs are grouped (P=3) and resources are allocated on an RB group (RBG) basis, all RBs can be divided into a total of eleven groups. As a result, only a bitmap of 11 bits is required, thereby significantly reducing the amount of control information. In contrast, in the case where resources are allocated on this RBG basis, they cannot be allocated in units of one RB, so that they cannot be minutely allocated.

In order to make up for it, the subset scheme is used. In this scheme, a plurality of RBGs are set as one subset, and resources are allocated on an RB basis within each subset. In order to use the 11-bit bitmap is the above-stated RBG scheme of FIG. 15, it is possible to configure '3' subsets (subset 1, subset 2 and subset 3). Here, '3' is the number of RBs constituting each RBG stated above. As a result, $N_{RB}/P=\text{ceiling}(32/3)=11$, so that RBs it each subset can be allocated on the RB basis with 11 bits. Here, the header information 1501 is required to indicate which one of the RBG scheme and subset scheme is used for the bitmap and which subset is used if the subset scheme is used.

Provided that the header information 1501 just indicates which one of the RBG scheme and subset scheme is used and some bits of the bitmap used for the RBGs are used to indicate the subset type, all the RBs in all the subsets may not be utilized. For example, referring to FIG. 15, because a total of three subsets are set, a 2-bit subset indicator 1503 is required to identify the subsets. At this time, a total of 12 RBs are assigned to the subset 1 1504 or 1505, and only 9 bits are left in the bitmap of a total of 11 bits if 2 bits of the subset indicator 1503 are excepted from the bitmap. It is not possible to individually indicate all of the twelve RBs with 9 bits. In order to solve this, one bit of the RBG bitmap can be assigned as a shift indicator 1506 so that it can be used to shift the position of an RB indicated by the subset bitmap. For example, in the case where the subset indicator 1503 indicates the subset 1 and the shift indicator 1506 indicates 'shift 0', the remaining 8 bits of the bitmap are used to indicate RB0, RB1, RB2, RB9, RB10, RB11, RB18 and RB19 (see 1504). On the other hand, in the case where the subset indicator 1503 indicates the subset 1 and the shift indicator 1506 indicates 'shift 1', the remaining 8 bits of the bitmap are used to indicate RB10, RB11, RB18, RB19, RB20, RB27, RB28 and RB29 (see 1505).

Although the subset indicator 1503 has been described in the above example to indicate the subset 1 1504 or 1505, it may indicate the subset 2 or subset 3. Accordingly, it can be seen that eight RBs can be mapped in units of one RB with respect to each combination of the subset indicator 1503 and shift indicator 1506. Also referring to FIG. 15, in the present embodiment, the numbers of RBs assigned to the subset 1, subset 2 and subset 3 are 12, 11 and 9 which are different, respectively. Accordingly, it can be seen that four RBs cannot be used in the case of the subset 1, three RBs cannot be used in the case of the subset 2 and one RB cannot be used in the case of the subset 3 (see shaded areas). FIG. 15 is nothing but an illustration, and the present embodiment is thus not limited thereto.

Consideration can be given to use of a combination of the bitmap scheme using the RBG scheme and subset scheme and the compact scheme.

Figure 16:
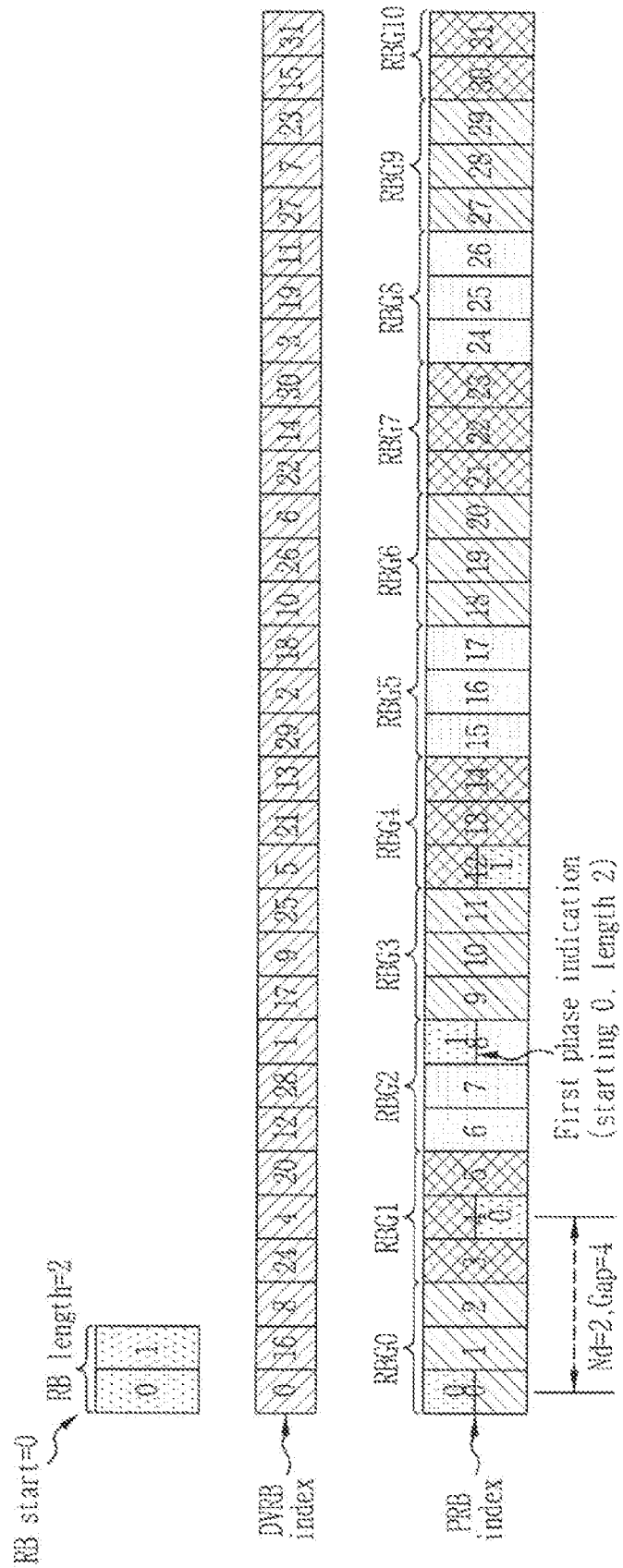
FIG. 16 is a view illustrating an example of a method for mapping based on a combination of a bitmap scheme and a compact scheme.

FIG. 16 illustrates an example of a method for mapping based on a combination of the bitmap scheme and compact scheme.

In the case where DVRBs are mapped and transmitted as shown in FIG. 16, some resource elements of an RBG0, RBG1, RBG2 and RBG4 are filed by the DVRBs. The RBG0, among them, is included in a subset 1, the RBG1 and RBG4 are included in a subset 2, and the RBG2 is included in a subset 3. At this time, it is impossible to allocate the RBG0, RBG1, RBG2 and RBG4 to UEs in the RBG scheme. Also, RBs (PRB0, PRB4, PRB8 and PRB12) in the RBGs left after being assigned as DVRBs must be allocated to UEs in the subset scheme. However, because a UE allocated in the subset scheme can be allocated only an RB in one subset, the remaining RBs belonging to other subsets cannot help being allocated to different UEs. As a result, LVRB scheduling is restricted by DVRB scheduling.

Therefore, there is a need for a DVRB arrangement method capable of reducing the restriction in the LVRB scheduling.

Third to fifth embodiments of the present invention are directed to methods for setting a relative distance between divided parts of a DVRB mapped to PRBs to reduce an effect on LVRBs.

Embodiment 3

The embodiment 3 is directed to a method for, when mapping divided parts of DVRBs, mapping the divided parts to RBs belonging to one specific subset and then mapping the divided parts to RBs belonging to other subsets after mapping the divided parts to all the RBs of the specific subset.

According to this embodiment, when consecutive DVRB indexes are mapped to distributed PRBs, they can be distributively mapped within one subset and then mapped to other subsets when they cannot be mapped within the one subset any longer. Also, interleaving of consecutive DVRBs is performed within a subset.

Figure 17:
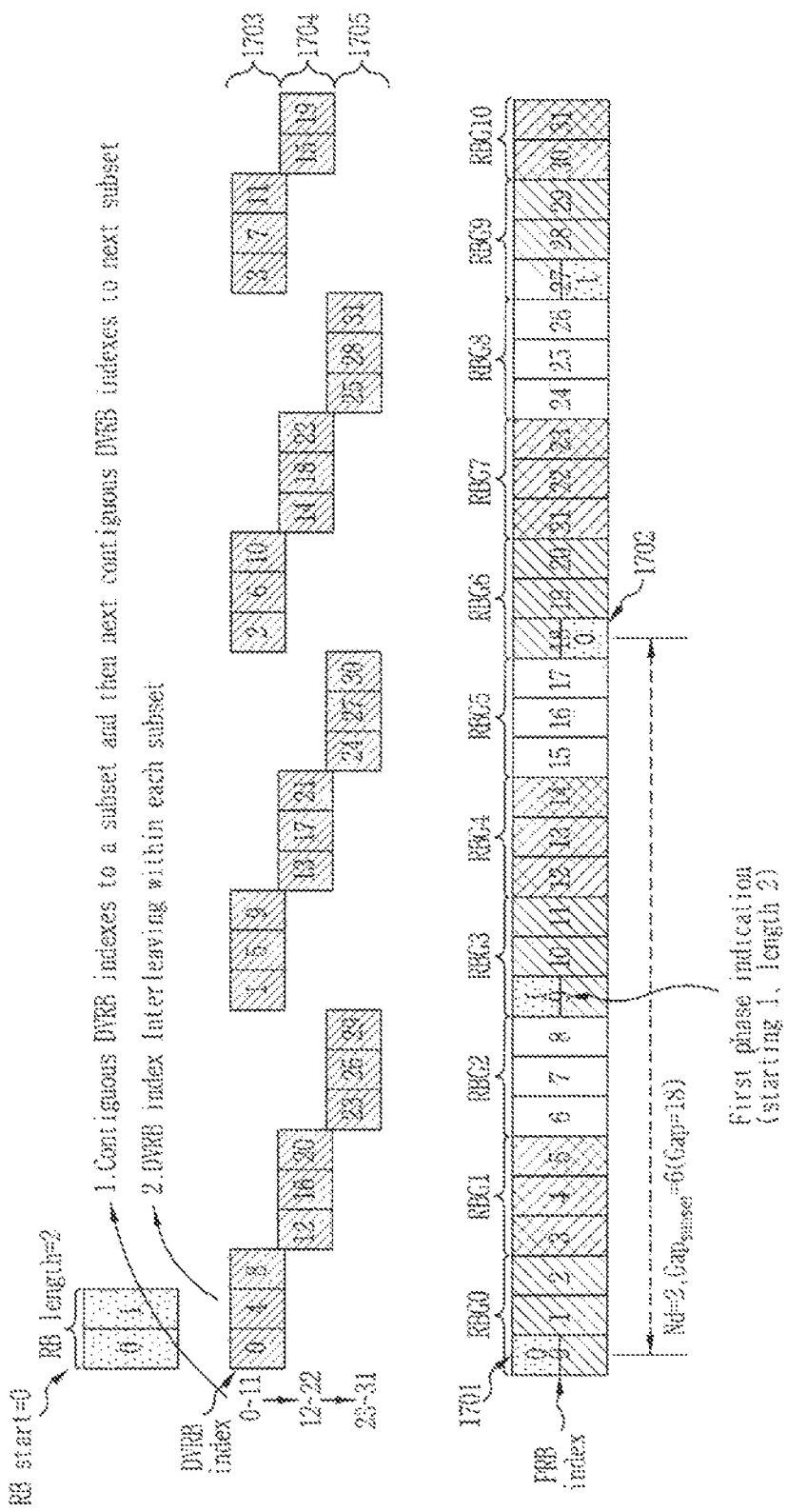
FIGS. 17 and 18 are views illustrating a DVRB mapping method according to one embodiment of the present invention.
Figure 18:
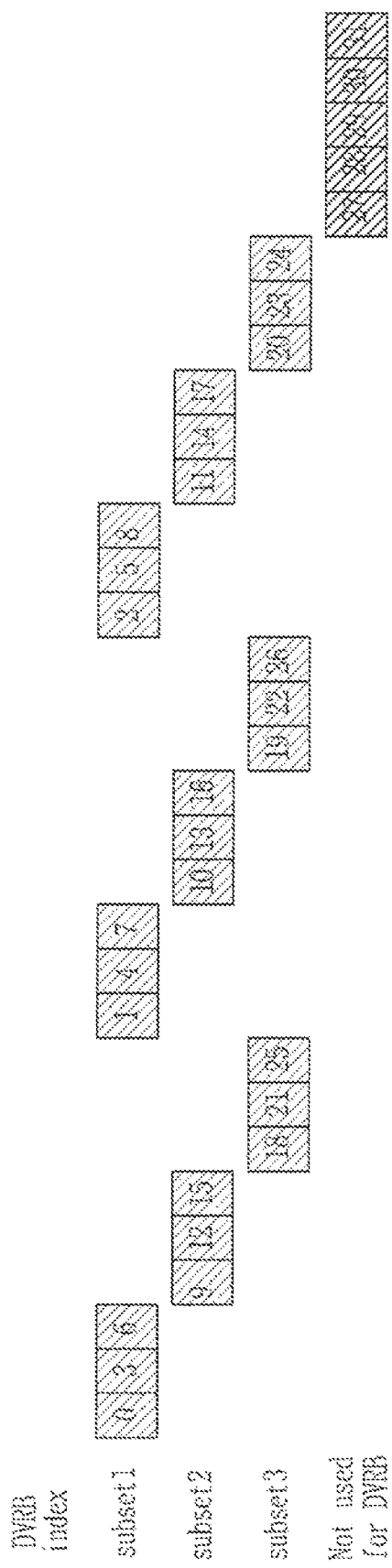

FIGS. 17 and 18 illustrate a DVRB mapping method according to one embodiment of the present invention.

DVRB0 to DVRB11 are distributively mapped within a subset 1 (1703), DVRB12 to DVRB22 are then distributively mapped within a subset 2 (1704), and DVRB23 to DVRB31 are then distributively mapped within a subset 3 (1705). This mapping can be carried out by a method of using a block interleaver for each subset or any other method.

This arrangement can be achieved by controlling a block interleaver operation scheme.

Embodiment 4

The embodiment 4 is directed to a method for limiting mapping of divided DVRB parts to PRBs included in the same subset.

In the embodiment 4, gap information can be used to map divided parts of the same DVRB within the same subset. At this time, a parameter for all PRBs, such as the aforementioned 'Gap', may be used. Alternatively, another parameter for one subset, '$Gap_{subset}$' may be used. This will hereinafter be described in detail.

It is possible to together use a method for distributively filling consecutive DVRBs within one subset and a method for mapping divided parts of each DVRB within the same subset. In this case, preferably, $Gap_{subset}$, which means a difference between FRB numbers within the same subset, can be used as information indicative of a relative position difference between divided DVRB parts. The meaning of $Gap_{subset}$ can be understood from FIG. 17. PRBs included in the subset 1 are a PRB0, PRB1, PRB2, PRB9, PRB10, PRB11, PRB18, PRB19, PRB20, PRB27, PRB28 and PRB29. Here, the PRB18 is spaced apart from the PRB0 within the subset 1 by 6 ($Gap_{subset}$=6) indexes. On the other hand, with respect to all PRBs, the PRB18 can be indicated to be spaced apart from the PRB0 by 18 (gap=18) indexes.

Embodiment 5

The embodiment 5 is directed to a method for setting a relative distance between divided DVRB parts to a multiple of the square of the size of an RBG.

The limited setting of Gap to a multiple of the size of an RBG as in the present embodiment provides characteristics as follows. That is, when the relative distance between the divided DVRB parts is indicated as a relative position difference within one subset, it is set to a multiple of the size (P) of an RBG. Alternatively, when the relative distance between the divided DVRB parts is indicated as a position difference with respect to all PRBs, it is limited to a multiple of the square ($P^2$) of the RBG size.

For example, referring to FIG. 15, it can be seen that P=3 and $P^2$=9. Here, it can be seen that the relative distance between a first divided part 1701 and second divided part 1702 of a DVRB is a multiple of P(=3) because $Gap_{subset}$=6, and a multiple of $P^2$(=9) because Gap=18.

In the case where a scheme based on this embodiment is used, because the probability that RBGs only some resource elements of each of which are used will belong to the same subset is high, it is expected that resource elements or RBs left not used are present in the same subset. Therefore, it is possible to efficiently use allocation of the subset scheme.

Referring to FIG. 17, because the size of an RBG10 is 2, it is different from the sizes (=3) of other RBGs. In this case, for the convenience of DVRB index arrangement, the RBG10 may not be used for DVRBs. Also, referring to FIGS. 17 and 18, a total of four RBGs including an RBG9 belong to the subset 1, a total of three RBGs, if excluding the RBG10, belong to the subset 2, and a total of three RBGs belong to the subset 3. Here, for the convenience of DVRB index arrangement, the RBG9, among the four RBGs belonging to the subset 1, may not be used for DVRBs. Thus, a total of three RBGs per subset may be used for DVRBs.

In this case, DVRB indexes can be sequentially mapped to one subset (for example, subset 1) used for DVRBs, among the subsets, as shown in FIG. 18. If the DVRB indexes cannot be mapped to the one subset any longer, they can be mapped to a next subset (for example, subset 2).

On the other hand, it can be seen that DVRB indexes are consecutively arranged in FIG. 11, but non-consecutively arranged in FIGS. 12, 13, 14, 16, 17 and 18. In this manner DVRB indexes can be changed in arrangement before being mapped to PRB indexes, and this change can be performed by a block interleaver. Hereinafter, the structure of a block interleaver according to the present invention will be described.

Embodiment 6

Hereinafter, a description will be given of a method for configuring an interleaver having a desired degree equal to a diversity order, according to one embodiment of the present invention.

In detail, in a method for mapping consecutive DVRB indexes to non-contiguous, distributed PRBs, a method is proposed which uses a block interleaver and configures the interleaver such that it has a degree equal to a target diversity order $N_{DivOrder}$. The degree of the interleaver can be defined as follows.

That is, in a block interleaver having m rows and n columns, when data is written, the data is written while the index thereof is sequentially incremented. At this time, the writing is performed in such a manner that, after one column is completely filled, a column index is incremented by one and a next column is filled. In each column, the writing is performed while a row index is incremented. For reading from the interleaver, the reading is performed in such a manner that, after one row is completely read, a row index is incremented by one and a next row is read. In this case, the interleaver can be referred to as an m-degree interleaver.

Conversely, in a block interleaver having m rows and n columns, data writing may be performed in such a manner that, after one row is filled, the process proceeds to a next row, and data reading may be performed in such a manner that, after one column is read, the proceeds to a next column. In this case, the interleaver can be referred to as an n-degree interleaver.

In detail, $N_{DivOrder}$ is limited to a multiple of $N_D$. That is, $N_{DivOrder}=K \cdot N_D$. Here, K is a positive integer. Also, a block interleaver of a degree $N_{DivOrder}$ is used.

Figure 19:
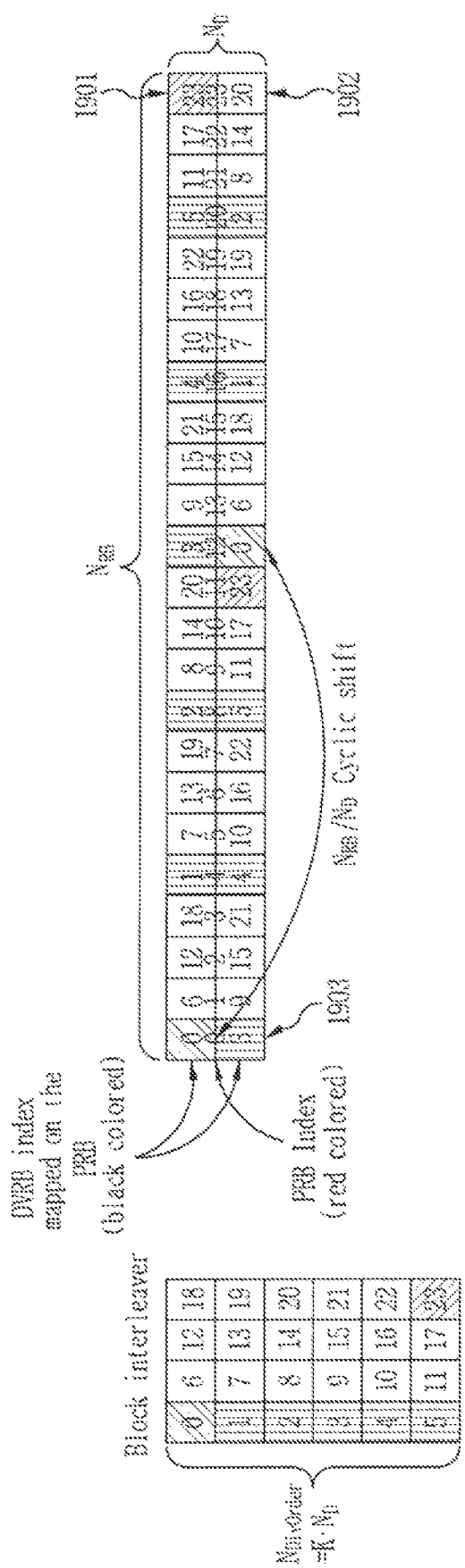
FIG. 19 is a view illustrating an example of a method for interleaving DVRB indexes.

FIG. 19 is an illustration when the number of RBs used in interleaving is $N_{DVRB}=24$ and $N_D=2$ and $N_{DivOrder}=2 \times 3=6$.

Referring to FIG. 19, for writing into an interleaver, data is written while the index thereof is sequentially incremented. At this time, the writing is performed in such a manner that, after one column is completely filled, a column index is incremented by one and a next column is filled. In one column, the writing is performed while a row index is incremented. For reading from the interleaver, the reading is performed in such a manner that, after one row is completely read, a row index is incremented by one and a next row is read. In one row, the reading is performed while a column index is incremented. In the case where the reading/writing is performed in this manner the degree of the interleaver is the number of rows, which is set to a target diversity order, 6.

In the case where the interleaver is configured in this manner, a DVRB index order of a data sequence outputted from the interleaver can be used as an index order of first divided parts of DVRBs, and a DVRB index order of a data sequence obtained by cyclically shifting the outputted data sequence by $N_{DivOrder}/N_D$ can be used as an index order of the remaining divided parts. As a result, $N_D$ divided parts generated from DVRBs are mapped to only $N_D$ PRBs in pairs, and the difference between paired DVRB indexes is K.

For example, in FIG. 19, $N_{DivOrder}/N_{DVRB}(=24)/N_D(=2)=24/2=12$, and K=3. It can also be seen from FIG. 19 that a DVRB index order 1901 of a data sequence outputted from the interleaver is given as "0→6→12→18→1→7→13→19→2→8→14→20→3→9→15→21→4→10→16→ and a DVRB index order 1902 of a data sequence obtained by cyclically shifting the outputted data sequence by $N_{DVRB}/N_D=12$ is given as "3→9→15→21→4→10→16→22→5→11→17→23→0→6→12→18→1→7→13- Also, DVRBs are paired. Referring to 1903 of FIG. 19, for example, it can be seen that a DVRB0 and a DVRB3 are paired. It can also be seen that respective combinations of divided parts generated from the DVRB0 and DVBR3 are mapped to a PRB0 and a PRB12, respectively. This is similarly applied to other DVRBs having other indexes.

According to this embodiment, it is possible to effectively manage the relationship between DVRBs and PRBs to which the DVRBs are mapped.

Embodiment 7

Hereinafter, a method for filling nulls in a rectangular interleaver in accordance with one embodiment of the present invention will be described.

In the following description, the number nulls filled in the interleaver may be represented by "$N_{null}$".

In accordance with the embodiment 6, it is possible to completely fill data in the interleaver because $N_{DVRB}$ is a multiple of $N_{DivOrder}$. However, when $N_{DVRB}$ is not a multiple of $N_{DivOrder}$ it is necessary to take a null filling method into consideration because it is impossible to completely fill data in the interleaver.

For a cyclic shift by $N_{DVRB}/N_D$, $N_{DVRB}$ should be a multiple of $N_D$. In order to completely fill data in a rectangular interleaver, $N_{DVRB}$ should be a multiple of $N_{DivOrder}$. However, when K>1, $N_{DVRB}$ may not be a multiple of $N_{DivOrder}$, even though it is a multiple of $N_D$. In this case, generally, data is sequentially filled in the block interleaver, and nulls are then filled in remaining spaces of the block interleaver. Thereafter, reading is performed. If the data is filled column by column, then the data is read row by row, or if the data is filled row by row, then the data is read column by column. In this case, no reading is performed for nulls.

FIGS. 20*a* and 20*b* illustrate a general block interleaver operation when the number of RBs used in an interleaving operation is 22, namely, $N_{DVRB}=22$, $N_D=2$, and $N_{DivOrder}=2 \times 3=6$, that is, when $N_{DVRB}$ is not a multiple $N_{DivOrder}$.

Referring to FIG. 20*a*, the index difference between paired DVRBs has a random value. For example, DVRB pairs (0, 20), (6, 3), and (12, 9) (indicated by "2001", "2002", and "2003") have index differences of 20 (20−0=20), 3 (6−3=3), and 3 (12−9=3), respectively. Accordingly, it can be seen that the index difference between paired DVRBs is not fixed to a certain value. For this reason, the scheduling of DVRBs gets complicated, as compared to the case in which the index difference between paired DVRBs has a fixed value.

Meanwhile, when if is assumed that $N_{Remain}$ represents a remainder when $N_{DVRB}$ is divided by $N_{DivOrder}$, nulls are filled in elements of a last column, except for elements corresponding to $N_{Remain}$ values, as shown in FIG. 20a or 20b. For example, referring to FIG. 20a, nulls may be filled in two elements of the last column, except for four elements corresponding to four values, because the remainder when $N_{DivOrder}(=22)$ is divided by $N_{DivOrder}(=6)$ is 4 ($N_{Remain}=4$). Although nulls are rearwardly filled in the above example, they may be positioned before a first index value. For example, the $N_{Remain}$ values are filled in elements, starting from a first element. Also, nulls may be arranged at predetermined positions, respectively.

FIGS. 21a and 21b illustrates a null arranging method according to one embodiment of the present invention. Referring to FIGS. 21a and 21b, it can be seen that nulls are uniformly distributed, as compared to the case of FIGS. 21a and 20b.

In this embodiment, when nulls are to be filled in a rectangular block interleaver, $N_{DivOrder}$ corresponding to the degree of the interleaver is divided into $N_D$ groups each having a size of K, and nulls are uniformly distributed in all the groups. For example, as shown in FIG. 21a, the interleaver may be divided into $N_D(=2)$ groups G2101 and G2102. In this case, K=3. One null is written in the first group G2101. Similarly one null is written in the second group G2102. Thus, nulls are distributively written.

For example, where writing is performed in such a manner that values are sequentially filled, $N_{Remain}$ values remain finally. When indexes corresponding to the remaining values are arranged in $N_D$ groups such that they are uniformly distributed, it is possible to uniformly arrange nulls. For example, in the case of FIG. 21a, $N_{Remain}=4$) data spaces remain. When indexes 18, 19, 20, and 21 corresponding to the data spaces am arranged in $N_D(=2)$ groups such that they are uniformly distributed, it is possible to arrange one null in each group.

As a result, the difference between paired DVRB indexes can be maintained to be K or less (for example, K=3). Accordingly, there is an advantage in that a more efficient DVRB allocation can be achieved.

Embodiment 8

Hereinafter, a method for setting a relative distance between divided parts of each DVRB mapped to PRBs to 0 in accordance with one embodiment of the present invention will be described.

Figure 22:
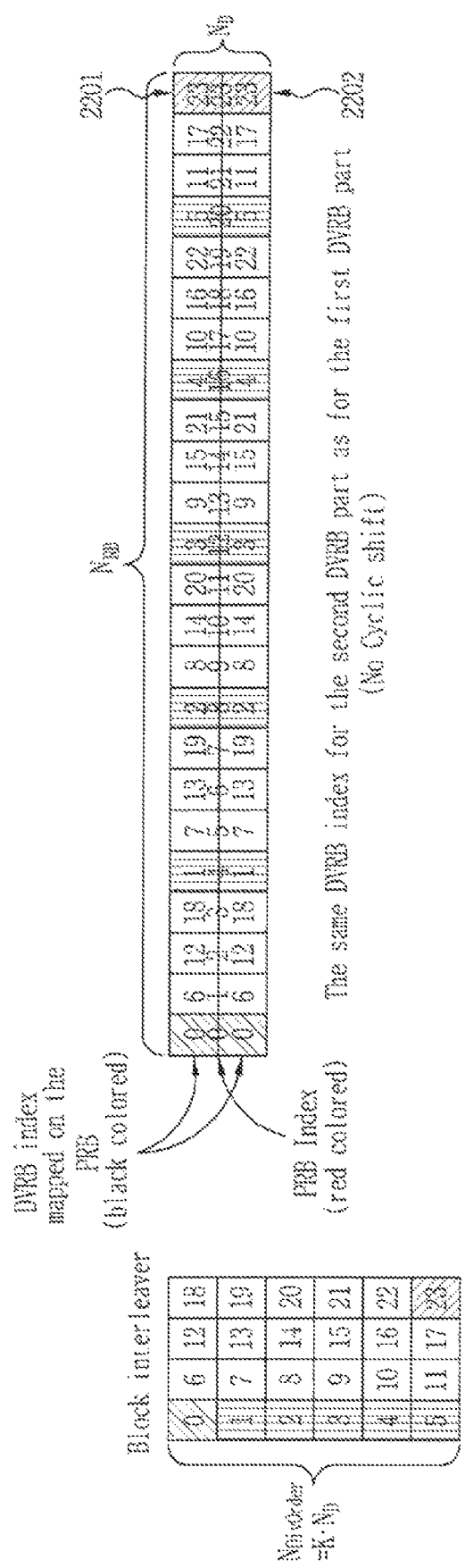
FIG. 22 is a view illustrating a method for mapping interleaved DVRB indexes with Gap=0 in accordance with one embodiment of the present invention.

FIG. 22 illustrates a method for mapping interleaved DVRB indexes while Gap=0 in accordance with one embodiment of the present invention.

Meanwhile, where M DVRBs are allocated to one UE in a scheme for mapping consecutive DVRB indexes to non-contiguous, distributed PRBs, a reference value $M_{th}$ For M may be set. Based on the reference value $M_{th}$, the divided parts of each DVRB may be distributively assigned to different PRBs, respectively, to raise the diversity order. Alternatively, the divided parts of each DVRB may be assigned to the same PRB without being distributed to different PRBs. In this case, it is possible to reduce the number of PRBs, to which DVRBs are distributively mapped, and thus to limit the diversity order.

That is, this method is a scheme in which the divided parts of each DVRB are distributed to raise the diversity order, when M is less than a specific reference value ($=M_{th}$), whereas, when M is not less than the specific reference value ($=M_{th}$), the divided parts of each DVRB are assigned to the same PRB without being distributed, to reduce the number of PRBs, to which DVRBs are distributively mapped, and thus to limit the diversify order.

That is, in this scheme, DVRB indexes of a data sequence outputted from the interleaver are applied, in common, to all divided parts of each DVRB such that they are mapped to PRBs, as shown in FIG. 22. For example, referring to FIG. 9, DVRB indexes of a data sequence outputted from the interleaver have an order of "0→6→12→18→1→7→13→19→2→8→14→20→3→9→15→21→4→10→16→ In this case, each data sequence DVRB index is applied, in common, to first and second divided parts 2201 and 2202 of each DVRB.

Embodiment 9

Hereinafter, a method, in which both the above-described embodiments 6 and 8 are used, will be described in accordance with one embodiment of the present invention.

Figure 23:
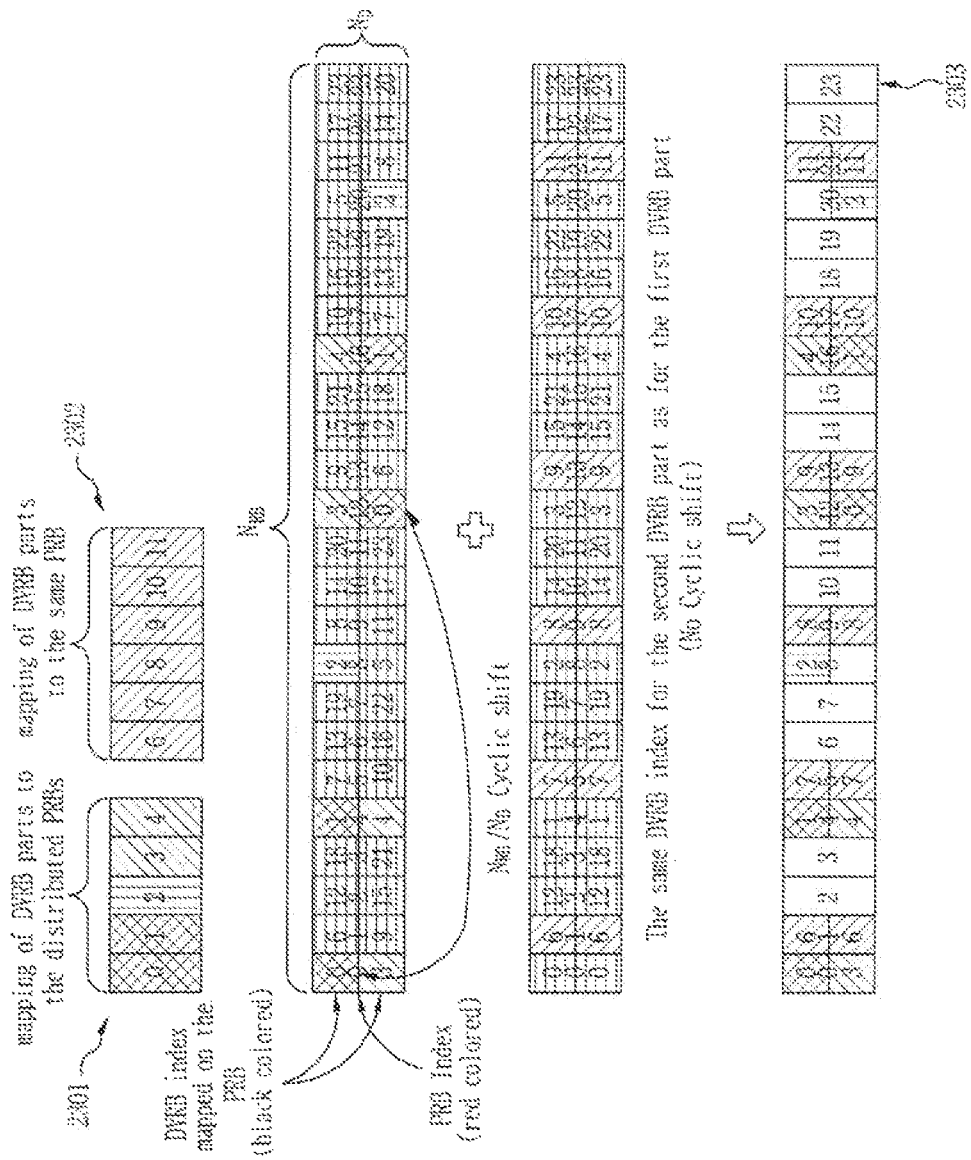
FIG. 23 is a view illustrating an example of a method for mapping DVRB indexes, using different gaps for different terminals.

FIG. 23 illustrates the case in which a UE1, which is subjected to a scheduling in a scheme of mapping respective divided parts of each DVRB to different PRBs, as shown in FIG. 19, and a UE2, which is subjected to a scheduling in a scheme of mapping the divided parts of each DVRB to the same PRB, as shown in FIG. 22, are simultaneously multiplexed. That is, FIG. 23 illustrates the case in which the UE1 and UE2 are simultaneously scheduled in accordance with the methods of the embodiments 6 and 8, respectively.

For example, referring to FIG. 23, the UE1 is allocated a DVRB0, DVRB1, DVRB2, DVRB3, and DVRB4 (2301), whereas the UE2 is allocated a DVRB6, DVRB7, DVRB8, DVRB8, DVRB9, DVRB10, and DVRB11 (2302). However, the UE1 is scheduled in such a manner that the divided parts of each DVRB are mapped to different PRBs, respectively, whereas the UE2 is scheduled in such a manner that the divided parts of each DVRB are mapped to the same PRB. Accordingly, the PRBs used for the UE1 and UE2 include a PRB0, PRB1, PRB4, PRB5, PRB8, PRB9, PRB12, PRB13, PRB16, PRB17, PRB20, and PRB21 as shown by "2303" in FIG. 23. In this case, however, the PRB8 and PRB20 are partially used.

Where the divided parts of each DVRB are mapped to distributed PRBs, respectively, the difference between the paired DVRB indexes is limited to a value of K or less. Accordingly, this scheme has no influence on DVRBs spaced apart from each other by a gap of more than K. Accordingly, it is possible to easily distinguish indexes usable in the "case in which the divided parts of each DVRB are mapped to the same PRB" from unusable indexes.

Embodiment 10

Hereinafter, a method for limiting an $N_{DVRB}$, to prevent generation of a null, will be described in accordance with one embodiment of the present invention.

Again referring to FIG. 20, it can be seen that the difference between the DVRB indexes paired for PRBs may not be fixed to a specific value. In order to reduce the DVRB index difference to a specific value or less, the method of FIG. 21 may be used as described above.

Figure 21:
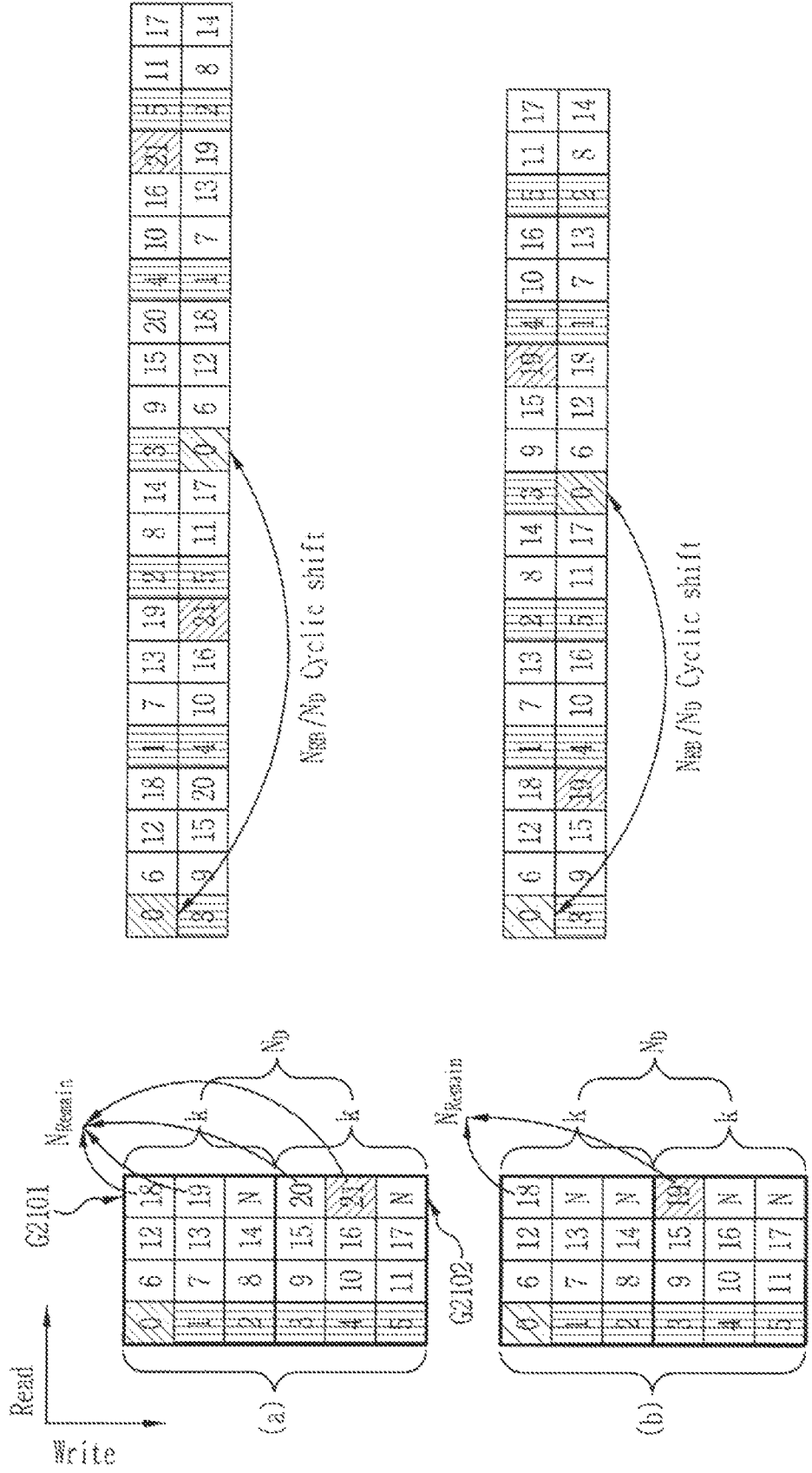
FIGS. 21a and 21b are views illustrating a method for inserting nulls when the number of resource blocks used in an interleaving operation is not a multiple of a diversity order, in accordance with one embodiment of the present invention.

When the method of FIG. 21 is used to distribute nulls, the complexity of the interleaver increases due to the processing of nulls. In order to prevent such a phenomenon, a method for limiting $N_{DVRB}$ such that no null is generated may be taken into consideration.

In the illustrated interleaver, the number of RBs used far DVRBs, namely, $N_{DVRB}$, is limited to a multiple of the diversity order, namely, $N_{DivOrder}$, so that no null is filled in a rectangular matrix of the interleaver.

In a block interleaver of degree D, no null is filled in the rectangular matrix of the interleaver when the number of RBs used for DVRBs, namely, $N_{DVRB}$, is limited to a multiple of D.

Hereinafter, several embodiments using the interleaver according to the present invention when K=2, and $N_D$=2 will be described. The relation between DVRB and PRB indexes may be expressed by a mathematic expression.

Figure 24:
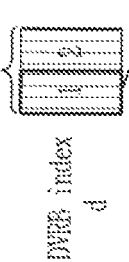
FIG. 24 is a view for explaining the relation between DVRB and PRB indexes.

FIG. 24 is a view for explaining the relation between DVRB and PRB indexes.

Referring to the following description and FIG. 24, parameters used in mathematic expressions can be understood.

p: PRB index($0 \le p \le N_{DVRB}-1$)

d: DVRB index ($0 \le d \le N_{DVRB}-1$)

$p_{1,d}$: Index of a first slot of a PRB to which a given DVRB index d is mapped $p_{2,d}$: Index of a second slot of a PRB to which a given DVRB index d is mapped $d_{p1}$: DVRB index included in a first slot of a given PRB index p $d_{p2}$: DVRB index included in a second slot of a given FEB index p Constants used in Expressions 1 to 11 expressing the relation between DVRB and PRB indexes are defined as follows.

C: Number of columns of the block interleaver

R: Number of rows of the block interleaver $N_{DVRB}$: Number of RBs used for DVRBs $R=\lceil N_{DVRB}/C \rceil$ $N_{PRB}$: Number of PRBs in the system bandwidth.

Figure 25:
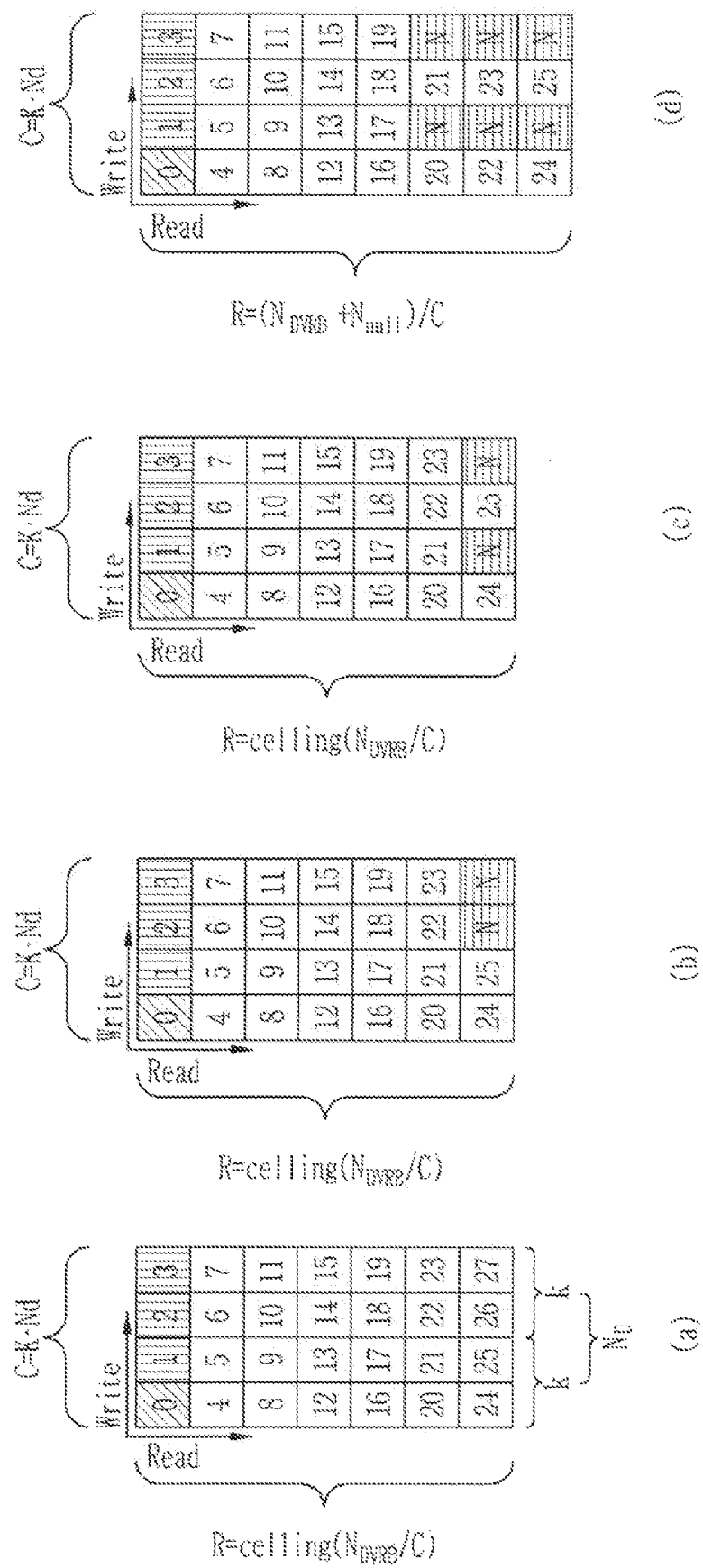
FIG. 25a is a view for explaining the relation between DVRB and PRB indexes.
FIG. 25b is a view illustrating a general method for inserting nulls in an interleaver.
FIGS. 25c and 25d are views illustrating examples of a method for inserting nulls in an interleaver in one embodiment of the present invention, respectively.

FIG. 25a is a view for explaining the above-described constants.

When K=2, $N_D$=2, and $N_{DVRB}$ is a multiple of C, the relation between PRB and DVRB indexes may be derived using Expressions 1 to 3. First, if a PRB index p is given, a DVRB index can be derived using Expression 1 or 2. In the following description, "mod(x,y)" means "x mod y", and "mod" means a modulo operation. Also, "$\lfloor \cdot \rfloor$" means a descending operation, and represents a largest one of integers equal to or smaller than a numeral indicated in "$\lfloor \ \rfloor$". On the other hand, "$\lceil \cdot \rceil$" means an ascending operation, and represents a smallest one of integers equal to or larger than a numeral indicated in "$\lceil \ \rceil$". Also, "round($\cdot$)" represents an integer nearest to a numeral indicated in "( )". "min(x,y)" represents the value which is not larger among x and y, whereas "max(x,y)" represents the value which is not smaller among x and y.

$$d_{p_1} = \mod(p, R) \cdot C + \lfloor p/R \rfloor \qquad \text{[Expression 1]}$$
$$d_{p_2} = \mod(p'R) \cdot C + \lfloor p'/R \rfloor$$
where
$$p' = \mod(p + N_{DVRB}/2, N_{DVRB})$$

$$d_{p_1} = \mod(p, R) \cdot C\lfloor p/R \rfloor \qquad \text{[Expression 2]}$$
$$d_{p_2} = \begin{cases} d_{p_1} - 2, & \text{when } \mod(d_{p_1}, C) \ge 2 \\ d_{p_1} + 2, & \text{when } \mod(d_{p_1}, C) < 2 \end{cases}$$

On the other hand, when $N_{DVRB}$ is a multiple of C, and a DVRB index d is given, a PRB index can be derived using Expression 3.

$$p_{1,d} = \mod(d,C) \cdot R + \lfloor d/C \rfloor$$

$$p_{2,d} = \mod(p_{1,d} + N_{DVRB}/2, N_{DVRB}) \qquad \text{[Expression 3]}$$

FIG. 25b illustrates a general method for filling nulls in an interleaver. This method is applied to the case in which K=2, $N_D$2, and $N_{DVRB}$ is a multiple of $N_d$. The method of FIG. 25b is similar to the method of FIGS. 20a and 20b. In accordance with the method of FIG. 25b, if a PRB index p is given, a DVRB index can be derived using Expression 4.

$$d_{p_1} = \mod(p', R) \cdot C + \lfloor p'/R \rfloor \qquad \text{[Expression 4]}$$

where $$p' = \begin{cases} p+1, & \text{when } \mod(N'_{RB}, C) \ne 0 \text{ and } p \ge 3R-1 \\ p, & \text{when } \mod(N'_{RB}, C) = 0 \text{ or } p < 3R-1 \end{cases}$$

$$d_{p_2} = \mod(p'', R) \cdot C \lfloor p''/R \rfloor$$

where $$p'' = $$

$$\begin{cases} p'''+1, & \text{when } \mod(N'_{RB}, C) \ne 0 \text{ and } p''' \ge 3R-1 \\ p''', & \text{when } \mod(N'_{RB}, C) = 0 \text{ or } p''' < 3R-1 \end{cases}$$

where $$p''' = \mod(p + N_{DVRB}/2, N_{DVRB})$$

On the other hand, if a DVRB index d is given, a PRB index can be derived using Expression 5.

$$p_{1,d} = \qquad \text{[Expression 5]}$$

$$\begin{cases} p'_{1,d} - 1, & \text{when } \mod(N'_{RB}, C) \ne 0 \text{ and } \mod(d, C) = 3 \\ p'_{1,d}, & \text{when } \mod(N'_{RB}, C) = 0 \text{ or } \mod(d, C) \ne 3 \end{cases}$$

where $$p'_{1,d} = \mod(d, C) \cdot R + \lfloor d/C \rfloor$$

$$p_{2,d} = \mod(p_{1,d} + N_{DVRB}/2, N_{DVRB})$$

Embodiment 11

FIG. 25c illustrates a method for filling nulls in an interleaver in accordance with one embodiment of the present invention. This method is applied to the case in which K=2, $N_D$=2, and $N_{DVRB}$ is a multiple of $N_d$.

FIG. 25c illustrates a method corresponding to the method of the embodiment 7 and FIGS. 21a and 21b. The method of FIG. 25c may be explained using Expressions 6 to 8. In accordance with the method of FIG. 25c, if a PRB index p is given, a DVRB index can be derived using Expression 6 or 7.

$$d_{p_1} = \text{mod}(p', R) \cdot C + \lfloor p'/R \rfloor \quad \text{[Expression 6]}$$

where $$p' = \begin{cases} p+1, & \text{when mod}(N_{DVRB}, C) \neq 0 \text{ and } p \geq 2R-1 \text{ and } p \neq 3R-2 \\ 2R-1, & \text{when mod}(N_{DVRB}, C) \neq 0 \text{ and } p = 3R-2 \\ p, & \text{when mod}(N_{DVRB}, C) = 0 \text{ or } p < 2R-1 \end{cases}$$

$$d_{p_2} = \text{mod}(p'', R) \cdot C + \lfloor p''/R \rfloor$$

where $$p'' = \begin{cases} p'''+1, & \text{when mod}(N_{DVRB}, C) \neq 0 \text{ and } p''' \geq 2R-1 \text{ and } p''' \neq 3R-2 \\ 2R-1, & \text{when mod}(N_{DVRB}, C) \neq 0 \text{ and } p = 3R-2 \\ p, & \text{when mod}(N_{DVRB}, C) = 0 \text{ or } p < 2R-1 \end{cases}$$

where $$p''' = \text{mod}(p + N_{DVRB}.2, N_{DVRB})$$

$$d_{p_1} = \text{mod}(p', R) \cdot C + \lfloor p'/R \rfloor \quad \text{[Expression 7]}$$

where $$p' = \begin{cases} p+1, & \text{when mod}(N_{DVRB}, C) \neq 0 \text{ and } p \geq 2R-1 \text{ and } p \neq 3R-2 \\ 2R-1, & \text{when mod}(N_{DVRB}, C) \neq \text{ and } p = 3R-2 \\ p, & \text{when mod}(N_{DVRB}, C) = 0 \text{ or } p < 2R-1 \end{cases}$$

$$d_{p_2} = \begin{cases} d_{p_1} - 2, & \text{when mod}(d_{p_1}, C) \geq 2 \\ d_{p_1} + 2, & \text{when mod}(d_{p_1}, C) < 2 \text{ and } d_{p_1} \neq N_{DVRB}-2 \text{ and } d_{p_1} \neq N_{DVRB}-1 \\ N_{DVRB} - 1, & \text{when mod}(d_{p_1}, C) < \text{ and } d_{p_1} = N_{DVRB}-2 \\ N_{DVRB} - 2, & \text{when mod}(d_{p_1}, C) < 2 \text{ and } d_{p_1} = N_{DVRB}-1 \end{cases}$$

On the other hand, in the method of FIG. 25c, if a DVRB index d is given, a PRB index can be derived using Expression 8.

$$p_{1,d} = \begin{cases} p'_{1,d} - 1, & \text{when mod}(N_{DVRB}, C) \neq 0 \text{ and mod}(d, C) \geq 2 \\ 3R-2, & \text{when mod}(N_{DVRB}, C) \neq 0 \text{ and } d = N_{DVRB}-1 \\ p'_{1,d}, & \text{when mod}(N_{DVRB}, C) = 0 \text{ or } (\text{mod}(d, C) < 2 \text{ and } d \neq N_{DVRB}-1) \end{cases} \quad \text{[Expression 8]}$$

where $$p'_{1,d} = \text{mod}(d, C) \cdot R + \lfloor d/C \rfloor$$

$$p_{2,d} = \text{mod}(p_{1,d} + N_{DVRB}/2, N_{DVRB})$$

Embodiment 12

FIG. 25d illustrates a method implemented using the method of the embodiment 7 and FIGS. 21a and 21b when K=2, $N_D$=2, and the size of the interleaver (=C×R) is set such that $C \cdot R = N_{DVRB} + N_{null}$. Here, "$N_{null}$" represents the number of nulls to be included in the interleaver. This value $N_{null}$ may be a predetermined value, in accordance with this method, if a DVRB index p is given, a DVRB index can be derived using Expression 9 or 10.

$$d_{p_1} = \text{mod}(p', R) \cdot C + \lfloor p'/R \rfloor \quad \text{[Expression 9]}$$

where $$p' = \begin{cases} p, & \text{when } N_{null} = 0 \text{ or } p < R - N_{null}/2 \text{ or } R \leq p < 2R - N_{null}/2 \\ p + N_{null}/2, & \text{when } N_{null} \neq 0 \text{ and} \begin{pmatrix} 2R - N_{null}/2 \leq p < 3R - \\ N_{null} \text{ or } p \geq 3R - N_{null}/2 \end{pmatrix} \end{cases}$$

$$d_{p_1} = \text{mod}(p', 2R) \cdot C/2 + \lfloor p'/2R \rfloor$$

where $$p' = \begin{cases} p + R - N_{null}/2, & \text{when } N_{null} \neq 0 \text{ and } R - N_{null}/2 \leq p < R \\ p + R, & \text{when } N_{null} \neq 0 \text{ and } 3R - N_{null} \leq p < 3R - N_{null}/2 \end{cases}$$

-continued $$d_{p_2} = \text{mod}(p'', R) \cdot C + \lfloor p''/R \rfloor$$ [Expression 10]

where $$p'' = \begin{cases} p''' & \text{, when } N_{null} = 0 \text{ or } p''' < R - N_{null}/2 \text{ or } R \leq p''' < 2R - N_{null}/2 \\ p''' + N_{null}/2 & \text{, when } N_{null} \neq 0 \text{ and } \begin{pmatrix} 2R - N_{null}2 \leq p''' < 3R - \\ N_{null} \text{ or } p''' \geq 3R - N_{null}/2 \end{pmatrix} \end{cases}$$

$$d_{p_2} = \text{mod}(p'', 2R) \cdot C/2 + \lfloor p''/2R \rfloor$$

where $$p'' = \begin{cases} p''' + R - N_{null}/2 & \text{, when } N_{null} \neq 0 \text{ and } R - N_{null}/2 \leq p''' < R \\ p''' + R & \text{, when } N_{null} \neq 0 \text{ and } 3R - N_{null} \leq p''' < 3R - N_{null}/2 \end{cases}$$

where $$p''' = \text{mod}(p + N'_{RB}/2, N'_{RB})$$

On the other hand, if a DVRB index d is given, a PRB index can be derived using Expression 11.

$$p_{1,d} = \begin{cases} p'_{1,d} & \text{, when } N_{null} = 0 \text{ or } \begin{pmatrix} d < N_{DVRB} - \\ N_{null} \text{ and } \text{mod}(d, C) < 2 \end{pmatrix} \\ p'_{1,d} - N_{null}/2 & \text{, when } N_{null} \neq 0 \text{ and } \begin{pmatrix} d < N_{DVRB} - \\ N_{null} \text{ and } \text{mod}(d, C) \geq 2 \end{pmatrix} \end{cases}$$ [Expression 11]

where $$p'_{1,d} = \text{mod}(d, C) \cdot R + \lfloor d/C \rfloor$$

$$p_{1,d} = \begin{cases} p'_{1,d} & \text{, when } N_{null} \neq 0 \text{ and } \begin{pmatrix} d \geq N_{DVRB} - \\ N_{null} \text{ and } \text{mod}(d, C/2) = 0 \end{pmatrix} \\ p'_{1,d} - R & \text{, when } N_{null} \neq 0 \text{ and } \begin{pmatrix} d \leq N_{DVRB} - \\ N_{null} \text{ and } \text{mod}(d, C/2) = 1 \end{pmatrix} \end{cases}$$

where $$p'_{1,d} = \text{mod}(d, C/2) \cdot 2R + \lfloor 2d/C \rfloor$$

$$p_{2,d} = \text{mod}(p_{1,d} + N_{DVRB}/2, N_{DVRB})$$

Again referring to the description given with reference to FIG. 15, the case, in which a combination of the bitmap scheme using the RBG scheme and subset scheme and the compact scheme are used, may be taken into consideration. Problems possibly occurring in this case will be described with reference to FIGS. 26 and 27.

Figure 26:
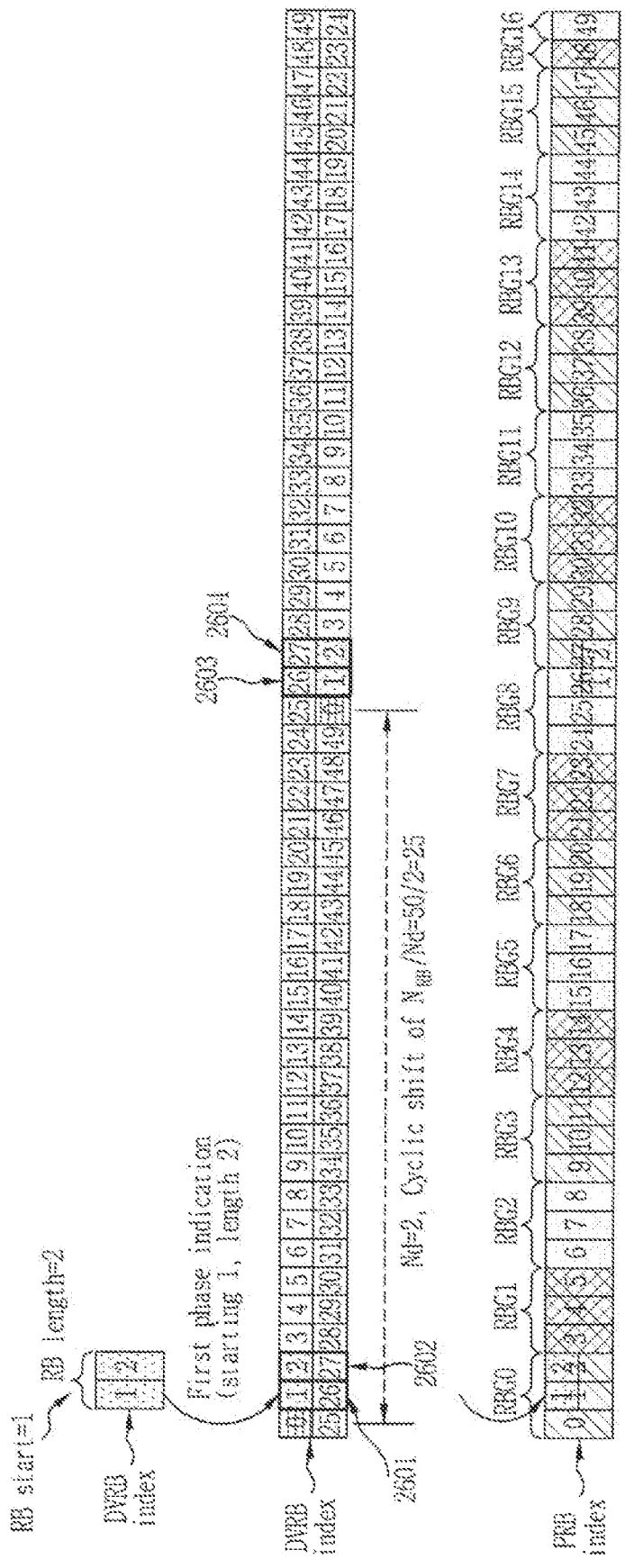
FIGS. 26 and 27 are views illustrating examples of a method using a combination of the bitmap scheme using the RBG scheme and subset scheme and the compact scheme, respectively.
Figure 27:
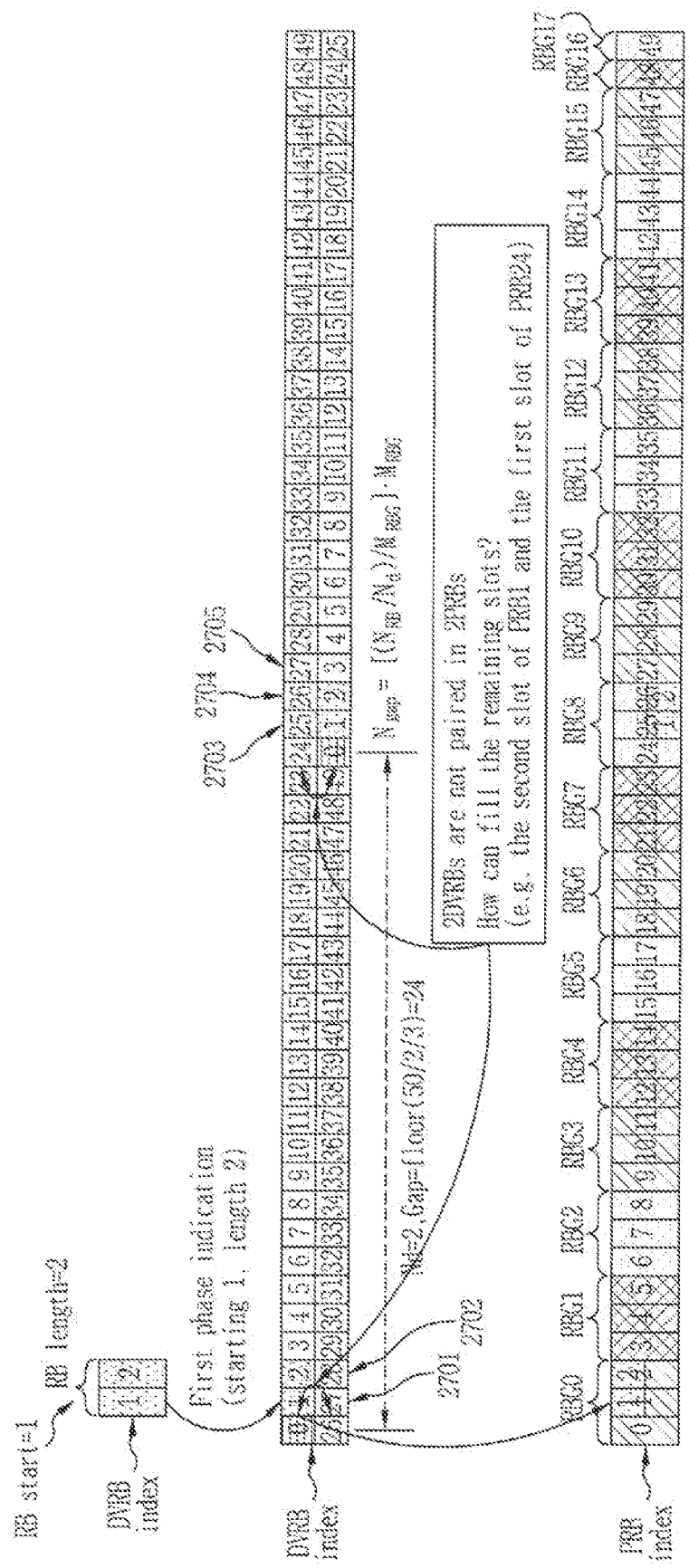

FIGS. 26 and 27 illustrate examples of a method using a combination of the bitmap scheme using the RBG scheme and subset scheme and the compact scheme, respectively.

As shown in FIG. 26, each DVRB may be divided into two parts, and a second one of the divided parts may be cyclically shifted by a predetermined gap (Gap=$N_{DVRB}/N_D$=50/2). In this case, only a part of the resource elements of an RBG0 consisting of PRBs are mapped by the first DVRB divided part, and only parts of the resource elements of RBG8 and RBG9 each consisting of PRBs are mapped by the second DVRB divided part. For this reason, the RBG0, RBG8, and RBG9 cannot be applied to a scheme using a resource allocation on an RBG basis.

In order to solve this problem, the gap may be set to be a multiple of the number of RBs included in one RBG namely, $M_{RBG}$. That is, the gap may satisfy a condition "Gap=$M_{RBG}$*k" (k is a natural number). When the gap is set to satisfy this condition, it may have a value of, for example, 27 (Gap=$M_{RBG}$*k=3*9=27). When Gap=27, each DVRB may be divided into two parts, and a second one of the divided parts may be cyclically shifted by the gap (Gap=27). In this case, only a part of the resource elements of the RBG0, which consists of PRBs, are mapped by the first DVRB divided part, and only a part of the resource elements of the RBG8, which consists of PRBs, are mapped by the second DVRB divided part. Accordingly, in the method of FIG. 27, the RBG8 can be applied to a scheme using a resource allocation on an RBG basis, different from the method of FIG. 26.

In the method of FIG. 27, however, DVRB indexes paired in one PRB cannot be paired in another PRB. Again referring to FIG. 26, the DVRB indexes 1 and 26 paired in the PRB1 (2601) are also paired in the PRB26 (2603). In the method of FIG. 27, however, the DVRB indexes 1 and 27 paired in the PRB1 (2701) cannot be paired in the PRB25 or PRB27 (2703 or 2705).

In the case of FIG. 26 or 27, the DVRB1 and DVRB2 are mapped to the PRB1, PRB2, PRB25 and PRB26. In this case, parts of the resource elements of the PRB1, PRB2, PRB25, and PRB26 are left without being mapped.

In the case of FIG. 26, if the DVRB25 and DVRB26 are additionally mapped to PRBs, they completely fill the remaining spaces of the PRB1, PRB2, PRB25, and PRB26.

In the case of FIG. 27, however if the DVRB25 and DVRB26 are additionally mapped to PRBs, the DVRB25 and DVRB26 are mapped to the PRB0, PRB25, PRB26, and PRB49. As a result, the non-mapped resource element parts of the PRB1 and PRB2 are still left without being filled with DVRBs. That is, the case of FIG. 27 has a drawback in that, usually, there are PRBs left without being mapped.

The problem occurs because the cyclic shift is performed such that a gap value does not equal to $N_{DVRB}/N_D$. When $N_{DVRB}/N_D$ is a multiple of $M_{RBG}$, the above-described problem is solved because the cyclic shift corresponds to a multiple of $M_{RBG}$.

Embodiment 13

In order to simultaneously solve the problems of FIGS. 26 and 27, accordingly, the number of RBs used for DVRBs, namely, $N_{DVRB}$, is limited to a multiple of $N_D \cdot M_{RBG}$ in accordance with one embodiment of the present invention.

Embodiment 14

Meanwhile, it can be seen that, in the above cases, the first and second divided parts of each DVRB belong to different subsets, respectively. In order to make the two divided parts of each DVRB belong to the same subset the gap should be set to be a multiple of the square of $M_{RBG}(M_{RBG}^2)$.

Therefore, in another embodiment of the present invention, the number of RBs used for DVRBs, namely, $N_{DVRB}$, is limited to a multiple of $N_D \cdot M_{RBG}^2$, in order to make the two divided pasts of each DVRB belong to the same subset, and to make DVRBs be paired.

Figure 28:
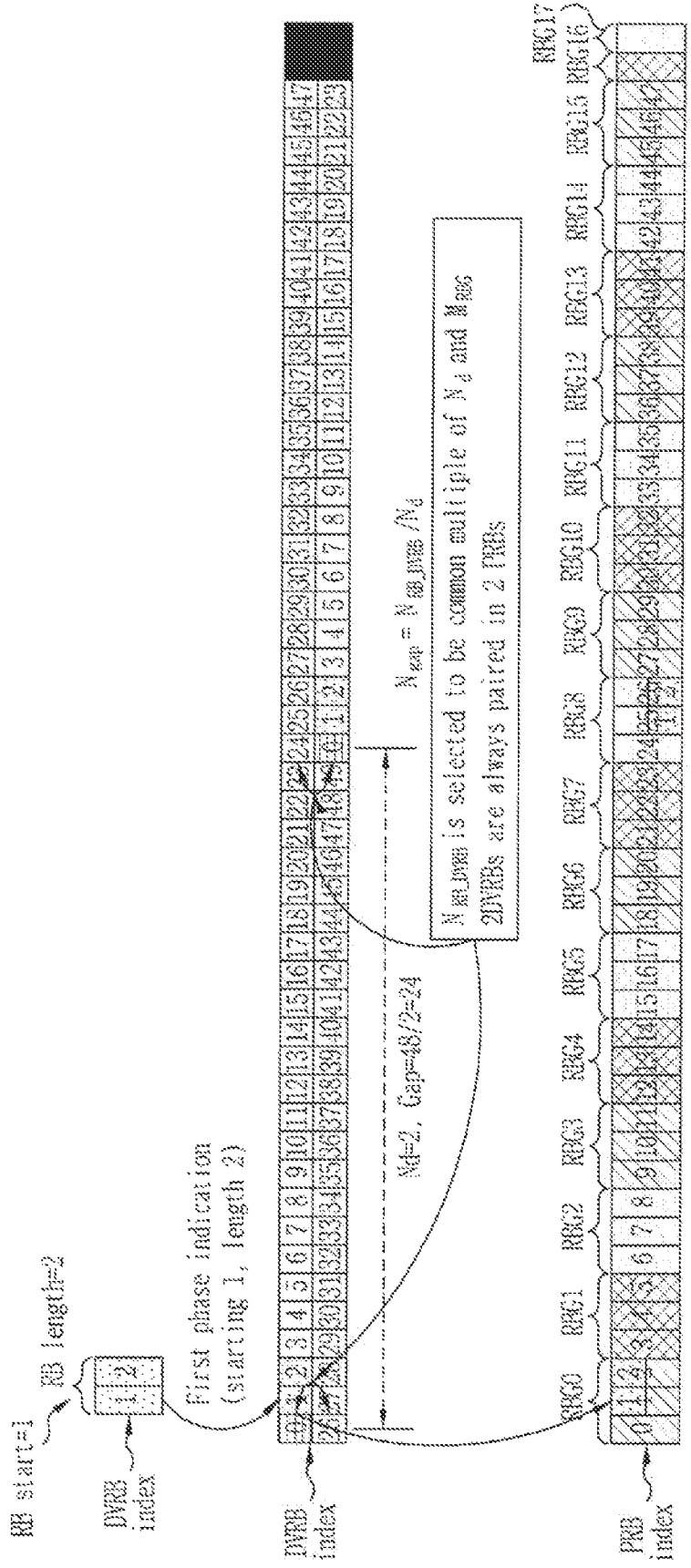
FIG. 28 is a view illustrating the case in which the number of DVRBs is set to a multiple of the number of physical resource blocks (PRBs), to which one virtual resource block (VRB) is mapped, $N_D$, and the number of consecutive physical resource blocks constituting an RBG, $M_{RBG}$, in accordance with one embodiment of the present invention.

FIG. 28 illustrates the case in which $N_{DVRB}$ is set to be a multiple of $N_D \cdot M_{RBG}$.

As shown in FIG. 28, the divided parts of DVRBs can always be paired in PRBs in accordance with a cyclic shift because the gap is a multiple of $M_{RBG} \cdot N_D$. It is also possible to reduce the number of RBGs in which there are resource elements having parts not filled with DVRBs.

Embodiment 15

Figure 29:
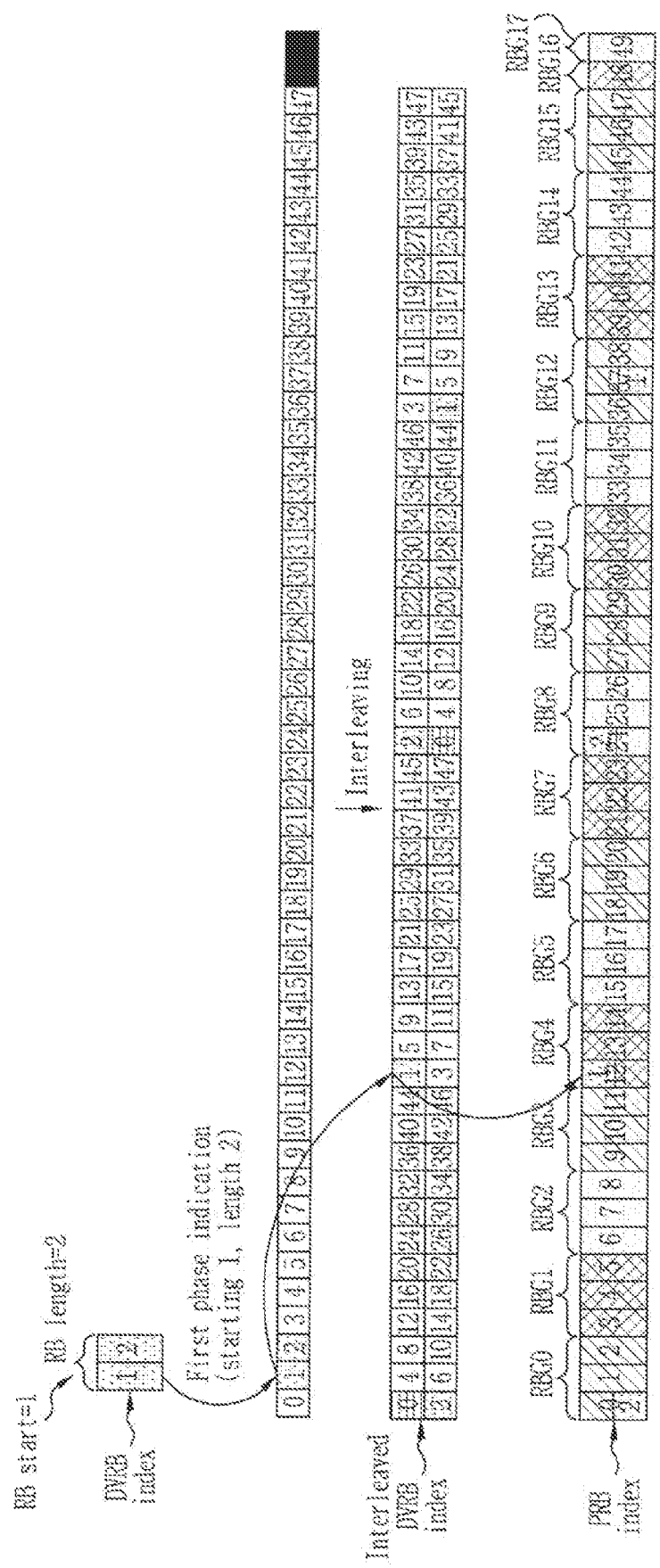
FIG. 29 is a view illustrating the case in which DVRB indexes are interleaved in accordance with the method of FIG. 28.

FIG. 29 illustrates the case in which DVRB indexes are interleaved in accordance with the method of FIG. 28.

When DVRB indexes are interleaved as shown in FIG. 29, it may be possible to set $N_{DVRB}$ to a multiple of $N_D \cdot M_{RBG}$ when the DVRB indexes are mapped to PRBs. In this case, however, there may be an occasion that the rectangular interleaver matrix is incompletely filled with DVRB indexes, as shown in FIGS. 20a and 20b. In this case, accordingly, it is necessary to fill nulls in non-filled portions of the rectangular interleaver matrix. In order to avoid the occasion requiring filling of nulls is a block interleaver of degree D, it is necessary to limit the number of RBs used for DVRBs to a multiple of D.

Accordingly, in one embodiment of the present invention, the gap is set to be a multiple of $M_{RBG}$, and the second divided part of each DVRB is cyclically shifted by $N_{RB}/N_D$ so that the DVRB indexes mapped to one PRB are paired. Also, in order to avoid filling of nulls in the block interleaver, the number of RBs used for DVRBs, namely $N_{DVRB}$, is limited to a common multiple of $N_D \cdot M_{RBG}$ and D. If D is equal to the diversity order ($N_{DivOrder}=K \cdot N_D$) used in the interleaver in this case, $N_{DVRB}$ is limited to a common multiple of $N_D \cdot M_{RBG}$ and $K \cdot N_D$.

Embodiment 16

In another embodiment of the present invention, the gap is set to be a multiple of the square of $M_{RBG}$, in order to make the two divided parts of each DVRB be located on the same subset. Also, the second divided part of each DVRB is cyclically shifted by $N_{RB}/N_D$ so that the DVRB indexes mapped to one PRB are paired. In order to avoid filling of nulls in the block interleaver, the number of RBs used for DVRBs, namely, $N_{DVRB}$, is limited to a common multiple of $N_D \cdot M_{RBG}^2$ and D. If D is set to the diversity order ($N_{DivOrder}=K \cdot N_D$) used in the interleaver in this case. $N_{DVRB}$ is limited to a common multiple of $N_D \cdot M_{RBG}^2$ and $K \cdot N_D$.

Embodiment 17

Figure 30:
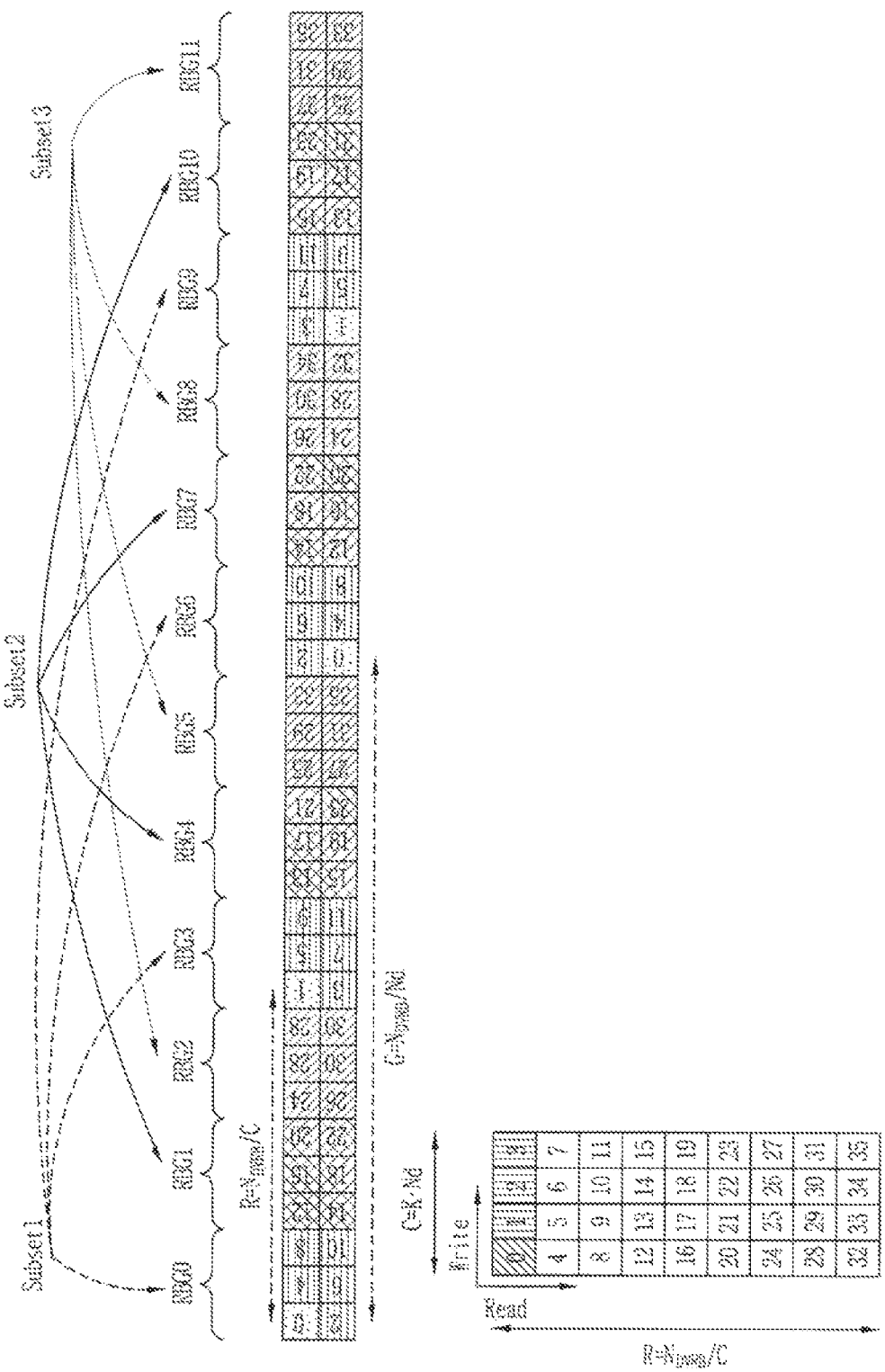
FIG. 30 is a view illustrating an example wherein mapping is performed under the condition in which the degree of a block interleaver is set to the number of columns of the block interleaver, namely, C, and C is set to a diversity order, in accordance with one embodiment of the present invention.

Meanwhile, FIG. 30 illustrates the case in which D is set to the number of columns, namely, C, and C is set to $N_{DivOrder}$ ($N_{DivOrder}=K \cdot N_D$).

Of course, in the case of FIG. 30, writing is performed in such a manner that, after one column is completely filled, a next column is filled, and reading is performed in such a manner that, after one row is completely read, a next row is read.

In the embodiment of FIG. 30, $N_{DVRB}$ is set such that consecutive DVRB indexes are assigned to the same subset. The illustrated rectangular interleaver is configured such that consecutive indexes are filled in the same subset when the number of rows is a multiple of $M_{RBG}^2$. Since the number of rows, R, is $N_{DVRB}/D$ ($R=N_{DVRB}/D$), the number RBs used for DVRBs, namely, $N_{DVRB}$, is limited to a multiple of $D \cdot M_{RBG}^2$.

In order to map the two divided parts of each DVRB to the PRBs in the same subset, the number of RBs used for DVRBs, namely, $N_{DVRB}$, is limited to a common multiple of $D \cdot M_{RBG}^2$ and $N_D \cdot M_{RBG}^2$. When $D=K \cdot N_D$, $N_{DVRB}$ is limited to $K \cdot N_D \cdot M_{RBG}^2$ because the common multiple of $K \cdot N_D \cdot M_{RBG}^2$ and $N_D \cdot M_{RBG}^2$ is $K \cdot N_D \cdot M_{RBG}^2$.

Finally, the number of RBs used for DVRBs may be a maximum number of DVRBs satisfying the above-described limitations within the number of PRBs in the entire system. RBs used for DVRBs may be used in an interleaved manner.

Embodiment 18

Hereinafter, a mapping method using temporary PRB indexes when $N_{PRB}$ and $N_{DVRB}$ have different lengths in accordance with one embodiment of the present invention will be described.

Figure 31:
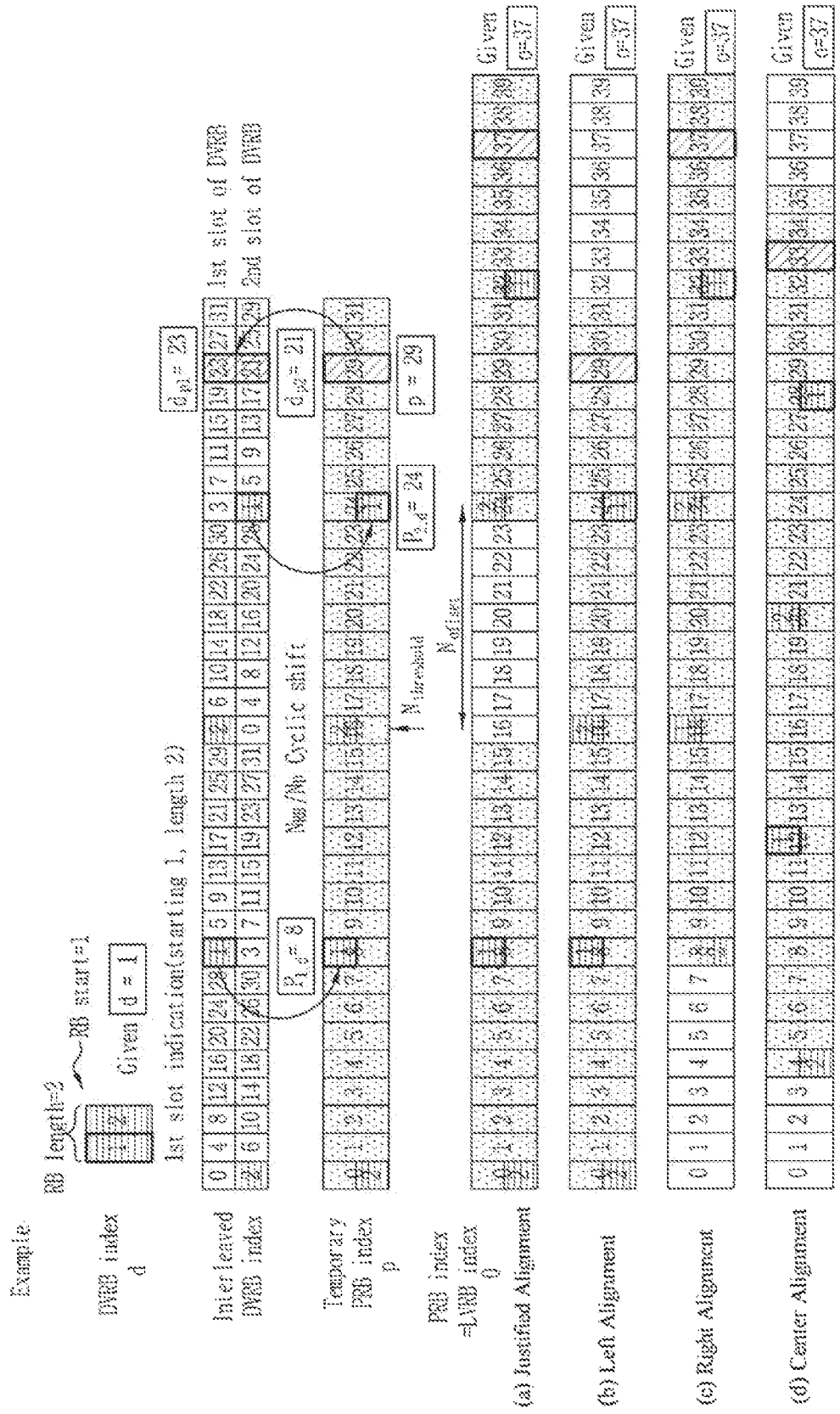
FIG. 31 is a view illustrating an example of a mapping method according to one embodiment of the present invention when the number of PRBs and the number of DVRBs are different from each other.

FIG. 31 illustrates methods in which, when $N_{PRB}$ and $N_{DVRB}$ have different lengths, the result of the mapping to PRBs performed using the DVRB interleaver of FIG. 29 is once again processed to make DVRBs finally correspond to PRBs.

One of the schemes shown by (a), (b), (c), and (d) of FIG. 31 may be selected in accordance with the usage of system resources. In this scheme, the value p in the above-described co-relational expressions of DVRB and PRB indexes is defined as a temporary PRE index. In this case, a value o obtained after adding $N_{offset}$ to p exceeding $N_{threshold}$ is used as a final PRB index.

In this case, four alignment schemes respectively illustrated in FIG. 31 may be expressed by Expression 12.

$$N_{threshold}=N_{DVRB}/2,\ N_{offset}=N_{PRB}-N_{DVRB} \quad \text{(a)}$$

$$N_{threshold}=0,\ N_{offset}=0 \quad \text{(b)}$$

$$N_{threshold}=0,\ N_{offset}=N_{PRB}-N_{DVRB} \quad \text{(c)}$$

$$N_{threshold}=0,\ N_{offset}=\lfloor (N_{PRB}-N_{DVRB})/2 \rfloor \quad \text{(d)}$$

or $$N_{offset}=\lceil (N_{PRB}-N_{DVRB})/2 \rceil \quad \text{[Expression 12]}$$

Here, (a) represents a justified alignment, (b) represents a left alignment, (c) represents a right alignment, and (d) represents a center alignment. Meanwhile, if a PRB index o is given, a DVRB index d can be derived from Expression 13, using a temporary PRB index p.

$$p = \begin{cases} o - N_{offset} & , \text{when } o \geq N_{threshold} + N_{offset} \\ o & , \text{when } o < N_{threshold} \end{cases} \quad \text{[Expression 13]}$$

On the other hand, if the DVRB index d is given, a PRB index o can be derived from Expression 14, using a temporary PRB index p.

$$o_{i,d} = \begin{cases} p_{i,d} + N_{offset} & , \text{when } p_{i,d} \geq N_{threshold} \\ p_{i,d} & , \text{when } p_{i,d} < N_{threshold} \end{cases} \quad \text{[Expression 14]}$$

Embodiment 19

Hereinafter, a mapping method capable of increasing $N_{DVRB}$ to a maximum while satisfying the gap limitations in accordance with one embodiment of the present invention will be described.

The previous embodiments have proposed interleaver structures for reducing the number of PRBs, in which there are resource elements having parts not filled with DVRBs, where the RBG scheme anther the subset scheme is introduced for allocation of LVRBs. The previous embodiments have also proposed methods for limiting the number of RBs used for DVRBs, namely, $N_{DVRB}$.

However, as the limitation condition caused by $M_{RBG}$ becomes more strict, the limitation on the number of RBs usable for DVRBs, namely $N_{DVRB}$, among the total number of PRBs, namely, $N_{PRB}$, increases.

Figure 32:
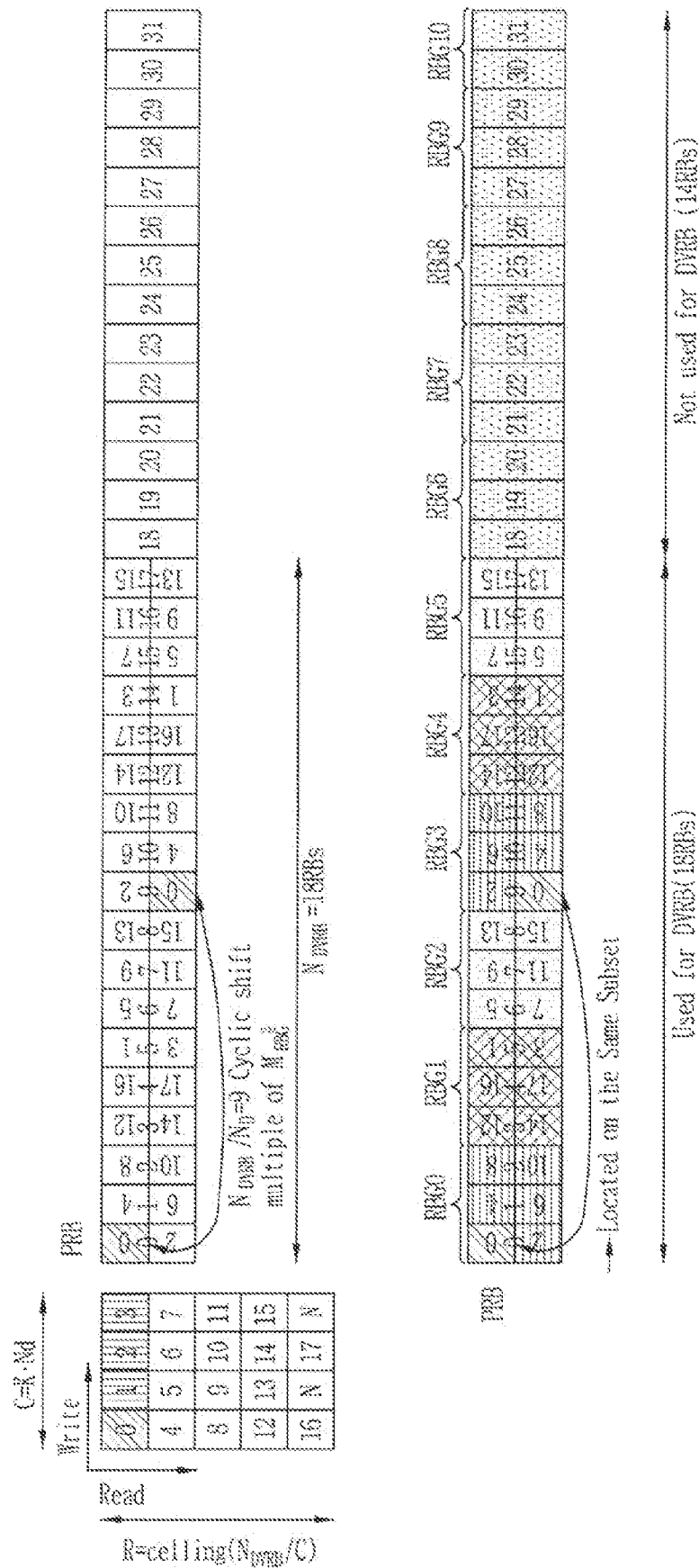
FIGS. 32 and 33 are views illustrating examples of a mapping method capable of increasing the number of DVRBs, using a given gap, in accordance with one embodiment of the present invention.

FIG. 32 illustrates the case using a rectangular interleaver having conditions of "$N_{PRB}=32$", "$M_{RBG}=3$", "K=2", and "$N_D=2$".

When $N_{DVRB}$ is set to be a multiple of $N_D \cdot M_{RBG}^2 (=18)$ to enable the two divided parts of each DVRB to be mapped to PRBs belonging to the same subset, while having a maximum value not exceeding $N_{PRB}$, the set $N_{DVRB}$ is equal to 18($N_{DVRB}$18).

In order to enable the two divided parts of each DVRB to be mapped to PRBs belonging to the same subset in the case of FIG. 32, $N_{DVRB}$ is set to be 18 ($N_{DVRB}=18$). In this case, 14 RBs (32−18=14) cannot be used for DVRBs.

In this case, it can be seen that $N_{gap}$ is 9 ($N_{gap}=18/2=9$), and the DVRB0 is mapped to respective first RBs of the RBG0 and RBG3 belonging to the same subset.

Accordingly, the present invention proposes a method for satisfying gap limitation conditions when $N_D=2$ by setting an offset and a threshold value, to which the offset will be applied, as previously proposed, without directly reflecting the gap limitation conditions on $N_{DVRB}$.

1) First, desired gap limitation conditions are set. For example, the gap may be set to a multiple of $M_{RBG}$ or a multiple of $M_{RBG}^2$.

2) Next, a numeral nearest to $N_{PRB}/2$ among numerals satisfying the gap limitation conditions is set as $N_{gap}$.

Figure 20:
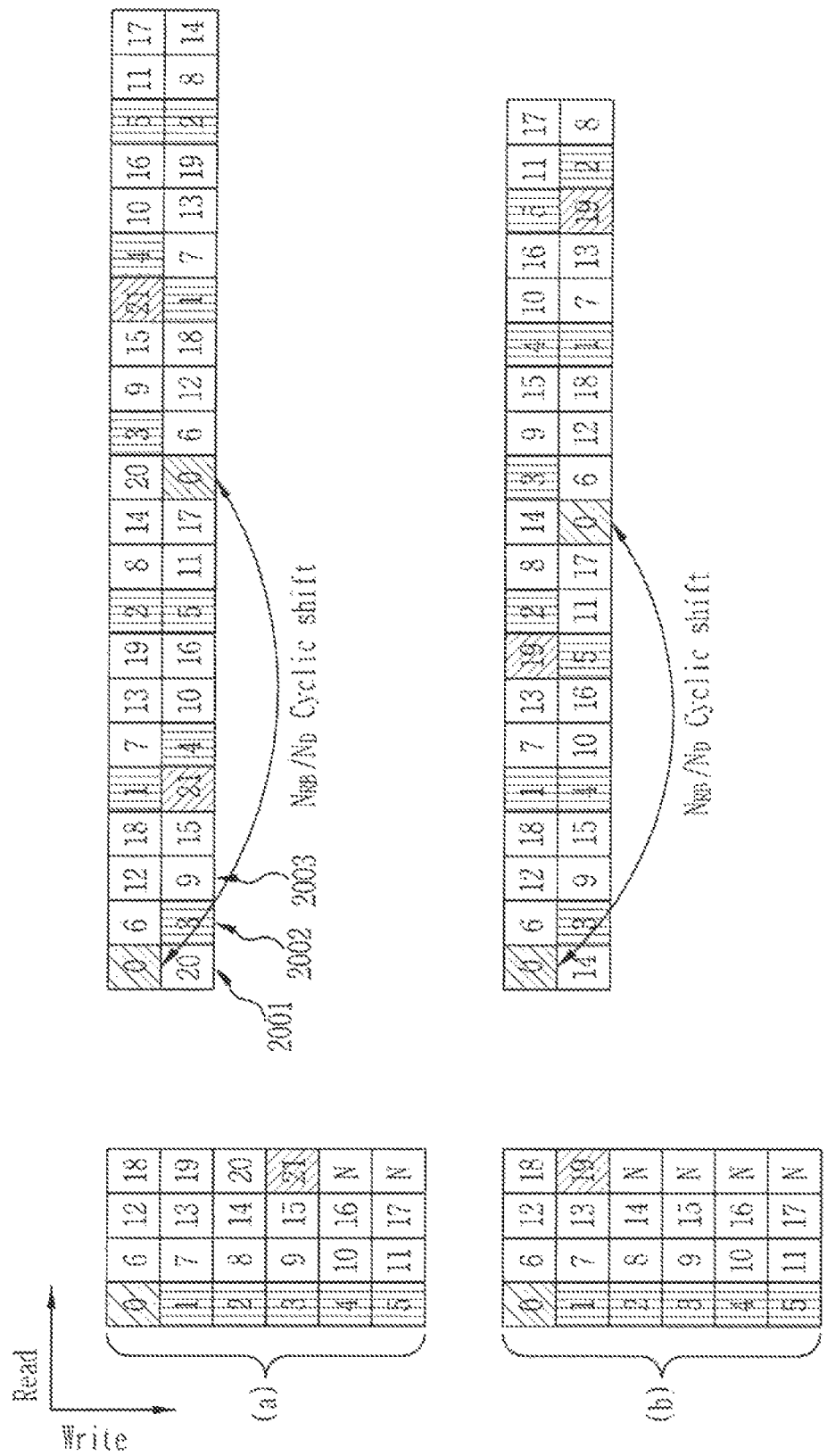
FIGS. 20a and 20b are views illustrating an operation of a general interleaver when the number of resource blocks used in an interleaving operation is not a multiple of a diversity order.

3) When $N_{gap}$ is smaller than $N_{PRB}/2$, the same mapping as that of FIG. 20 is used.

4) When $N_{gap}$ is equal to or larger than $N_{PRB}/2$, and filling of nulls in the interleaver is allowed, $N_{DVRB}$ is set such that $N_{DVRB}=(N_{PRB}-N_{gap})\cdot 2$. However, when no filling of nulls in the interleaver is allowed, $N_{DVRB}$ is set such that $N_{DVRB}=\lfloor\min(N_{PRB}-N_{gap}, N_{gap})\cdot 2/C\rfloor\cdot C$.

5) An offset is applied to a half or more of $N_{DVRB}$. That is, a reference value for the application of the offset, namely, $N_{threshold}$, is set such the $N_{threshold}=N_{DVRB}/2$.

6) The offset is set such that temporary PRBs, to which the offset is applied, satisfy the gap limitation conditions. That is, $N_{offset}$ is set such that $N_{offset}=N_{gap}-N_{threshold}$.

This may be expressed by Expression 15 as a generalized mathematic Expression.

[Expression 15]

1. Setting of $N_{gap}$ according to gap conditions:
Under an $M_{RBG}^2$-multiple condition:

$$N_{gap}=\text{round}(N_{PRB}/(2\cdot M_{RBG}^2))\cdot M_{RBG}^2$$

Under an $M_{RBG}$-multiple condition:

$$N_{gap}=\text{round}(N_{PRB}/(2\cdot M_{RBG}))\cdot M_{RBG}$$

2. Setting of $N_{DVRB}$:
Under a null-allowed condition:

$$N_{DVRB}=\min(N_{PRB}-N_{gap},N_{gap})\cdot 2$$

Under no null-allowed condition:

$$N_{DVRB}=\lfloor\min(N_{PRB}-N_{gap},N_{gap})\cdot 2/C\rfloor\cdot C$$

Setting of $N_{threshold}$: $N_{threshold}=N_{DVRB}/2$     3.

Setting of $N_{offset}$: $N_{offset}=N_{gap}-N_{threshold}$     4.

Figure 33:
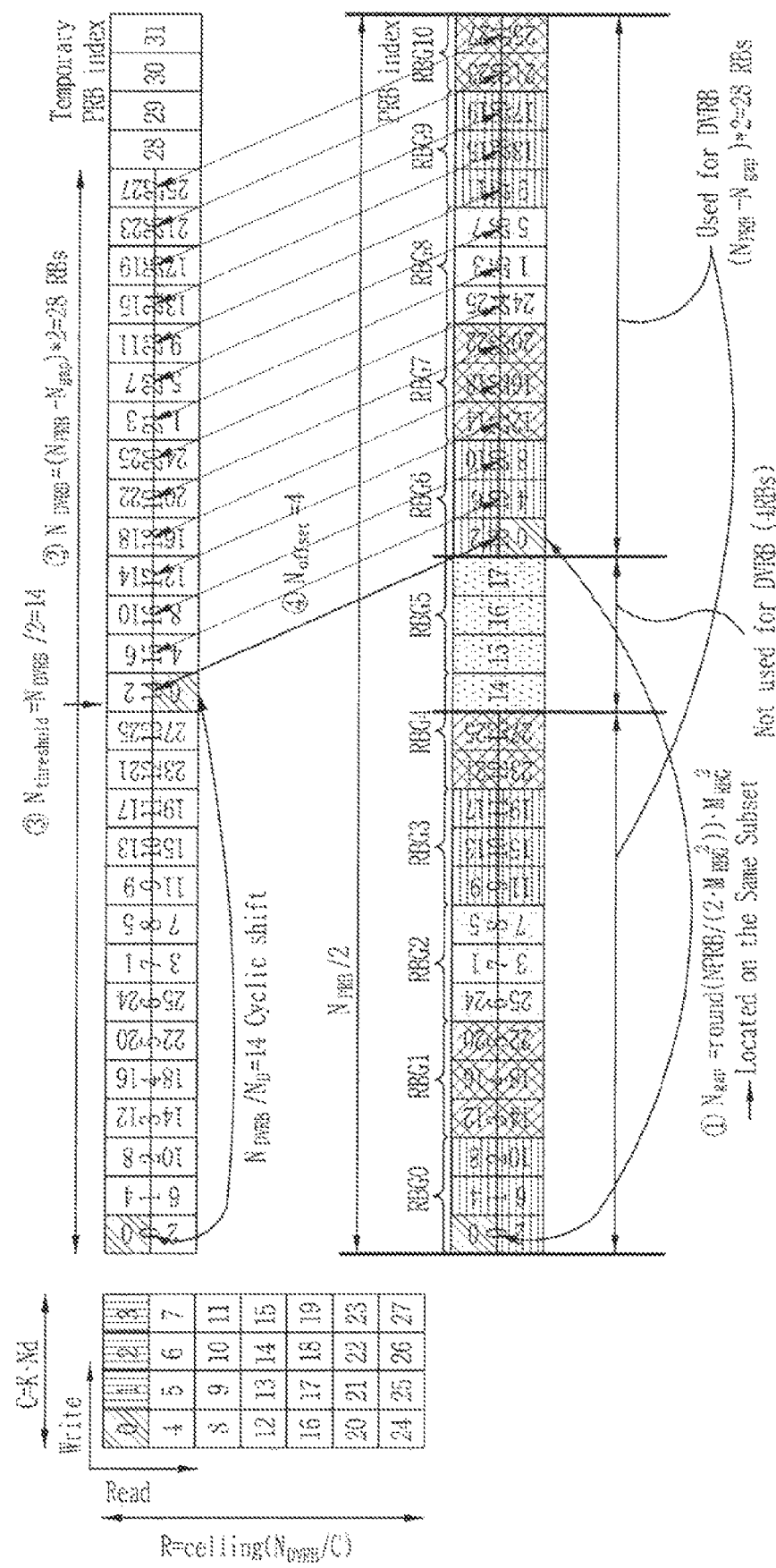

FIG. 33 illustrates application of a DVRB mapping rule proposed in the present invention when $N_{PRB}=32$, $M_{RBG}=3$, and a rectangular interleaver of K=2 and $N_D=2$.

When $N_{gap}$ is set such that it is a multiple of $M_{RBG}^2(=9)$ while being nearest to $N_{PRB}/2$, in order to map the two divided parts of each DVRB to PRBs belonging to the same subset, respectively, the set $N_{gap}$ is equal to 18 ($N_{gap}=18$). In the case, 28 RBs ((32−18)×2=28) are used for DVRBs. That is, conditions of "$N_{DVRB}=28$", "$N_{threshold}=282=14$", and "$N_{offset}=18-14=4$" are established. Accordingly, temporary PRB indexes, to which DVRB indexes interleaved by the rectangular interleaver are mapped, are compared with $N_{threshold}$. When $N_{offset}$ is added to temporary PRB indexes satisfying $N_{threshold}$, a result as shown in FIG. 33 is obtained. Referring to FIG. 33, can be seen that the two divided parts of the DVRB0 are mapped to respective first RBs of the RBG0 and RBG6 belonging to the same subset. When this method is compared with the method of FIG. 32, it can also be seen that the number of RBs usable for DVRBs is increased from 18 to 28. Since the gap is also increased, the diversity in the DVRB mapping can be further increased.

Embodiment 20

Hereinafter, a mapping method capable of increasing $N_{DVRB}$ to a maximum while mapping consecutive indexes to specific positions in accordance with one embodiment of the present invention will be described.

Where one UE is allocated several DVRBs, the allocated DVRBs are consecutive DVRB. In this case, accordingly, it is preferable to set contiguous indexes such that they are positioned at intervals of a multiple of $M_{RBG}$ or a multiple of $M_{RBG}^2$, for scheduling of LVRBs, similarly to the setting of the gap. When it is assumed, in this case, that the degree of the interleaver is equal to the number of columns, namely, C, the number of rows, namely, R, should be a multiple of $M_{RBG}$ or a multiple of $M_{RBG}^2$. Accordingly, the size of the interleaver, namely, $N_{interleaver}=C \cdot R$, should be a multiple of $C \cdot M_{RBG}$ or a multiple of $C \cdot M_{RBG}^2$. Thus, if $N_{DVRB}$ is previously given, a minimum interleaver size satisfying the above conditions can be derived as follows.

Under no multiple condition, $N_{interleaver}=\lceil N_{DVRB}/C \rceil \cdot C$.

In this case, accordingly, $R=N_{interleaver}/C=\lceil N_{DVRB}/C \rceil$.

Under the $C \cdot M_{RBG}$-multiple condition, $N_{interleaver}=\lceil N_{DVRB}/(C \cdot M_{RBG}) \rceil \cdot C \cdot M_{RBG}$.

In this case, accordingly, $R=N_{interleaver}/C=\lceil N_{DVRB}/(C \cdot M_{RBG}) \rceil \cdot M_{RBG}$.

Under the $C \cdot M_{RBG}^2$-multiple condition, $N_{interleaver}=\lceil N_{DVRB}/(C \cdot M_{RBG}^2) \rceil \cdot C \cdot M_{RBG}^2$.

In this case, accordingly, $R=N_{interleaver}/C=\lceil N_{DVRB}/(C \cdot M_{RBG}^2) \rceil \cdot M_{RBG}^2$.

The number of nulls included in the interleaver is as follows.

Under no multiple condition, $$N_{null}=N_{interleaver}-N_{DVRB}=\lceil N_{DVRB}/C \rceil \cdot C-N_{DVRB}.$$

Under the $C \cdot M_{RBG}$-multiple condition, $$N_{null}=N_{interleaver}-N_{DVRB}=\lceil N_{DVRB}/(C \cdot M_{RBG}) \rceil \cdot C \cdot M_{RBG}-N_{DVRB}.$$

Under the $C \cdot M_{RBG}^2$-multiple condition, $$N_{null}=N_{interleaver}-N_{DVRB}=\lceil N_{DVRB}/(C \cdot M_{RBG}^2) \rceil \cdot C \cdot M_{RBG}^2-N_{DVRB}.$$

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

The present invention is applicable to a transmitter and a receiver used in a broadband wireless mobile communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for receiving downlink data using resource blocks at a user equipment in a wireless mobile communication system, the method comprising:
   receiving downlink control information including resource allocation information for the downlink data from a base station; and
   receiving the downlink data mapped to physical resource blocks (PRBs) based on the downlink control information,
   wherein:
   the resource allocation information indicates virtual resource block (VRB) allocations for the user equipment;
   indexes of PRBs to which the downlink data are mapped are determined based on mapping relationship between VRBs and the PRBs;
   the mapping relationship is defined such that indexes of the VRBs are mapped to indexes of the PRBs for a first part and a second part of a subframe and the indexes of the PRBs for the second part are separated with respect to the indexes of the PRBs for the first part based on a predetermined gap;
   an index of one of the PRBs on each part that is mapped to an index of one or the VRBs is determined based on the predetermined gap and a number of the VRBs.

2. The method in claim 1, wherein the number of VRBs is a number of distributed VRBs (DVRBs).

3. The method in claim 1, wherein a predetermined offset is applied to an index of a PRB when the index of the PRB is equal to or greater than a predetermined threshold.

4. The method in claim 3, wherein the predetermined threshold is $N_{VRB/2}$ where $N_{VRB}$ is a number of consecutive indexes of the VRBs.

5. The method in claim 4, wherein the consecutive indexes of the VRBs are interleaved.

6. The method in claim 3, wherein the predetermined offset is defined as $N_{gap}-N_{VRB/2}$, where $N_{gap}$ is a value of the predetermined gap.

7. A user equipment receiving downlink data using resource blocks in a wireless mobile communication system, the user equipment comprising:
   data processing circuitry configured to control an operation of the user equipment; and
   a receiver, coupled to the data processing circuitry, configured to receive downlink control information including resource allocation information for the downlink data from a base station and to receive the downlink data mapped to physical resource blocks (PRBs) based on the downlink control information,
   wherein:
   the resource allocation information indicates virtual resource block (VRB) allocations for the user equipment;
   indexes of PRBs to which the downlink data are mapped are determined based on mapping relationship between VRBs and the PRBs;
   the mapping relationship is defined such that indexes of the VRBs are mapped to indexes of the PRBs for a first part and a second part of a subframe and the indexes of the PRBs for the second part are separated with respect to the indexes of the PRBs for the first part based on a predetermined gap;

an index of one of the PRBs on each part that is mapped to an index of one or the VRBs is determined based on the predetermined gap and a number of the VRBs.

8. The user equipment in claim 7, wherein the number of VRBs is a number of distributed VRBs (DVRBs).

9. The user equipment in claim 7, wherein a predetermined offset is applied to an index of a PRB when the index of the PRB is equal to or greater than a predetermined threshold.

10. The user equipment in claim 9, wherein the predetermined threshold is $N_{VRB/2}$ where $N_{VRB}$ is a number of consecutive indexes of the VRBs.

11. The user equipment in claim 10, wherein the consecutive indexes of the VRBs are interleaved.

12. The user equipment in claim 9, wherein the predetermined offset is defined as $N_{gap}-N_{VRB/2}$, where $N_{gap}$ is a value of the predetermined gap.

* * * * *